United States Patent
Koyama

(10) Patent No.: US 8,251,595 B2
(45) Date of Patent: Aug. 28, 2012

(54) IMAGING APPARATUS

(75) Inventor: Terunori Koyama, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/024,481

(22) Filed: Feb. 10, 2011

(65) Prior Publication Data

US 2011/0194852 A1   Aug. 11, 2011

(30) Foreign Application Priority Data

Feb. 10, 2010   (JP) .................. 2010-027648

(51) Int. Cl.
 *G03B 5/02* (2006.01)
(52) U.S. Cl. .................................... 396/349
(58) Field of Classification Search .......... 396/349
See application file for complete search history.

(56) References Cited

U.S. PATENT DOCUMENTS

| | | | |
|---|---|---|---|
| 7,338,219 B2 | 3/2008 | Ishizuka et al. | |
| 7,477,454 B2 | 1/2009 | Shinohara et al. | |
| 7,486,332 B2 | 2/2009 | Endo et al. | |
| 7,551,376 B2 | 6/2009 | Koyama | |
| 7,632,024 B2 * | 12/2009 | Huang | 396/349 |
| 7,855,746 B2 * | 12/2010 | Iwasaki | 348/361 |
| 7,963,706 B2 * | 6/2011 | Nuno | 396/349 |

FOREIGN PATENT DOCUMENTS

| | | |
|---|---|---|
| JP | 2005-266345 | 9/2005 |
| JP | 2006-259344 | 9/2006 |
| JP | 2006-349846 | 12/2006 |
| JP | 2007-316386 | 12/2007 |
| JP | 2008-90201 | 4/2008 |
| JP | 2008-191428 | 8/2008 |
| JP | 2008-233575 | 10/2008 |
| JP | 4373716 | 9/2009 |
| JP | 2010-145757 | 7/2010 |

* cited by examiner

*Primary Examiner* — Rodney Fuller
(74) *Attorney, Agent, or Firm* — Oblon, Spivak, McClelland, Maier & Neustadt, L.L.P.

(57) ABSTRACT

A lens barrel includes a plurality of lenses moved between a collapsed state where at least one lens is collapsed and a photographic state where at least one lens is disposed at an object side and all lenses are on a photographic axis, a plurality of lens retaining frames each configured to retain the plurality of lenses, a movable cylinder, a positioning member provided inside the movable cylinder, the retractable lens retaining frame retaining a retractable lens to be positioned to a photographic axis position by allowing the retractable lens retaining frame to abut on the positioning member in the photographic state and to be retracted out of the photographic axis in the collapsed state, a preliminary reception portion provided inside the movable cylinder and located on a path along which the retractable lens retaining frame moves from the collapsed state to the photographic state.

16 Claims, 40 Drawing Sheets

IMAGING APPARATUS

CROSS REFERENCE TO RELATED APPLICATIONS

The present application is based on and claims priority from Japanese Application Number 2010-027648, filed on Feb. 10, 2010, the disclosure of which is hereby incorporated by reference herein in its entirety.

BACKGROUND OF THE INVENTION

1. Field of the Invention

The present invention relates to a lens barrel which retracts lens groups in one mode, and which extends the lens groups to their predetermined positions in another mode for use. Particularly, the present invention relates to a lens barrel, a camera, a portable information terminal device and an image input apparatus which are suitable for a zoom lens capable of changing its focal length by moving multiple lens groups relative to one another.

2. Description of the Related Art

Photographic apparatuses, such as digital cameras, have undergone evolutions such as enhancement of the performance of photographic lenses including a zoom lens, and reduction in size in response to users' demand. Accordingly, there have been demands for the photographic apparatuses including a camera lens of a type in which a movable cylinder is placed in the camera main body except during photographing.

To meet a demand for making the camera main bodies (the photographic apparatuses) thinner, it is considered important to minimize to the maximum extent practicable the dimension in a photographic optical axis direction of a movable cylinder portion stored in the camera main body.

Against the background of such demands for making the camera main bodies thinner, there are disclosed techniques for retracting at least one of the lens groups from the photographic optical axis when the movable cylinder is collapsed into the camera main body for storage (see Japanese Patent No. 4373716 and Japanese Patent Application Publication No. 2005-266345, for example).

Each of these techniques causes one of the lens groups to retract from the photographic optical axis when the movable cylinder is stored in the camera main body (photographic apparatus). For this reason, each technique makes it possible to reduce the dimension of the movable cylinder in the photographic optical axis direction, and to make the camera main body (photographic apparatus) thinner.

However, in the techniques disclosed in Japanese Patent No. 4373716 and Japanese Patent Application Publication No. 2005-266345, when a lens group as the retractable lens is inserted to a position on the photographic optical axis, the lens group is positioned to the position on the photographic optical axis with a retaining frame for retaining the retractable lens engaged with a positioning member while abutting thereon and thereby kept from moving. Thus, there is a drawback that a collision sound may occur due to the abutment.

SUMMARY OF THE INVENTION

The present invention has been made with the foregoing circumstances taken into consideration. An object of the present invention is to provide a lens barrel capable of lowering a collision sound occurring when a retractable lens is positioned on a photographic optical axis.

A lens barrel according to an embodiment of the present invention is includes a plurality of lens groups each having at least one lens, the plurality of lens groups being moved between a collapsed state where at least one part of the plurality of lens groups is collapsed to store the plurality of lens groups and a photographic state where at least one part of the plurality of lens groups is disposed at an object side from a position in the collapsed state, and the plurality of lens groups having at least one retractable lens group, a plurality of lens retaining frames each configured to retain corresponding one of the plurality of lens groups and having at least one retractable lens retaining frame configured to retain the at least one retractable lens group, a movable cylinder configured to accommodate the plurality of lens retaining frames therein, the plurality of lens retaining frame retaining the plurality of lens groups being to be positioned on a photographic optical axis in the photographic state and the at least one retractable lens retaining frame retaining the at least one retractable lens group to be retracted to a position outside an inner diameter position of the movable cylinder in the collapsed state, a positioning member provided inside the movable cylinder, the at least one retractable lens retaining frame retaining the at least one retractable lens to be positioned to a position on the photographic axis by allowing the at least one retractable lens retaining frame to abut on the positioning member, a lens retaining frame driving device configured to drive the plurality of lens retaining frames through the movable cylinder, a preliminary reception portion provided inside the movable cylinder and located on a path along which the retractable lens retaining frame moves from the collapsed state to the photographic state, and a preliminary abutment portion provided on the retractable lens retaining frame and configured to abut on the preliminary reception portion before the retractable lens retaining frame abuts on the positioning member during transition from the collapsed state to the photographic state.

BRIEF DESCRIPTION OF THE DRAWINGS

FIG. 9A includes: the vertical cross-sectional view corresponding to the lens barrel 10 as put in a telephoto position state (an aspect of the photographic state P) in which the lens groups are being projected; and the vertical cross-sectional view corresponding to the lens barrel 10 as put in the collapsed storage state D (also simply referred to as a "collapsed state") in which the lens group are stored while kept collapsed. FIG. 9B is the vertical cross-sectional view corresponding to the lens barrel 10 as put in a wide-angle position state (another aspect of the photographic state P) in which the lens groups are being projected.

FIG. 17A is the perspective view corresponding to a state in which the photographic lenses are stored in a camera body while kept collapsed therein. FIG. 17B is the perspective view corresponding to a state in which the photographic lenses are projected from the camera body.

FIG. 20A is a perspective view schematically showing the configuration of the fourth lens retaining frame and a configuration of a main part of a drive operating system for the fourth lens retaining frame. FIG. 20B is a perspective view showing the configuration of the fourth lens retaining frame and the configuration of the main part of the drive operating system at a different angle with parts of the configurations omitted from the view.

FIG. 25A shows a state in which a cam pin (abutment portion) is situated in a retraction starting position. FIG. 25B shows a state in which the cam pin (abutment portion) is moving from the retraction starting position to a storage position. FIG. 25C shows a state in which the cam pin (abutment portion) is situated in the storage position.

FIG. 31 is a diagram for explaining action which is taken while the third lens retaining frame 31 is rotating from the storage position to the photographic position, and shows a positional relationship which is established when the third group secondary guide shaft 33 and the stopper 31a.

FIG. 33A shows an example of the temporal change corresponding to collision sounds which occurs in the configuration of the invention in which the rotation is stopped by two abutments; and FIG. 33B shows an example of the temporal change corresponding to a collision sound which occurs in an example in which the rotation is stopped by a single abutment.

DETAILED DESCRIPTION OF THE PREFERRED EMBODIMENTS

Figure 1:
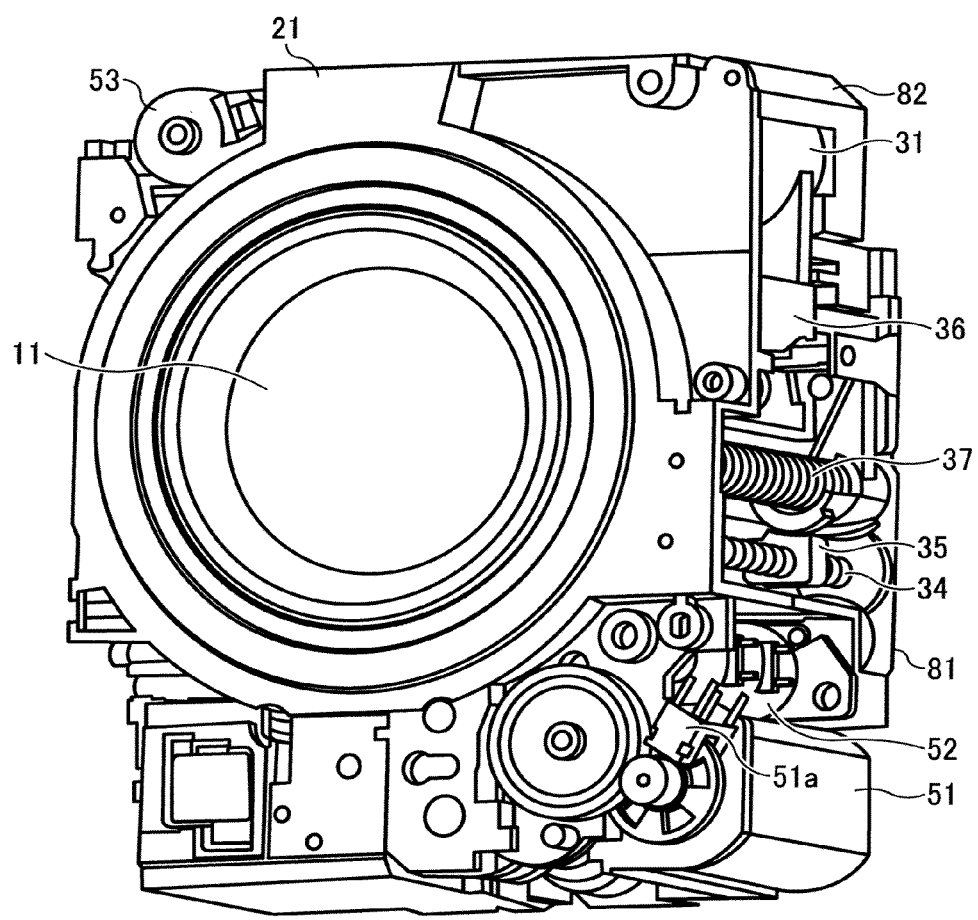
FIG. 1 is a perspective view, from an object side, of a configuration of a lens barrel 10 portion put in a collapsed storage state D in which lens groups are stored while kept collapsed.

Descriptions will be provided hereinafter for embodiments of an imaging apparatus of the invention as claimed in the application concerned.

(Embodiment 1)

Descriptions will be provided for a lens barrel 10 of Embodiment 1 as an embodiment of a lens barrel of the present invention by use of FIGS. 1 to 21. It should be noted that FIGS. 1 to 16B and 20 show configurations and various operating states of main parts of an optical system apparatus including the lens barrel 10 of the present invention.

In FIGS. 1 to 16B and 20, the optical system apparatus including the lens barrel 10 according to an embodiment of the present invention including a plurality of lens groups each having at least one lens, a plurality of lens retaining frames each configured to retain corresponding one of the plurality of lens groups, a movable cylinder configured to accommodate the plurality of lens retaining frames therein, and a lens retaining frame driving device configured to drive the plurality of lens retaining frames through the movable cylinder. The plurality of lens groups is moved between a collapsed state where at least one part of the plurality of lens groups is collapsed to store the plurality of lens groups and a photographic state where at least one part of the plurality of lens groups is disposed at an object side from a position in the collapsed state, and the plurality of lens groups having at least one retractable lens group such as a later described third lens group 13 and a later described fourth lens group 14. The plurality of lens retaining frames have at least one retractable lens retaining frame such as a later described third lens retaining frame 31, 31A and a later described fourth lens retaining frame 41, 41C, 41D, 41E configured to retain the at least one retractable lens group. The plurality of lens retaining frame retains the plurality of lens groups to be positioned on a photographic optical axis in the photographic state and the at least one retractable lens retaining frame retains the at least one retractable lens group to be retracted to a position out of the photographic optical axis, for example, outside an inner diameter position of the movable cylinder in the collapsed state. The at least one retractable lens retaining frame may be movable relative to the positioning member in a direction of the photographic optical axis. The lens barrel 10 includes a positioning member such as a later described third group secondary guide shaft 33, a later described fourth group secondary guide shaft 42, and the like provided inside the movable cylinder.

The lens barrel 10 includes a first lens group 11, a second lens group 12, the third lens group 13, the fourth lens group 14, a shutter/stop unit 15, a solid state image sensor 16, a first lens retaining frame 17, a cover glass 18, a low-pass filter 19, a fixed frame 21, a first rotary barrel 22, a first liner 23, a second rotary barrel 24, a second liner 25, a cam barrel 26, a straight advancement barrel 27, the third lens retaining frame 31, a third group primary guide shaft 32, the third group secondary guide shaft 33, a third group lead screw 34, a third group female screw member 35, a collision preventing piece 36, a compression torsion spring 37, a third group photo interrupter 38 (see FIGS. 14B and 16A), a fourth lens retaining frame 41, the fourth group secondary guide shaft 42, the fourth group spring 43 (see FIGS. 7 and 8), a fourth group primary guide shaft 44, a fourth group lead screw 45, a fourth group female screw member 46, a fourth group photo interrupter 47, a zoom motor 51 (see FIG. 1), a third group motor 52, a fourth group motor 53, a barrier controlling piece 61, a lens barrier 62, a barrier driving system 63, gears 71, 72, 73, 74, a pressure plate 81, and a barrel base 82. It should be noted that the zoom motor 51 together with a spline gear and the like functions as the lens retaining frame driving device configured to drive the movable lens retaining frames. In addition, the first rotary barrel 22, the first liner 23, the second rotary barrel 24, the second liner 25, the cam barrel 26 and the straight advancement barrel 27 function as a movable lens retaining frame.

Figure 9A:
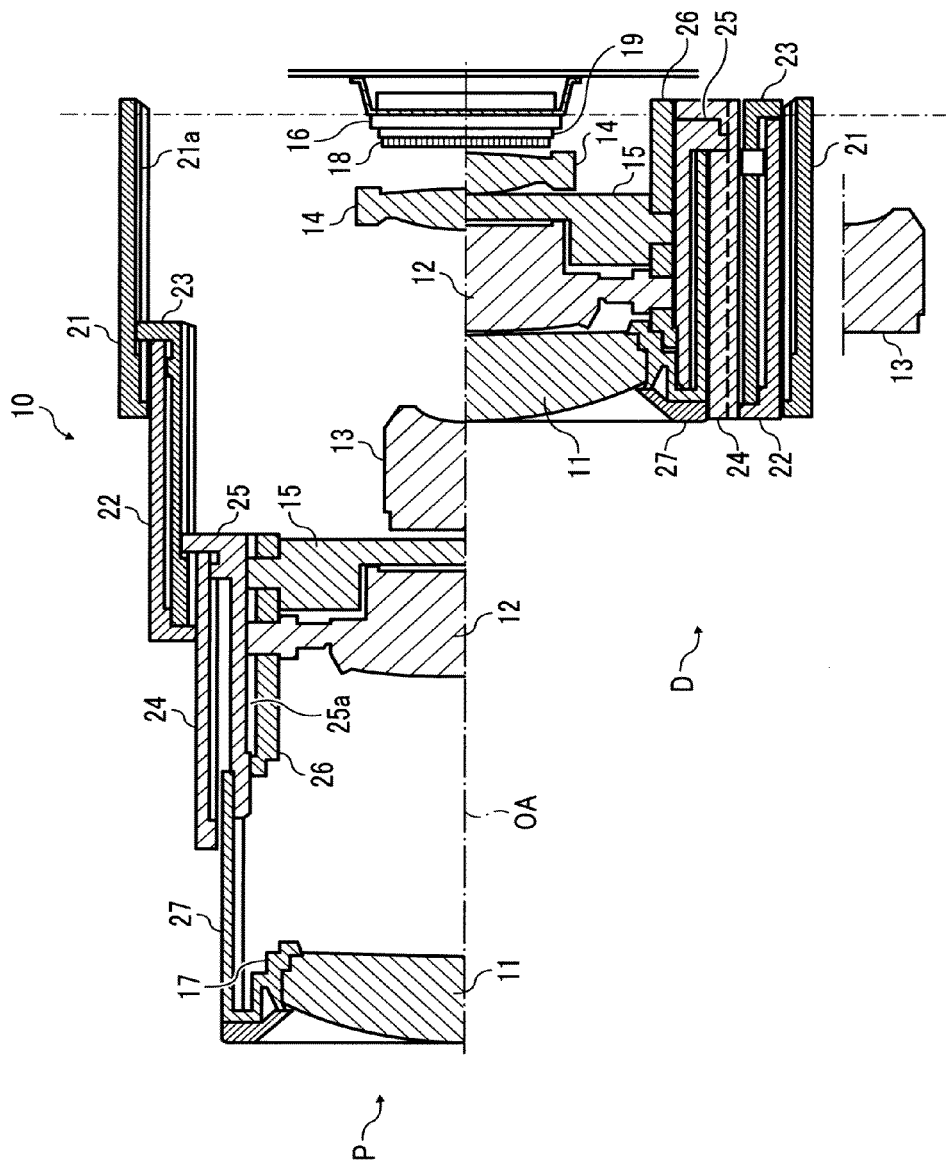
FIGS. 9A and 9B are vertical cross-sectional views each showing the lens groups, lens retaining frames and various main parts of the lens barrel 10.
Figure 9B:
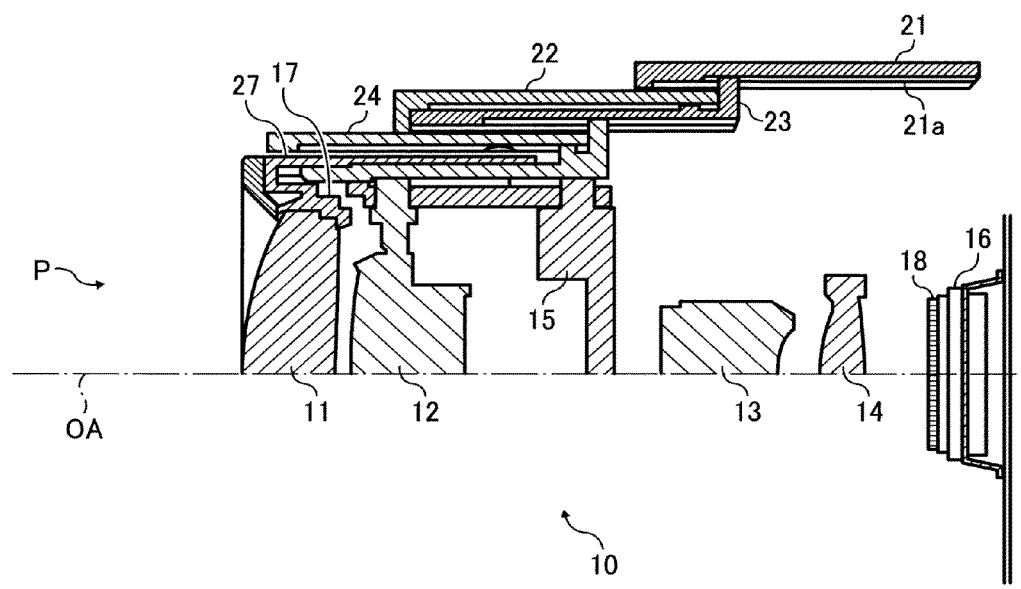

Referring to FIGS. 9A and 9B, descriptions will be provided for a photographic state P. The first lens group 11, the second lens group 12, the third lens group 13 and the fourth lens group 14 are arranged sequentially from an object which is a photographic subject. The shutter/stop unit 15 is inserted and arranged between the second lens group 12 and the third lens group 13. The solid state image sensor 16, which is made up of charge-coupled devices (CCDs) or the like as image pickup devices, is placed close to an image surface of the fourth lens group 14. The first to fourth lens groups 11 to 14 constitute a zoom lens whose focal length is variable. The first lens group 11 includes one or more lenses. The first lens group 11 is fixedly supported by the straight advancement barrel 27 with the first lens retaining frame 17 interposed in between. The first lens retaining frame 17 is configured to retain the first lens group 11 integrally. This first lens group 11 includes a lens (an objective lens) which is placed closest to the object among the multiple lenses.

The second lens group 12 includes one or more lenses. The second lens group 12 is supported by the cam barrel 26 and the second liner 25 in a way that: cam followers formed in the second lens retaining frame (not illustrated clearly) configured to integrally retain the second lens group 12 are inserted in cam grooves for the second lens group in the cam barrel 26; and the cam followers thus engage with straight advancement grooves 25*a* in the second liner 25. The shutter/stop unit 15 includes a shutter and an aperture stop. The shutter/stop unit 15 is supported by the cam barrel 26 and the second liner 25 in a way that: cam followers integrally formed in the shutter/stop unit 15 are inserted in cam grooves for the shutter/stop unit 15 in the cam barrel 26 shown in FIG. 11; and the cam followers thus engage with the straight advancement grooves 25*a* in the second liner 25.

Figure 12:
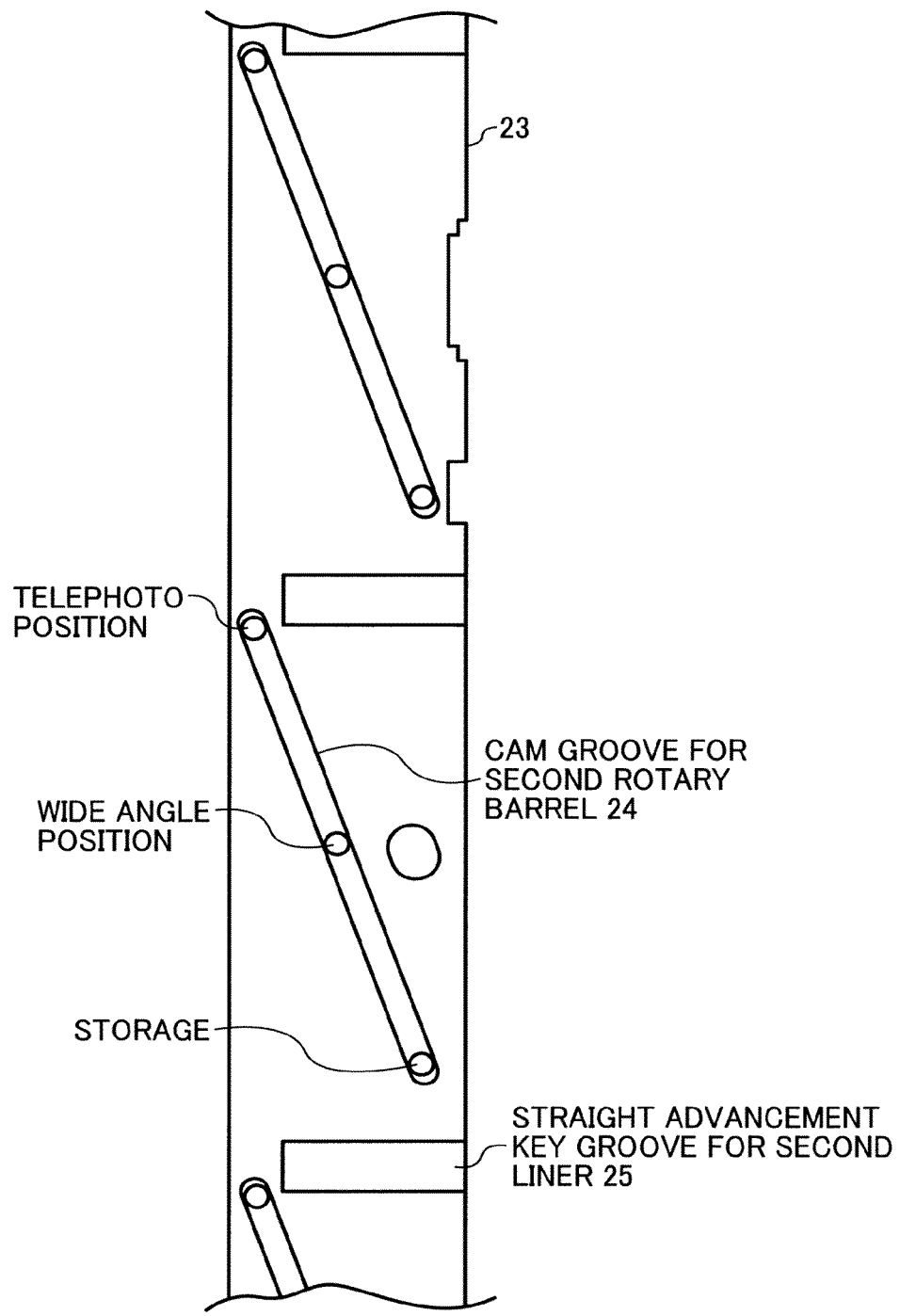
FIG. 12 is a development view schematically showing the shapes of the respective cam and key grooves formed in a first liner by developing the cam and key grooves while omitting helicoids.
Figure 13A:
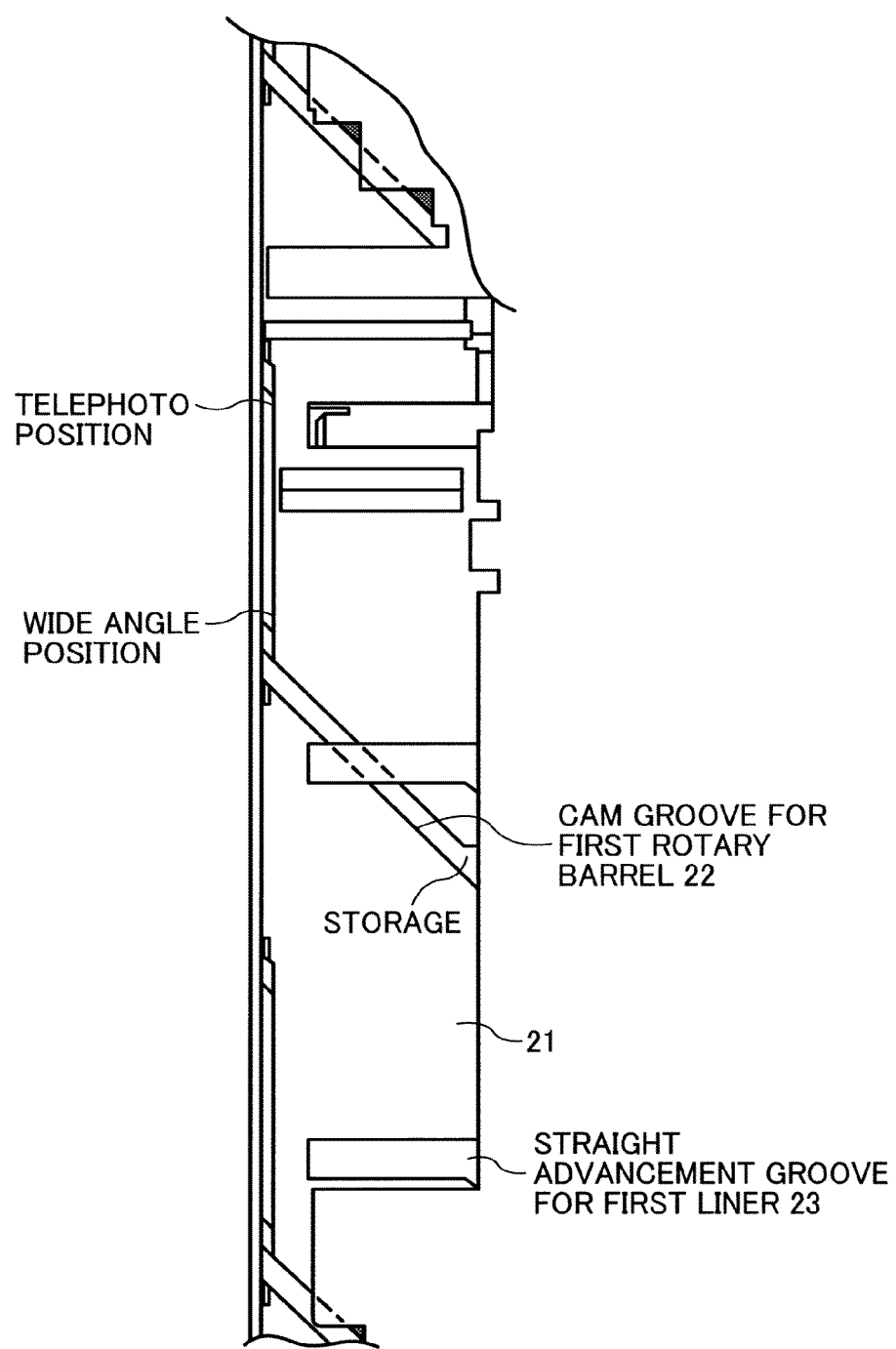
FIG. 13A is a development view schematically showing the shapes of the respective cam and key grooves formed in a fixed barrel portion of a fixed frame by developing the cam and key grooves while omitting helicoids.
Figure 13B:
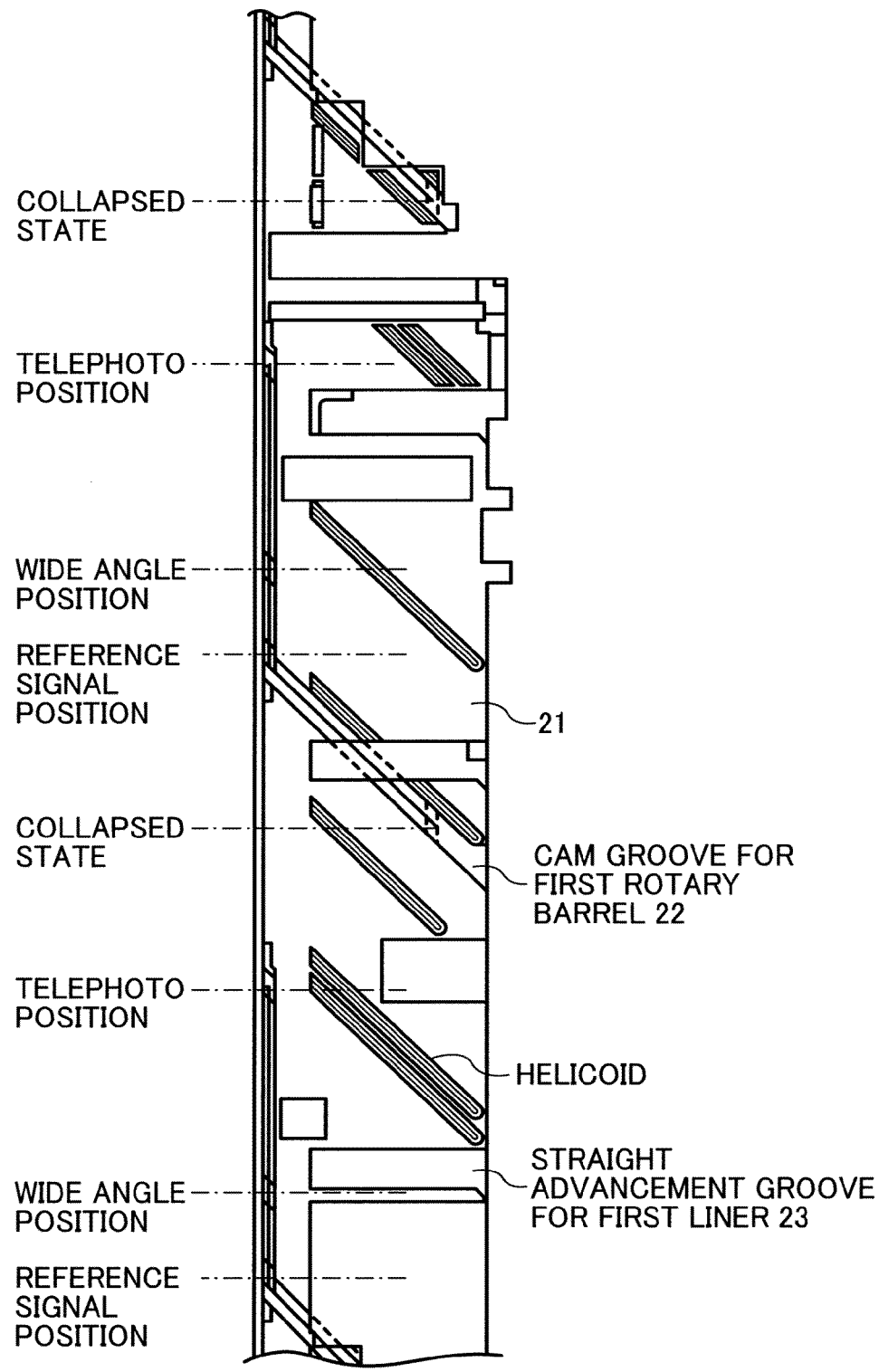
FIG. 13B is a detailed development view showing the shapes of the respective cam and key grooves, as well as the shapes of the helicoids, formed in the fixed barrel portion of the fixed frame.
Figure 13C:
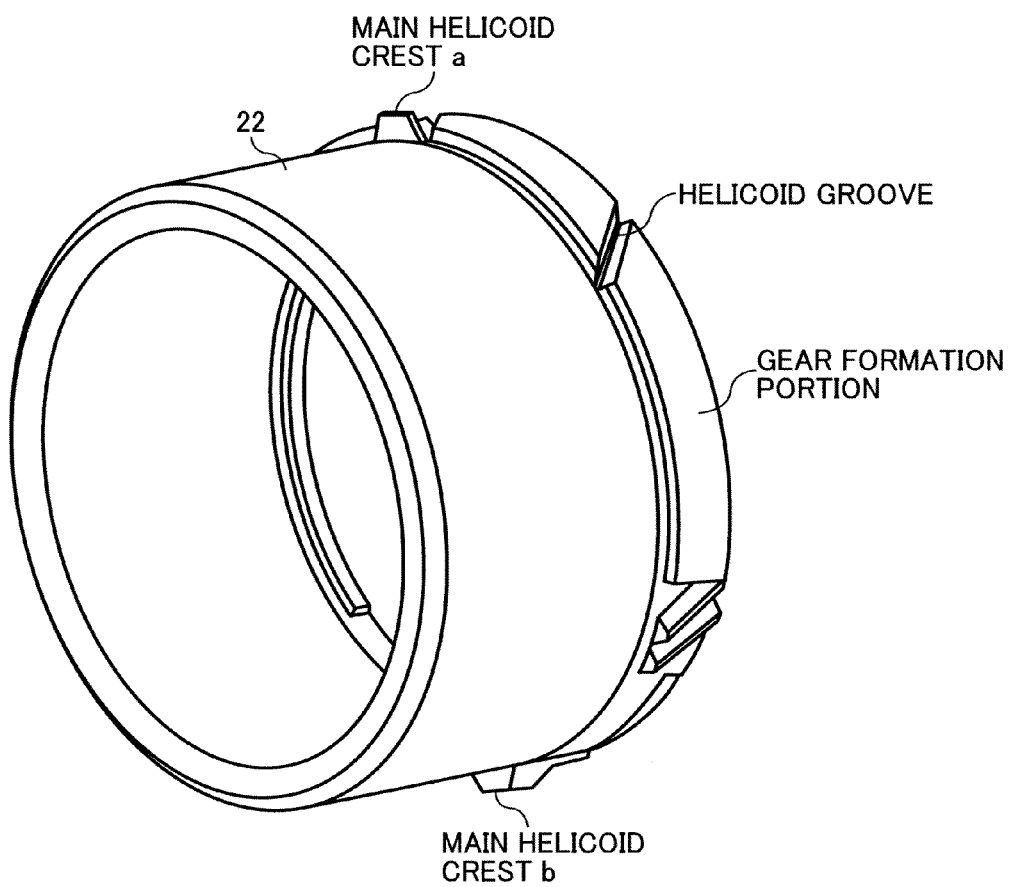
FIG. 13C is a perspective view of a first rotary barrel which is configured to be fitted to the helicoids.

The fixed frame 21 has a fixed barrel portion 21*a* on its inner side. The fixed barrel portion 21*a* is shaped like a circular cylinder. As shown in FIGS. 13A and 13B, straight advancement grooves extending in the axial direction and cam grooves are formed in an inner surface of the fixed barrel portion 21*a*. Helicoidal cam followers which, as shown in FIG. 13C, are formed in an outer peripheral surface of a base end portion of the first rotary barrel 22 engage with the helicoidal cam grooves. Key portions projectingly formed on an outer periphery of a base end portion of the first liner 23 engage with the straight advancement grooves in the fixed barrel portion 21*a* of the fixed frame 21. A guide groove extending along a surface orthogonal to an optical axis is formed in an inner surface of the first rotary barrel 22. Followers (or keys) as straight advancement guiding members which are projectingly provided on an outer peripheral surface of the first liner 23 in the vicinity of its base end portion engage with the guide groove. Straight grooves extending in the optical axis and helicoids are formed in an inner surface of the first liner 23. Furthermore, relief grooves through which to insert cam followers projectingly provided on an outer peripheral surface of the second rotary barrel 24 in the vicinity of its base end portion are formed in the first liner 23 (see FIG. 12).

Helicoids are formed in an outer peripheral surface of the base end portion of the second rotary barrel 24. These helicoids mesh with the helicoids provided in an inner periphery of the first liner 23. In addition, the cam followers are projectingly provided on the outer peripheral surface of the second rotary barrel 24 in the vicinity of its base end. The cam followers engage with straight grooves provided in an inner periphery of the first rotary barrel 22 through the relief grooves for the cam followers in the first liner 23. Key portions projectingly provided on an outer periphery of a base end portion of the second liner 25 engage with the straight grooves (see FIG. 12) provided in the inner periphery of the first liner 23. A guide groove (see FIG. 10) extending along a surface orthogonal to the optical axis is formed in an inner surface of the second rotary barrel 24. The guide groove engages with followers (or keys) as straight advancement guiding members which are projectingly provided on an outer peripheral surface of the second liner 25. Such a configuration enables the second liner 25 and the second rotary barrel 24 to integrally move in the optical direction, and concurrently to rotationally move around the optical axis relative to each other.

The cam barrel 26 is fitted in an inner periphery of the second liner 25. Locking protrusions are projectingly provided in an outer periphery of a base end portion of the cam barrel 26. The locking protrusions are fitted and locked in the base end portion of the second rotary barrel 24. Thereby, the cam barrel 26 performs a rotational operation integrally with the second rotary barrel 24. A guide groove extending along a surface orthogonal to the optical axis is formed in an inner surface of the second liner 25. The guide groove engages with followers (or keys) as straight advancement guiding members which are projectingly provided on an outer peripheral surface (front side) of the cam barrel 26. Such a configuration enables the second liner 25 and the cam barrel 26 to integrally move in the optical direction, and concurrently to rotationally move around the optical axis relative to each other.

A base end-side portion of the straight advancement barrel 27 is inserted between the second liner 25 and the second rotary barrel 24. Cam followers are projectingly provided on an outer peripheral surface of the straight advancement barrel 27 in the vicinity of its base end portion. The cam followers engage with cam grooves (see FIG. 10) formed in an inner peripheral surface of the second rotary barrel 24. In addition, straight advancement grooves extending in the axial direction are formed in an inner peripheral surface of the straight advancement barrel 27. Key portions on the outer peripheral surface of the second liner 25 engage with the straight advancement grooves. A gear portion is formed in an outer periphery of the base end portion of the first rotary barrel 22. A driving force of the zoom motor 51 is transmitted to the first rotary barrel 22 via an appropriate gear which meshes with the gear portion. Thereby, the first rotary barrel 22 is rotated. This configuration makes the first lens group 11, the second lens group 12 and the shutter/stop unit 15 perform a zooming operation in a predetermined manner.

Figure 10:
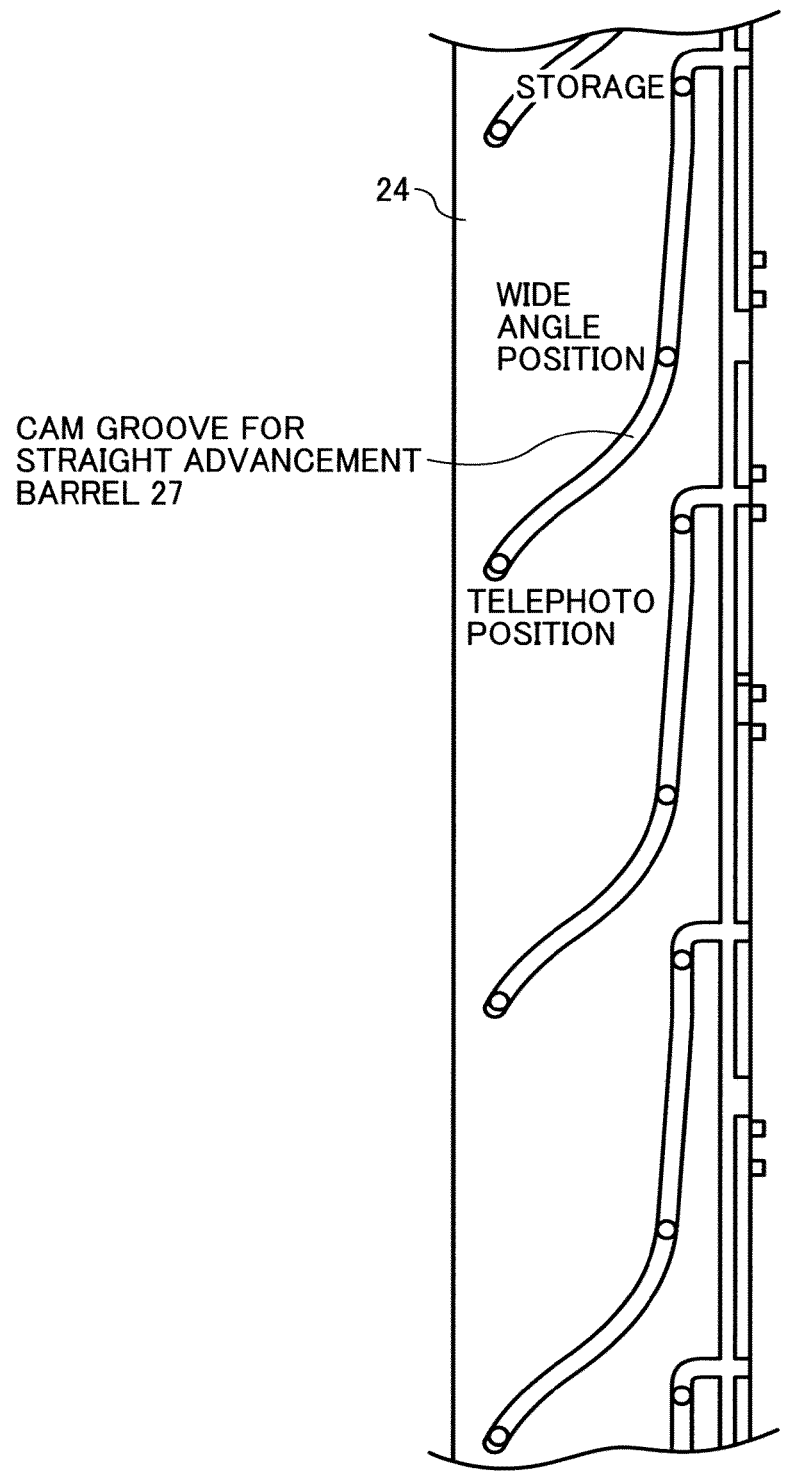
FIG. 10 is a development view schematically showing the shapes of the respective cam grooves formed in a second rotary barrel by developing the cam grooves.
Figure 11:
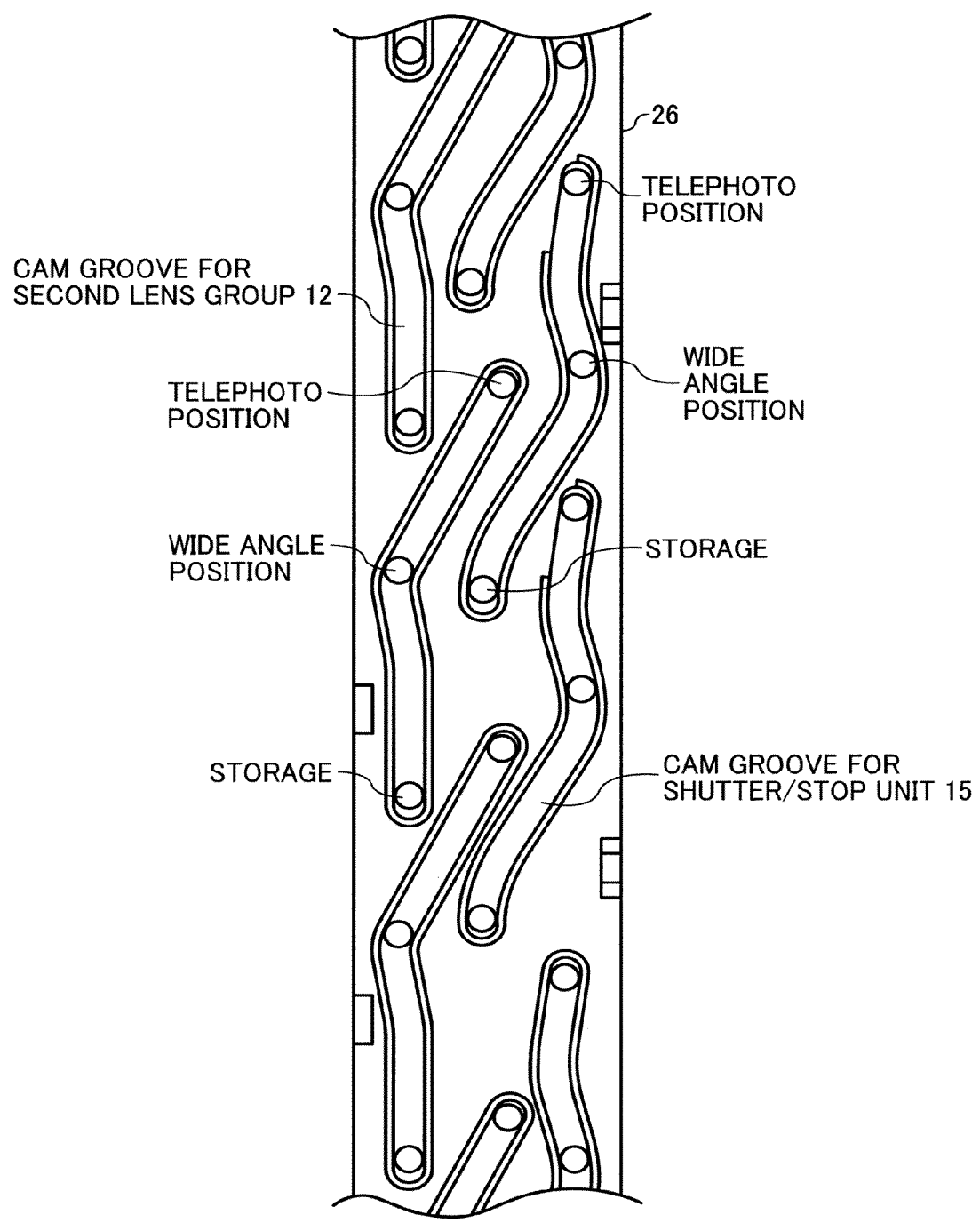
FIG. 11 is a development view schematically showing the shapes of the respective cam grooves formed in a cam barrel by developing the cam grooves.

FIG. 10 shows the cam grooves of the second rotary barrel 24 which engage with the cam followers of the straight advancement barrel 27. FIG. 11 shows: the cam grooves of the cam barrel 26 which engage with the cam followers of the lens retaining frame for the second lens group 12; and the cam grooves of the cam barrel 26 which engage with the cam followers of the shutter/stop unit 15. FIG. 12 shows: the relief grooves for the cam followers of the second rotary barrel 24 which are formed in the first liner 23; and the straight grooves of the first liner 23 which engage with the key portions of the second liner 25. FIGS. 13A and 13B each show the straight advancement grooves of the fixed barrel portion 21*a* of the fixed frame 21 which engage with the key portions of the first liner 23; and the cam grooves of the fixed frame 21 which engage with the cam followers of the first rotary barrel 22.

Figure 7:
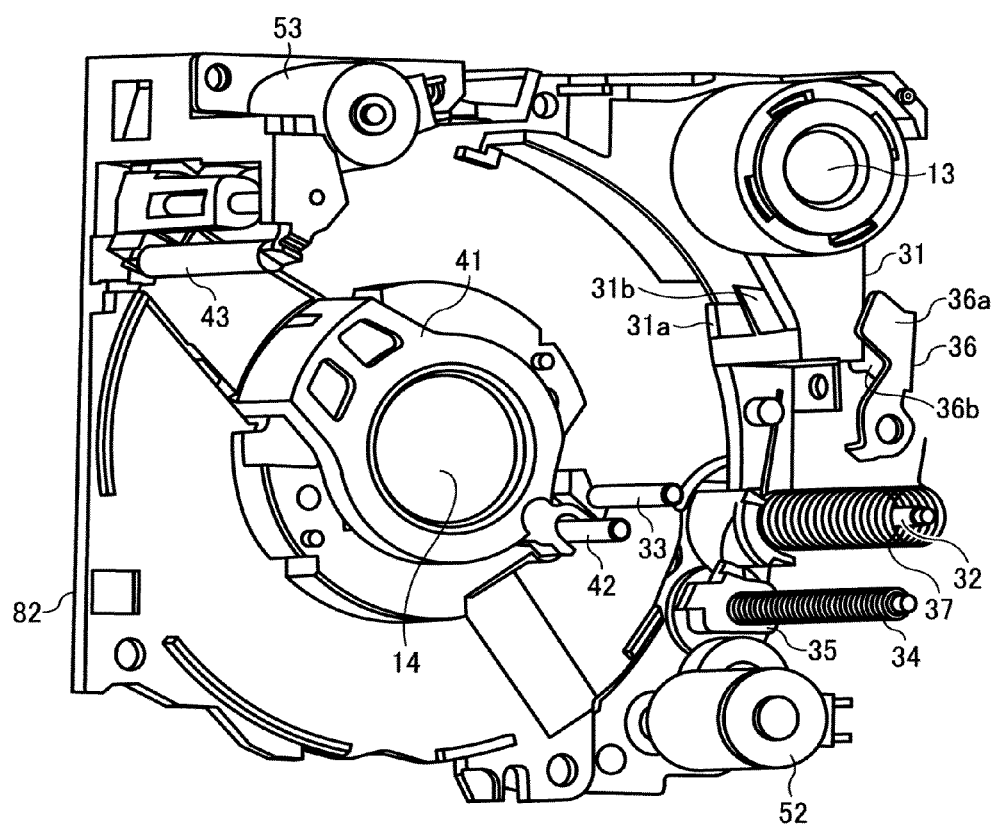
FIG. 7 is a perspective view, from the object side, of an arrangement configuration of a third lens retaining frame, a collision preventing piece and a fourth lens retaining frame portion of the lens group during the collapsed storage state D, and is used in order to explain how the third lens retaining frame configured to retain a third lens group and the collision preventing piece operate together.
Figure 8:
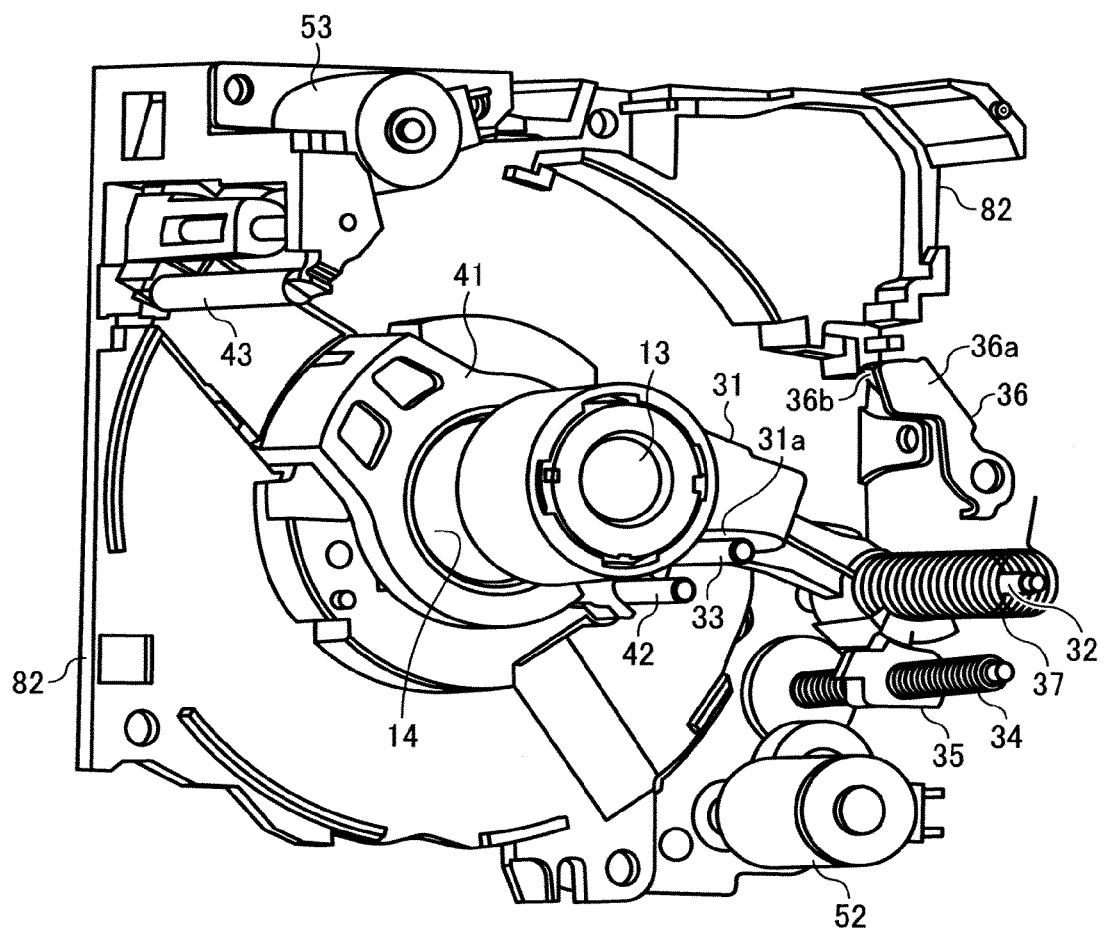
FIG. 8 is a perspective view, from the object side, of an arrangement configuration of a third lens retaining frame, a collision preventing piece and a fourth lens retaining frame portion in the photographic state P in which the lens group is projected, and is used in order to explain how the third lens retaining frame configured to retain a third lens group and the collision preventing piece operate together.

The third lens group 13 is held by the third lens retaining frame 31. The third lens retaining frame 31 retains the third lens group 13 in one end (a third lens retaining portion 93, which will be described later) thereof. The third group primary guide shaft 32 is inserted through the other end (a third lens retaining frame rotating base 95, which will be described later) of the third lens retaining frame 31 in a way that the end of the third lens retaining frame 31 is rotatable around, and slidably movable on, the third group primary guide shaft 32. This third group primary guide shaft 32 is provided virtually in parallel with the optical axis of the third lens group 13. The third lens retaining frame 31 rotates around the third group primary guide shaft 32 between a photographic position (photographic state P) and a storage position (collapsed storage state D). The photographic position is that in which, as shown in FIG. 8, the third lens group 13 is inserted on a photographic optical axis OA while in the photographic state P. The storage position is that in which, as shown in FIG. 7, the third lens group 13 is retracted from the fixed barrel portion 21a of the fixed frame 21 to the outside of the fixed barrel portion 21a. When the third lens retaining frame 31 is retracted to the storage position, namely, a retraction position retreating from the photographic optical axis, the third lens retaining frame 31 is stored in an area inside the fixed frame 21 but outside the fixed barrel portion 21a. This storage area is a storage space 21b (see FIG. 16A). This storage space 21b communicates with an area inside the fixed barrel portion 21a through a notched opening 21c (see FIG. 16A) formed in the fixed barrel portion 21. A crank-shaped winding portion (a third lens retaining frame arm portion 94) is formed in the vicinity of the third lens group 13 which is located in a rotating end-side portion of the third lens retaining frame 31. In this case, the crank-shaped winding portion makes the position of its rotary shaft-side part different from the position of its other part which is close to the portion for retaining the third lens group 13 in terms of the direction parallel to the main guide shaft. A stopper 31a (see FIG. 15) and a light shielding piece 31b are provided projecting from a winding part of the winding portion almost toward the rotary end.

From the viewpoint of the optical performance, when a longer focal distance is obtained for telephotography, the position of the third lens group 13 for the telephotography needs to be located closer to the photographic subject. Nevertheless, the movable distance of the third lens retaining frame 31 is determined by restriction on a length which the lens barrel 10 needs in the photographic optical axis OA direction when the lens barrel 10 is put in the collapsed state. For this reason, when a position at which the third lens retaining frame 31 retains the lenses is set closest to the photographic subject, it is possible to make the focal distance for the telephotography long as much as possible. If, however, a position of the stopper 31a in the photographic optical axis OA direction is set at almost the same position as that of the third lens group 13, the third group secondary guide shaft 33 is made longer, that is to say, a thickness dimension of the third lens retaining frame 31 as viewed in the photographic optical axis OA direction is made larger. Accordingly, the lens barrel 10 as put in the collapsed state is made larger in the thickness dimension. The third group secondary guide shaft 33 is made of a metal material, and is shaped like a rod, as well as is provided to the barrel base 82 in a way that the third group secondary guide shaft 33 extends in the photographic optical axis OA direction. This makes it necessary for the stopper 31a to be set as close to a focus position (close to the solid state image sensor 16) as possible. For this reason, the third lens retaining frame 31 is formed in the shape having the crank-shaped winding portion (the third lens retaining frame arm portion 94, which will be described later). Incidentally, the third lens retaining frame 31 may be made up of two components. In the case where the third lens retaining frame 31 is made up of two components, one component is a member including the crank-shaped winding portion, and the other component is a member for retaining the third lens group 13. These two components are fixed to each other, and operate as if they are a unitary part.

Figure 14A:
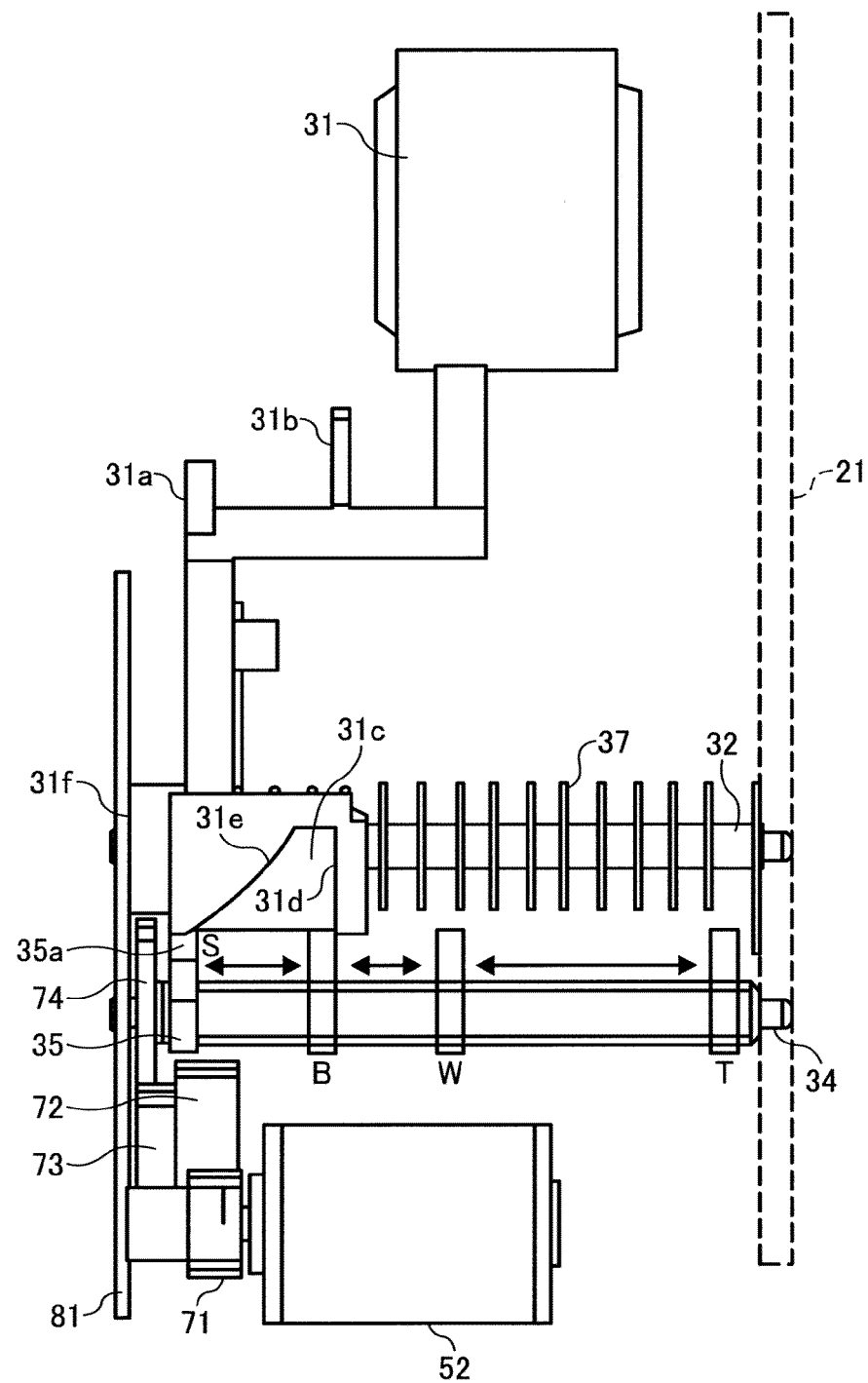
FIG. 14A is a side view showing a configuration of a third lens retaining frame and a configuration of a drive operating system for the third lens retaining frame.
Figure 14B:
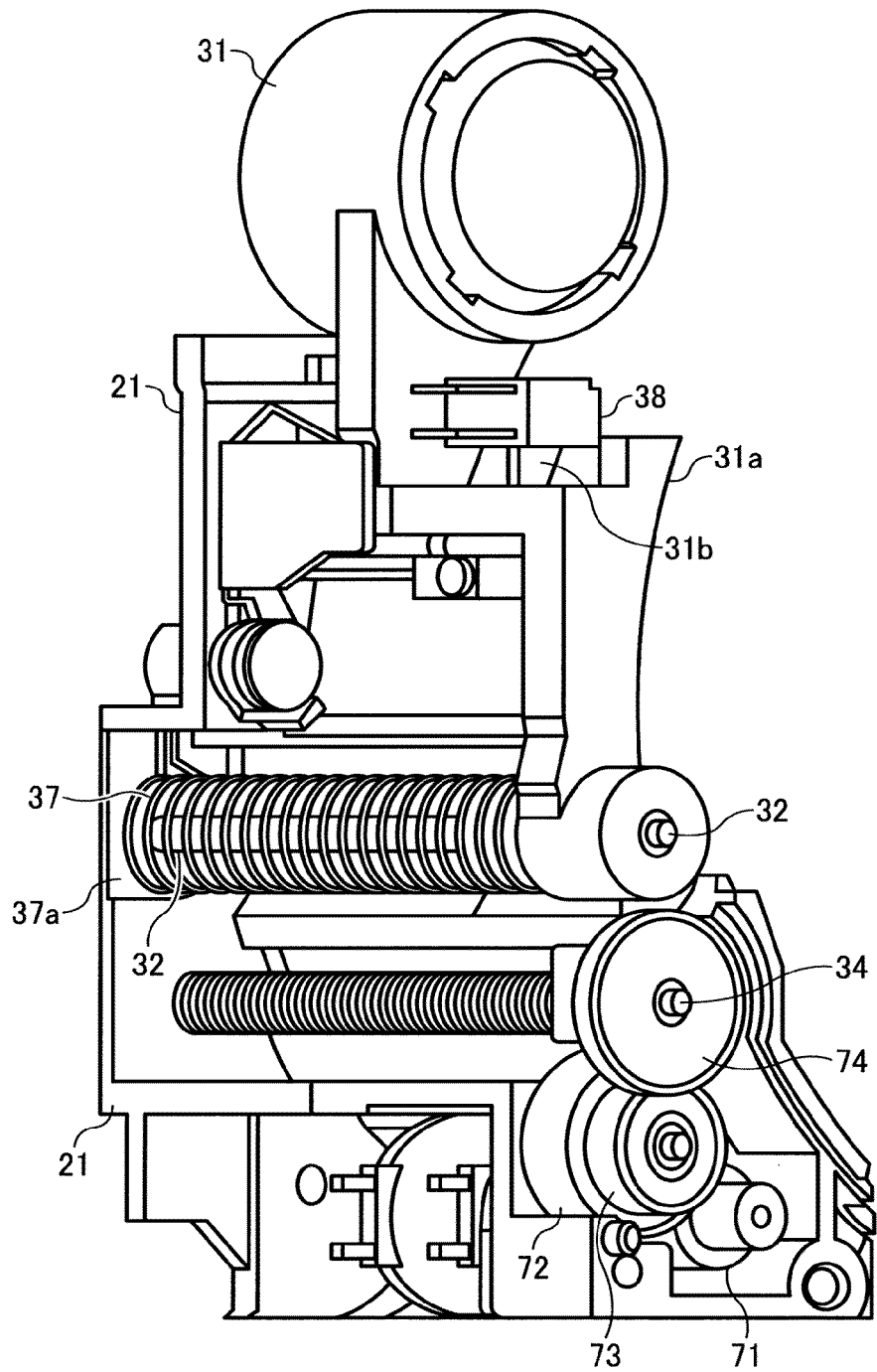
FIG. 14B is a perspective view showing the configuration of the third retaining frame and the configuration of the drive operating system which are shown in FIG. 14A.

As shown in FIGS. 14A and 14B, when the third lens retaining frame 31 is put in the retracted position (the collapsed storage state D), the third group female screw member 35 screwed to the third group lead screw 34 is located closest to the image surface (the solid state image sensor 16). In addition, while the third lens retaining frame 31 is put in this state, the compression torsion spring 37 is charged most. Thus, the compression torsion spring 37 always gives moment, which acts counterclockwise when viewed from the barrel front, to the third lens retaining frame 31 (the third lens retaining frame rotating base 95). A portion of the third lens retaining frame 31 which is supported by the third group primary guide shaft 32 (namely, the third lens retaining frame rotating base 95, which will be described later) has a step portion 31c as shown in FIG. 14A in its cylinder-shaped outer peripheral surface, and a cam portion 31e shaped like a cam slope is formed on a base end-side inner surface of the step portion 31c. While the third lens retaining frame 31 is put in this state, if the third group motor 52 is caused to rotate clockwise (clockwise when viewed from the barrel front) in FIG. 14B, the third group lead screw 34 rotates clockwise through a gear mechanism including the gears 71 to 74. Thus, the third group female screw member 35 moves toward the photographic subject in the photographic optical axis OA direction. On this occasion, the third lens retaining frame 31 rotates counterclockwise due to the moment from the compression torsion spring 37, and the cam portion 31e thereof abuttingly engages with an abutment portion 35a (an abutment peripheral portion 35e, which will be described later) of the third group female screw member 35. Thereafter, as the third group female screw member 35 moves closer to the photographic subject, the light shielding piece 31b of the third lens retaining frame 31 moves until the light shielding piece 31b comes out of the third group photo interrupter 38 serving as a position detector for the third group. For this reason, a reference signal produced by the third group photo interrupter 38 changes from an L (low-level) signal to an H (high-level) signal. The position of the third group lens group 13 is controlled by pulse count using the reference signal from the third photo interrupter 38 as a reference.

Figure 16A:
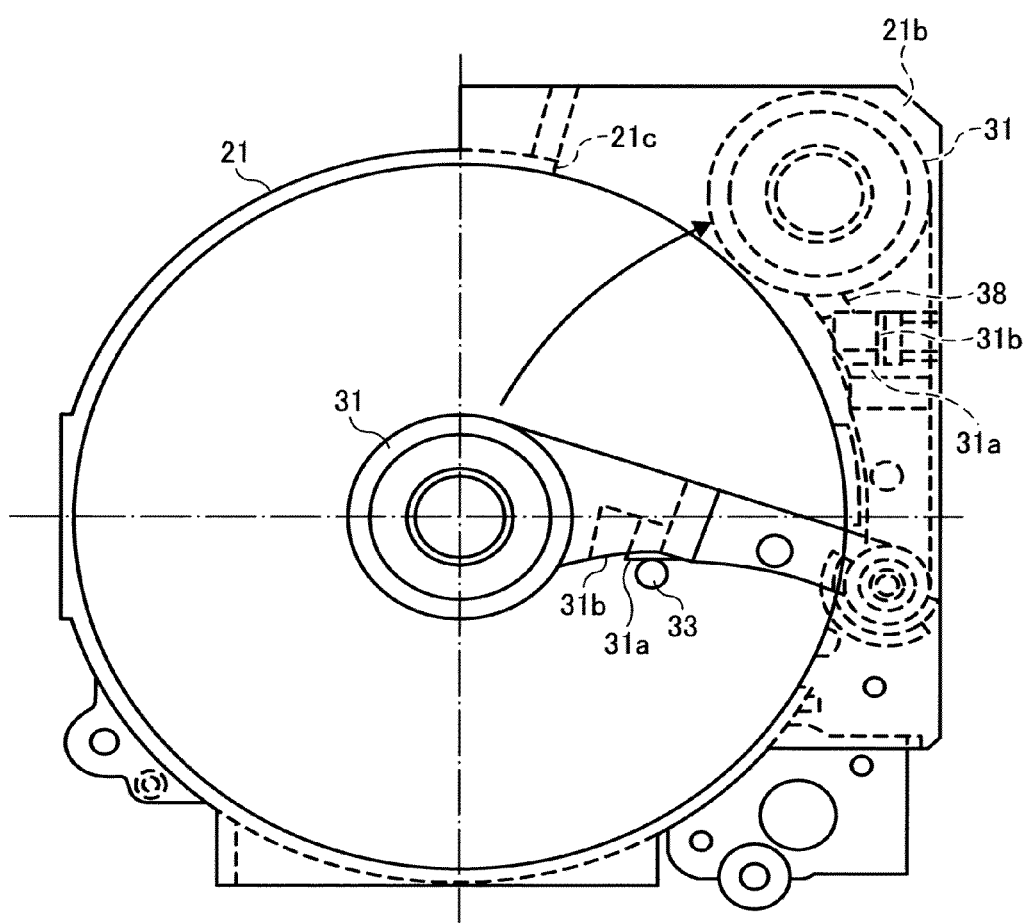
FIG. 16A is a front view of the third lens retaining frame portion from the object side, and is used in order to explain how the third lens retaining frame operates.
Figure 16B:
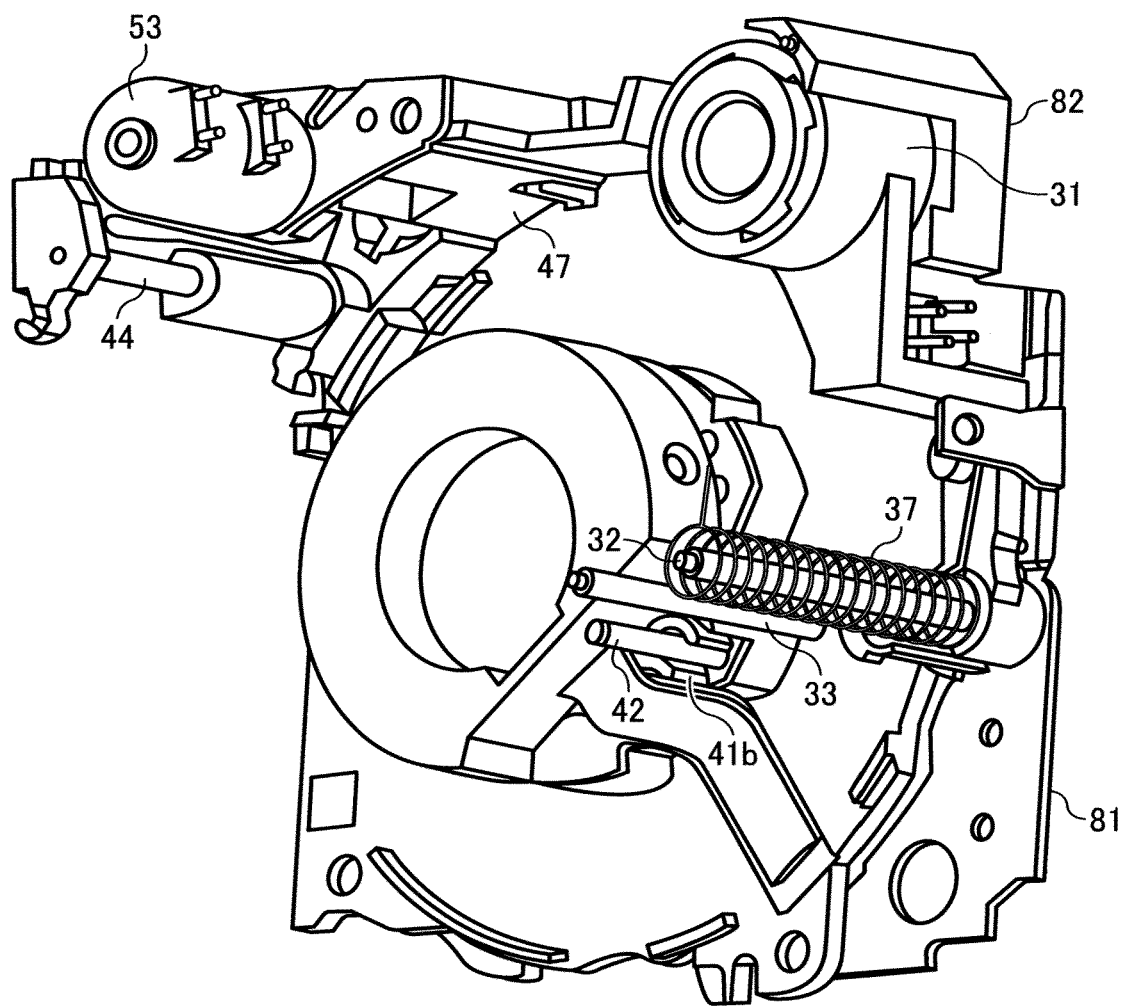
FIG. 16B is a perspective view mainly showing a shutter portion.

While in this state, if the third group female screw member 35 is caused to move to a B position in FIG. 14A, the third lens retaining frame 31 further rotates counterclockwise. Thus, as shown in FIGS. 8 and 16A, the stopper 31a comes into contact with the third group secondary guide shaft 33. Thereby, the position of the third lens retaining frame 31 on the photographic optical axis OA is fixed. The approach of the third lens group 13 toward the photographic optical axis OA ends with this determination. Note that the light shielding piece 31b is configured to be capable of detecting and confirming that the third lens retaining frame 31 is situated in the storage position by shielding the third group photo interrupter 38, which is shown in FIGS. 14B and 16A, from light. Once the third group female screw member 35 finishes moving to the B position in FIG. 14A, the abutment portion 35a (an upper surface 35c, which will be described later) of the third group female screw member 35 abuttingly engages with a front-side engagement portion 31d of the step portion 31c of the third lens retaining frame 31. In other words, the step portion 31c of the third lens retaining frame 31 has the cam portion 31e, which is formed in the shape of the cam slope, in its base end, and has the front-side engagement portion 31d, in which a flat surface almost orthogonal to the third group primary guide shaft 32 is formed, in its front end, as well as is formed in a concave shape which corresponds to the cylinder-shaped peripheral surface. The third lens retaining frame 31 is always biased in a rotational direction from the storage position to the position (photographic position) on the photographic optical axis OA (hereinafter referred to as "is rotationally biased") by the compression torsion spring 37 placed around the third group primary guide shaft 32. Concurrently, the third lens retaining frame 31 is always biased in a direction (backward) from an object side to the pressure plate 81, which is located closer to the image surface, on the third group primary guide shaft 32 (hereinafter referred to as "straight biased") by the compression torsion spring 37.

It should be noted that, as shown in FIG. 14(b), a step 37a is formed in a part of the fixed frame 21 which is pressed by the compression torsion spring 37. In the step portion 37a, an area of the fixed frame 21 on which the compression torsion spring 37 abuts and its vicinity are formed as a recessed portion. The step portion 37a restricts the position of the compression torsion spring 37 in this part. In other words, the center position of the compression torsion spring 37 is designed not to largely shift from the center of the third group primary guide shaft 32.

Subsequently, when the third group female screw member 35 is caused to move to a wide-angle position (a W position in FIG. 14A), the abutment portion 35a of the third group female screw member 35 presses the front-side engagement portion 31d toward the photographic subject (the object). This makes it possible for the third lens retaining frame 31 to move up to the wide-angle position toward the photographic subject (the object) in the photographic optical axis OA.

In addition, while the third group female screw member 35 is situated between the B position in FIG. 14A and a telephoto position (a T position in FIG. 14A), the third group female screw member 35 is always pressed toward the image surface in the photographic optical axis OA direction by the compression torsion spring 37. Accordingly, the interstice occurring between the third group lead screw 34 and the pressure plate 81 as well as the interstice occurring between the third group female screw member 35 and the pressure plate 81 is brought toward the image surface. This makes it possible for the third lens retaining frame 31 to secure its positional precision in the photographic optical axis OA direction.

Figure 15:
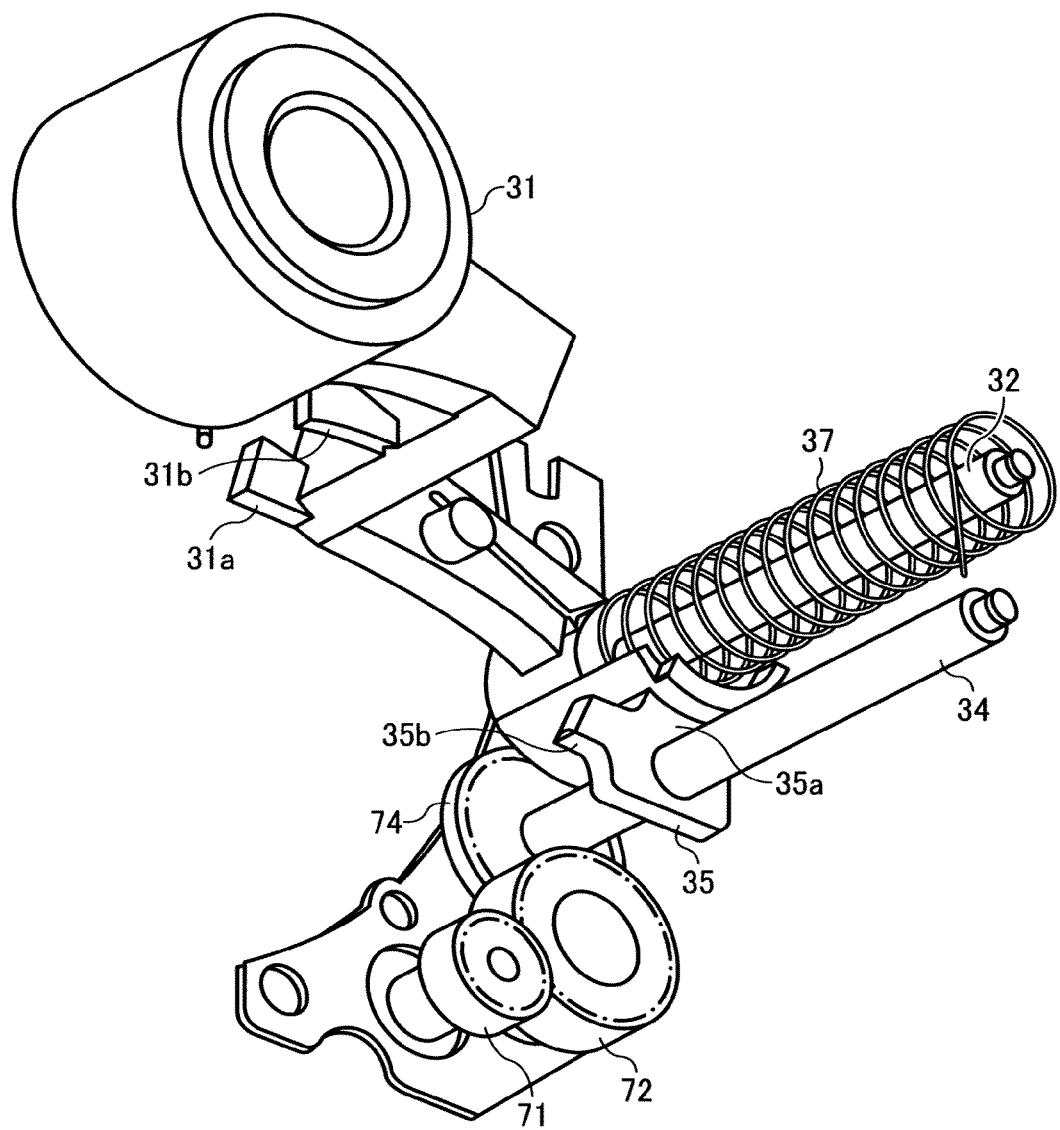
FIG. 15 is a perspective view showing a configuration of a third lens retaining frame and a configuration of a drive operating system for the third lens retaining frame.

The third group female screw member 35 is screwed to the third group lead screw 34 placed substantially in parallel with the photographic optical axis OA, and includes the above-mentioned abutment portion 35a and a rotation-stopping protrusion 35b (see FIG. 15). The abutment portion 35a abuts on the front-side engagement portion 31d or the cam member 31e in the step portion 31c of the third lens retaining frame 31. The rotation-stopping protrusion 35b is configured to fittingly slide in a guide groove (not illustrated) which is formed in the fixed barrel portion 21a of the fixed frame 21, and which is parallel with the photographic optical axis OA. The rotation-stopping protrusion 35b functions as a rotation stopper for preventing the third group female screw member 35 from rotating in conjunction with the rotation of the third group lead screw 34. In other words, the third group female screw member 35 is stopped from rotating, because the rotation-stopping protrusion 35b is fitted in the guide groove in the fixed frame 21. Accordingly, the third group female screw member 35 moves forward and backward along the photographic optical axis OA.

As detailedly shown in FIG. 14A, while the third group female screw member 35 is moving from the telephoto position T to the retraction starting position B through the wide-angle position W due to the reverse rotation (counterclockwise rotation) of the third group lead screw 34, the abutment portion 35a of the third group female screw member 35 abuts on the front-side engagement portion 31d of the step portion 31c of the third lens retaining frame 31 by use of its abutment engagement surface (the below-described upper surface 35c), because the abutment portion 35a is straight biased toward to the image surface in the photographic optical axis OA direction by the compression torsion spring 37. Accordingly, the third lens retaining frame 31 gradually moves toward the image surface from the object side. On this occasion, the third lens retaining frame 31 keeps its position on the photographic optical axis OA, which is restricted by the third group secondary guide shaft 33, because the third lens retaining frame 31 receives the rotationally-biasing force, which directs the third lens retaining frame 31 to the position on the photographic optical axis OA, from the compression torsion spring 37. Incidentally, once the third group female screw member 35 reaches the retraction starting position B, a base end surface 31f of the third lens retaining frame 31 abuts on the pressure plate 81.

When the third group female screw member 35 moves closer to the image surface (leftward in FIG. 14A) beyond the B position in FIG. 14A, the abutment portion 35a (the below-described upper surface 35c) of the third group female screw member 35 is detached from the front-side engagement portion 31d, and the below-described abutment peripheral portion 35e abuttingly engages with the cam portion 31e of the step portion 31c. On this occasion, the third lens retaining frame 31 (its base end surface 310 is in contact with the pressure plate 81, because the third lens retaining frame 31 is biased toward the image surface in the photographic optical axis OA direction by the compression torsion spring 37. Concurrently, the third lens retaining frame 31 receives the biasing force in the counterclockwise rotational direction which is produced by the compression torsion spring 37. Once the third group female screw member 35 moves much closer to the image surface, the third lens retaining frame 31 rotates clockwise against the biasing force in the counterclockwise rotational direction, which is produced by the compression torsion spring 37, in a position where the third lens retaining frame 31 is in contact with the pressure plate 81 in the photographic optical axis OA direction due to the guiding operation of the abutment portion 35a (the below-described abutment peripheral portion 35e) and the cam portion 31e which abuttingly engage with each other. This makes it possible for the third lens retaining frame 31 to carry out its retraction action.

In other words, while the third group female screw member 35 is moving from the retraction starting position B to the storage position S, the abutment portion 35a of the third group female screw member 35 rotates the third lens retaining frame 31 against the rotationally-biasing force which is produced by the compression torsion spring 37 while being slidingly in contact with the cam portion 31e of the step portion 31c of the third lens retaining frame 31. Thereby, the third lens retaining frame 31 rotates from the position on the photographic optical axis OA to the storage space 21b (see FIG. 16A). The storage position S of the third lens retaining frame 31 is a position to which the third lens retaining frame 31 moves corresponding to a predetermined number of counted pulses toward the image surface after the third group photo interrupter 38 starts to generate a storage reference signal which changes from the high level to the low level. After the third lens retaining frame 31 moves to the storage position S, the first lens group 11, the second lens group 12 and the shutter/stop unit 15 are allowed to move to their storage positions. These storage positions are retraction positions where the first lens group 11, the second lens group 12 and the shutter/stop unit 15 stay after the third lens group 13 is retracted from the photographic optical axis OA due to the rotation of the third lens retaining frame 31.

In this embodiment, for the storage action, the fourth lens retaining frame 41 moves to the storage position before the third lens retaining frame 31 moves to the storage position. A first storage position for the fourth lens retaining frame 41 is a position to which the fourth lens retaining frame 41 moves corresponding to a predetermined number of counted pulses toward the image surface after a fourth group reference detector (not illustrated) starts to generate a storage reference signal for the fourth lens retaining frame 41 which changes from the high level to the low level. After the fourth lens retaining frame 41 completes its storage action, the third lens retaining frame 31 is allowed to carry out its storage action.

In other words, the third group female screw member 35 moves toward the image surface corresponding to the number of counted pulses after the third group photo interrupter 38 (see FIG. 16A) starts to generate the storage reference signal which changes from the high level to the low level. Thus, the storage action of the third lens retaining frame 31 is completed. After the completion of this storage action, the first rotary barrel 22 is collapsed, and the component parts located inside the first rotary barrel 22 and the first liner 23, that is to say, in front of their base end surfaces, are collapsed beyond the positions where the component parts stay immediately before coming into contact with the third lens retaining frame 31. These collapses are carried out after the third lens retaining frame 31 completes its storage action. This makes it possible for the first rotary barrel 22 and the like to be safely collapsed without interference with the third lens retaining frame 31. In Embodiment 1 in which the zoom motor 51 is formed from a generally-used DC (direct current) motor, the positions of the first rotary barrel 22 and the like are set by counting drive pulses generated by a zoom count detector which includes: a pinion gear directly fixed to the output shaft of the zoom motor 51, and having an encoder shape; and a photo interrupter 51a (see FIG. 1) placed in the vicinity of the pinion gear, for example. Incidentally, in Embodiment 1, a driving source for moving the first rotary barrel 22 is a DC motor, and the detection of the driven position is achieved by use of the detector including the encoder and the photo interrupter. However, it is clear that the same function can be achieved even if all the DC motor and the detector thus configured are replaced with a pulse motor.

Figure 2:
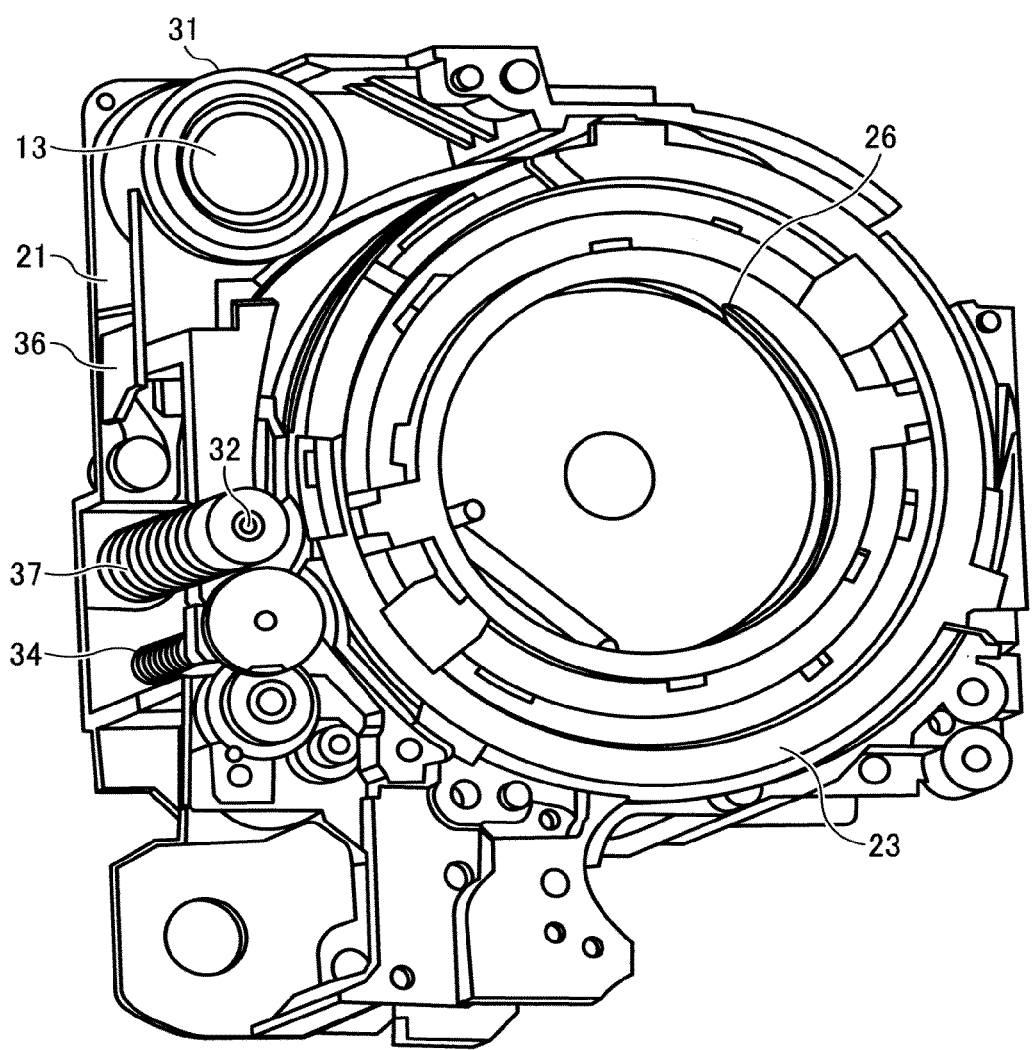
FIG. 2 is a perspective view, from an image forming surface, of a configuration of a main part of the lens barrel 10 portion put in the state shown in FIG. 1.

In the meantime, as shown in FIGS. 2, 7 and 8 as well as other drawings, the collision preventing piece 36 is rotatably supported by the fixed frame 21 in the vicinity of the third group primary guide shaft 32, and includes an engagement protrusion 36b capable of engaging with the third lens retaining frame 31. This collision preventing piece 36 is always biased by biasing means, such as a spring, in a rotational direction in which a locking protrusion 36a in the vicinity of the rotary end is projected toward the photographic optical axis OA. The rotationally-biasing force given to the collision preventing piece 36 by this biasing force is set smaller than the rotationally-biasing force given to the third lens retaining frame 31 by the compression torsion spring 37. For this reason, when the third lens retaining frame 31 is situated in the storage position, the collision preventing piece 36 is pushed out by the third lens retaining frame 31 engaging with the engagement protrusion 36b, and is displaced outside the third lens retaining frame 31 (see FIGS. 2 and 7 as well as other drawings). In addition, once the third lens retaining frame 31 rotates and moves to the position on the photographic optical axis OA, the engagement between the third lens retaining frame 31 and the engagement protrusion 36b is released, and the collision preventing piece 36 rotates due to the biasing force from the above-mentioned biasing means in the direction in which the locking protrusion 36a is projected toward the photographic optical axis OA. Accordingly, the collision preventing piece 36 causes the locking protrusion 36a to project from the inner surface of the fixed barrel portion 21a of the fixed frame 21 (see FIG. 8). On this occasion, the first rotary barrel 22, the first liner 23, the second rotary barrel 24, the second liner 25, the cam barrel 26 and the straight advancement barrel 27 are all situated closer to the object beyond the projected position of the locking protrusion 36a. For this reason, the locking protrusion 36a projects inward beyond the outer peripheries of the base ends of the first rotary barrel 22 and the first liner 23 (see FIGS. 5, 6 and 8 as well as other drawings).

This configuration makes the collision preventing piece 36 (the locking protrusion 36a) come into contact with the first rotary barrel 22 first, even if the first rotary barrel 22 is manually forced to rotate and thus move to the storage position. For this reason, the base end portion of the first rotary barrel 22 cannot be moved toward the image surface beyond the position of the collision preventing piece 36 in the photographic optical axis OA direction. This makes it possible to prevent the base end portion of the first rotary barrel 22 from coming into contact with the third lens retaining frame 31. Accordingly, it is possible to prevent a breakdown, damage and the like of the third lens retaining frame 31 which would otherwise occur due to a strong external force. Incidentally, the first rotary barrel 22 is capable of moving to the storage position only after the third lens retaining frame 31 finishes normally moving to the storage position.

For this reason, while the lens barrel 10 is put in the photographic state P in which a part of the lens barrel 10 (a part of the movable cylinder) is projected, if large pressure is applied to the front end-side portion of the barrel due to the fall and the like of the barrel, the locking protrusion 36a of the collision preventing piece 36 engages with the first rotary barrel 22 and the first liner 23. Accordingly, the first rotary barrel 22 and the first liner 23 (as well as the second rotary barrel 24, the second liner 25 and the straight advancement barrel 27) are stopped from retreating toward the third lens group 13 any further. As a result, it is possible to prevent damage and the like of the third lens retaining frame 31 and the third lens group 13.

The third group lead screw 34 is rotationally driven in any one of the forward and reverse direction by the third group motor 52. The rotation of the third group motor 52 is transmitted to the third group lead screw 34 via the gear 71, the gear 72, the gear 73 and the gear 74 sequentially.

Next, descriptions will be provided for a drive configuration of the fourth lens group 14. The descriptions will be given referring to FIGS. 20A and 20B, which are perspective views mainly showing a fourth driving system, in addition to FIGS. 8 and 9.

Figure 20A:
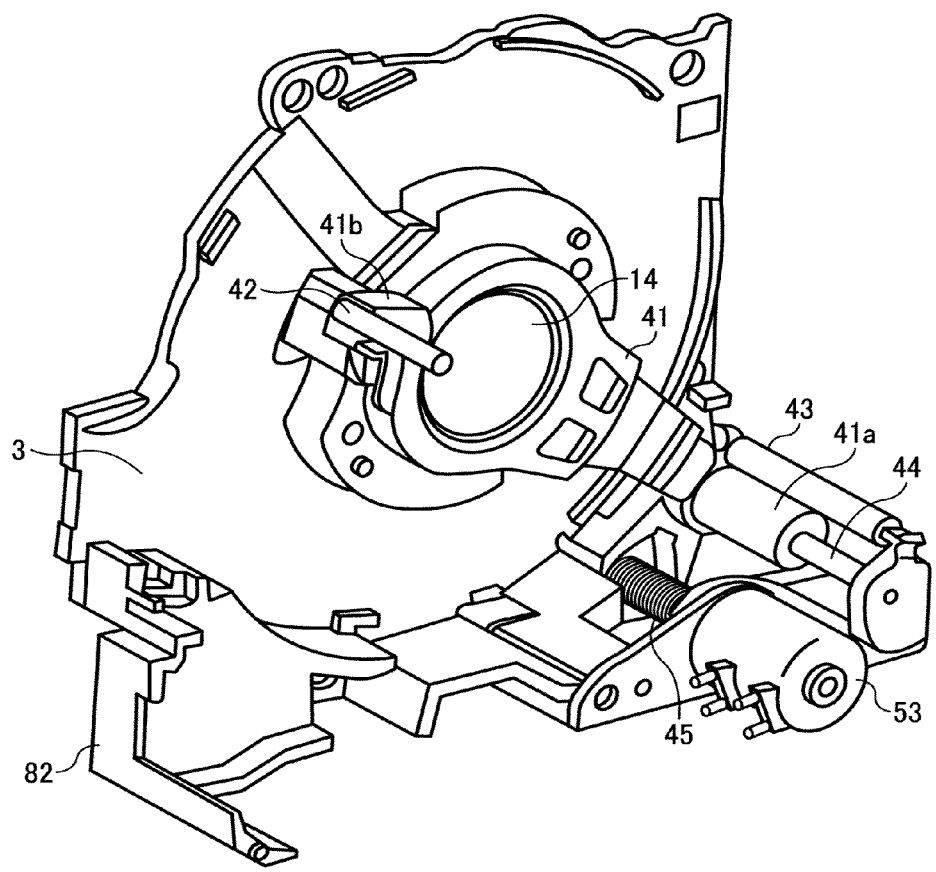
FIGS. 20A and 20B are explanatory views for explaining a configuration of a fourth lens retaining frame.
Figure 20B:
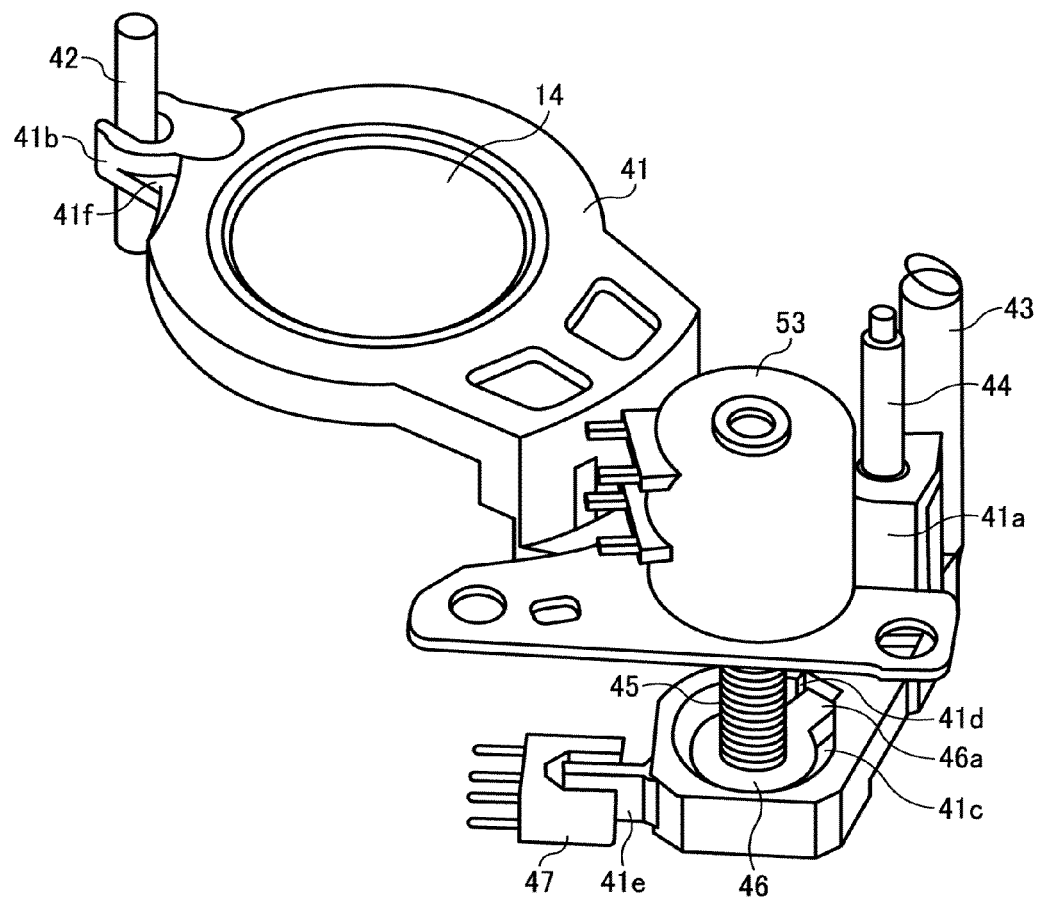

In the case of Embodiment 1, the fourth lens group 14 is used as a focusing lens for performing a focusing operation, in other words for adjusting the focus. As shown in FIGS. 20A and 20B as well as other drawings, the fourth lens group 14 is held by the fourth lens retaining frame 41. The fourth lens retaining frame 41 includes a sleeve portion 41a and a rotation-stopping portion 41b. The sleeve portion 41a is fitted to the fourth group primary guide shaft 44 which is fixed to the barrel base 82, and which is placed in parallel with the photographic optical axis OA. The rotation-stopping portion 41b is fitted to the fourth group secondary guide shaft 42 which is parallel with the photographic optical axis OA, and which is fixed to the barrel base 82. The rotation-stopping portion 41b restricts the rotation of the fourth lens retaining frame 41. This configuration makes it possible for the fourth lens retaining frame 41 to freely move along the fourth group primary guide shaft 44, that is to say, along the photographic optical axis OA. In Embodiment 1, the fourth group motor 53 formed from a stepping motor is provided as a driving source for driving the fourth lens retaining frame 41. The group lead screw 45 is formed in the output shaft of the fourth group motor 53. The fourth group female screw member 46 in which a female screw is formed is screwed to the fourth group lead screw 45.

The fourth lens retaining frame 41 is provided with a space in which to insert the fourth group female screw member 46. This space is formed including an engagement portion 41c, which is configured to engage with the fourth group female screw member 46 on a surface perpendicular to the photographic optical axis OA, in its object-side portion. The fourth lens retaining frame 41 which is inserted in this space is always biased toward the photographic subject by the fourth group spring 43, and accordingly always abuttingly engages with the fourth group female screw member 46. The fourth group female screw member 46 includes a protrusion 46a which protrudes in the radial direction. This protrusion 46a engages with a hole portion 41d which is provided in a lateral portion of the space of the fourth lens retaining frame 41 in which the fourth group female screw member 46 is inserted. Thereby, the protrusion 46a functions as a rotation stopper for stopping the rotation of the fourth group female screw member 46.

Once the fourth group motor 53 is rotationally driven, the configuration causes the fourth group lead screw 45 to rotate, and the fourth group female screw member 46 to move forward and backward in a direction in which the fourth group lead screw 45 extends, that is to say, in the photographic optical axis OA direction. Because the fourth lens retaining frame 41 engages with the fourth group female screw member 46, the fourth lens retaining frame 41 moves along the photographic optical axis OA while following the movement of the fourth group female screw member 46. Incidentally, the fourth group lead screw 45 is formed in the output shaft of the fourth group motor 53. However, the fourth group motor 53 and the fourth group lead screw 45 may be configured separately with a state that: the fourth group motor 53 and the fourth group lead screw 45 are connected together by use of a gear or the like; thereby, the rotation of the fourth group motor 53 is transmitted to the fourth group lead screw 45; and thus, the fourth group lead screw 45 is rotated.

A light shielding piece 41e is formed on the fourth lens retaining frame 41. The light shielding piece 41e is configured to shield the optical path of the fourth group photo interrupter 47, which is provided to the barrel base 82, from light. The optical path of the fourth group photo interrupter 47 can be shielded and unshielded from light by moving the fourth lens retaining frame 41 to a predetermined position. In this case, a position at which the fourth lens retaining frame 41 is located at a moment when the light shielding state is changed to the unshielding state due to the movement of the fourth lens retaining frame 41 is recognized as a reference position. After the fourth lens retaining frame 41 passes the reference position, the fourth group motor 53 is rotated by providing the fourth group motor 53 with a pulse electric current which corresponds to an arbitrary number of pulses. Thereby, the fourth lens retaining frame 41 can be moved to a desired position.

Note that a recessed portion 41f is formed in the outer periphery of the fourth lens retaining frame 41. The recessed portion 41f is used to avoid interference with the light shielding piece 31b for the photo interrupter of the third lens retaining frame 31 by escaping the light shielding piece 31b thereof toward the photographic optical axis OA. This makes it possible to increase the amount of movement of the fourth lens retaining frame 41, and to widen the focusable photographic distance range. In addition, as described above, the structure for the engagement between the fourth lens retaining frame 41 and the fourth group female screw member 46 allows for play in the photographic optical axis OA direction. However, because the fourth lens retaining frame 41 is always biased toward the photographic subject by the fourth group spring 43, it is possible to control the position of the fourth lens retaining frame 41 in the photographic optical axis OA accurately.

The respective storage positions of the first rotary barrel 22, the first liner 23, the first lens group 11, the second lens group 12 and the shutter/stop unit 15 are controlled on the basis of a zoom position reference signal produced by a zoom position detector which is installed in the fixed frame 21, and which includes a photo reflector. In other words, the storage operation of the first rotary barrel 22, the first liner 23, the first lens group 11, the second lens group 12 and the shutter/stop unit 15 can be completed by moving the first rotary barrel 22, the first liner 23, the first lens group 11, the second lens group 12 and the shutter/stop unit 15 toward the image surface corresponding to a predetermined number of counted drive pulses which are produced by the pinion gear functioning as the encoder and the zoom count detector placed in the vicinity of the pinion gear after the zoom position reference signal changes from the high level to the low level. When the fourth lens retaining frame 41 is stored, as described above, the fourth lens retaining frame 41 is situated in the first storage position first. Thereafter, while the first rotary barrel 22 is moving to its storage position, the base end surface of the first rotary barrel 22 or the first liner 23 comes into contact with and thus presses the fourth lens retaining frame 41, and finally the fourth lens retaining frame 41 moves to the second storage position. This operation makes it possible to move the fourth lens retaining frame 41 to its storage position accurately with no complicated adjustment and the like necessary even if a position in the photographic optical axis OA direction in which to install the fourth group photo interrupter 47 varies from one to another. This effect can be achieved because the length of the engagement space, which is provided in the fourth lens retaining frame 41, in the photographic optical axis OA is greater than the thickness of the fourth group female screw member 46.

In this case, the zoom motor 51 for moving the first lens group 11, the second lens group 12 and the shutter/stop unit 15 is configured by use of a DC motor. The third group motor 52 for driving the third lens group 13 and the fourth group motor 53 for driving the fourth lens group 14 are generally configured by use of a pulse motor. The zoom motor 51, the third group motor 52 and the fourth group motor 53 are driven in relation to one another, for example, by use of software. This achieves an appropriate zooming operation mainly by the first to third lens groups 11 to 13, and an appropriate focusing operation, for example, mainly by the fourth lens group 14.

Figure 21:
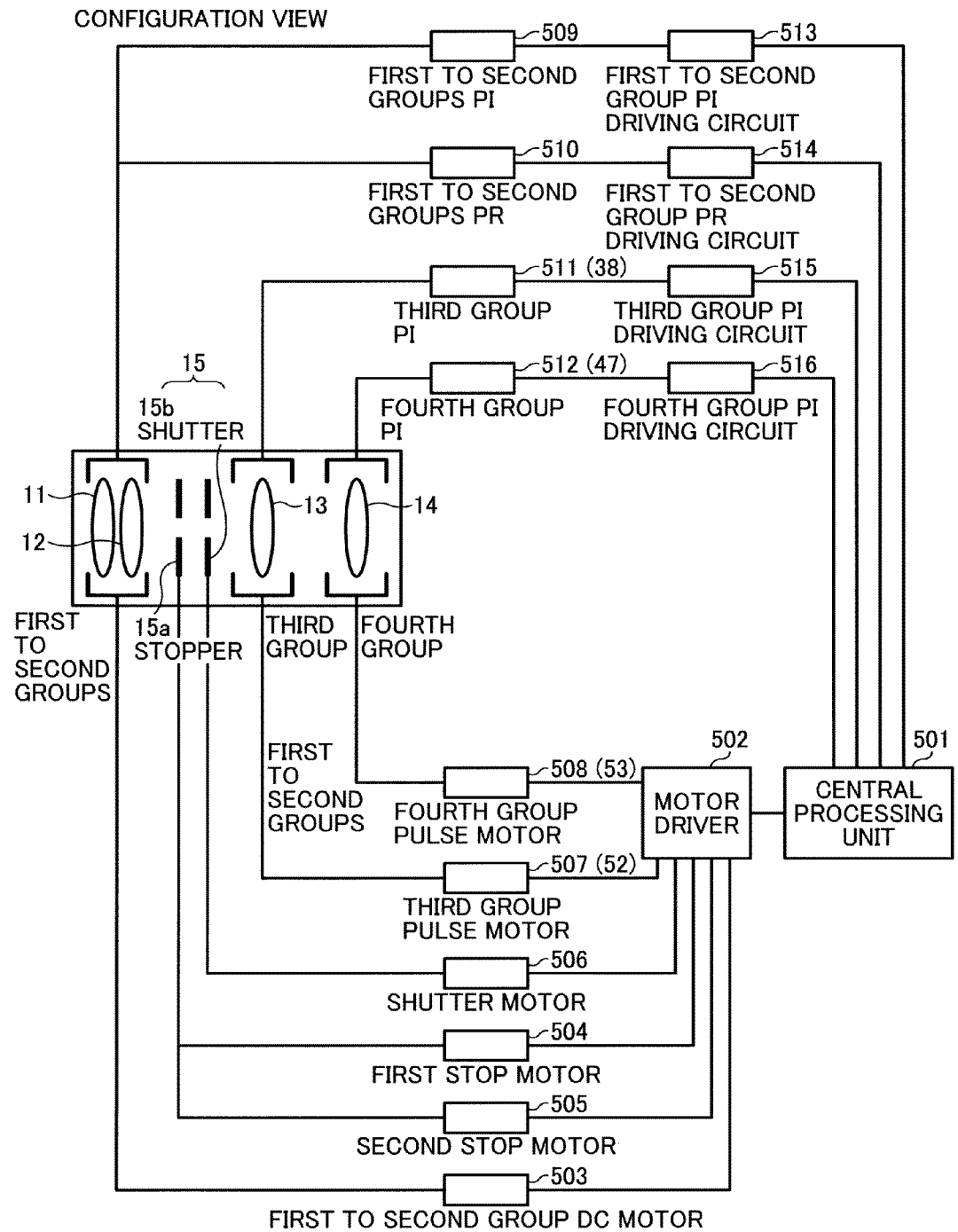
FIG. 21 is a block diagram schematically showing a configuration of a drive controlling system.

In this respect, the drives of the respective lens groups constituting the lens barrel 10 are controlled by a drive controlling system shown in FIG. 21. FIG. 21 is a block diagram schematically showing a configuration of the drive controlling system.

The drive controlling system shown in FIG. 21 includes a central processing unit 501, a motor driver 502, a first to second group DC motor 503, a first stop motor 504, a second stop motor 505, a shutter motor 506, a third group pulse motor 507, a fourth group pulse motor 508, a first to second group photo interrupter 509, a first to second group photo reflector 510, a third group photo interrupter 511, a fourth group photo interrupter 512, a first to second group photo interrupter driving circuit 513, a first to second group photo reflector driving circuit 514, a third group photo interrupter driving circuit 515, and a fourth group photo interrupter driving circuit 516.

The central processing unit 501 provides the motor driver 502 with instructions such as an initial setting of the motor driver 502, a drive motor selecting instruction, a drive voltage setting instruction and a drive direction instruction. In accordance with instructions from the central processing unit 501, the motor driver 502 controls the motor system including the first to second group DC motor 503, the first stop motor 504, the second stop motor 505, the shutter motor 506, the third group pulse motor 507 and the fourth group pulse motor 508. The first to second group DC motor 503 drives the first lens group 11 and the second lens group 12. The first lens group 11 and the second lens group 12 are driven independently of each other by use of a cam mechanism which is configured to react to the driving force of the first to second group DC motor 503. The first stop motor 504 and the second stop motor 505 drive the stop of the shutter/stop unit 15. The shutter motor 506 drives the shutter of the shutter/stop unit 15. The third group pulse motor 507 drives the third lens group 13. The fourth group pulse motor 508 drives the fourth lens group 14.

In addition, the central processing unit 501 supplies a driving electric power to the first to second group photo interrupter 509, the first to second group photo reflector 510, the third group photo interrupter 511 and the fourth group photo interrupter 512, which are the position detectors, respectively through the first to second group photo interrupter driving circuit 513, the first to second group photo reflector driving circuit 514, the third group photo interrupter driving circuit 515 and the fourth group photo interrupter driving circuit 516. Furthermore, the central processing unit 501 acquires position information signals which are respectively detected in the first to second group photo interrupter 509, the first to second group photo reflector 510, the third group photo interrupter 511 and the fourth group photo interrupter 512. The first to second group photo interrupter driving circuit 513, the first to second group photo reflector driving circuit 514, the third group photo interrupter driving circuit 515 and the fourth group photo interrupter driving circuit 516 have functions for respectively controlling the levels of the projection currents and output signals of the first to second group photo interrupter 509, the first to second group photo reflector 510, the third group photo interrupter 511 and the fourth group photo interrupter 512. Upon reception of an instruction from the central processing unit 501, the motor driver 502 executes the instruction, and thus sets a specified voltage for a motor which is selected from the first to second group DC motor 503, the first stop motor 504, the second stop motor 505, the shutter motor 506, the third group pulse motor 507 and the fourth group pulse motor 508. Thereby, the motor driver 502 controls the drive of the selected motor in accordance with a timing of a drive instruction.

As shown in FIG. 9, the solid state image sensor 16 such as a CCD solid state image sensor is placed in the back of the fourth lens group 14, that is to say, on a side farther from the object. The configuration is made in order for an image of the photographic subject to be formed on the reception surface of this solid state image sensor 16. The cover glass 18 and the low-pass filter 19 are provided on the reception surface of the solid state image sensor 16. In addition, various optical filters, other optical devices and the like are provided on the reception surface of the solid state image sensor 16 whenever deemed necessary.

Figure 3:
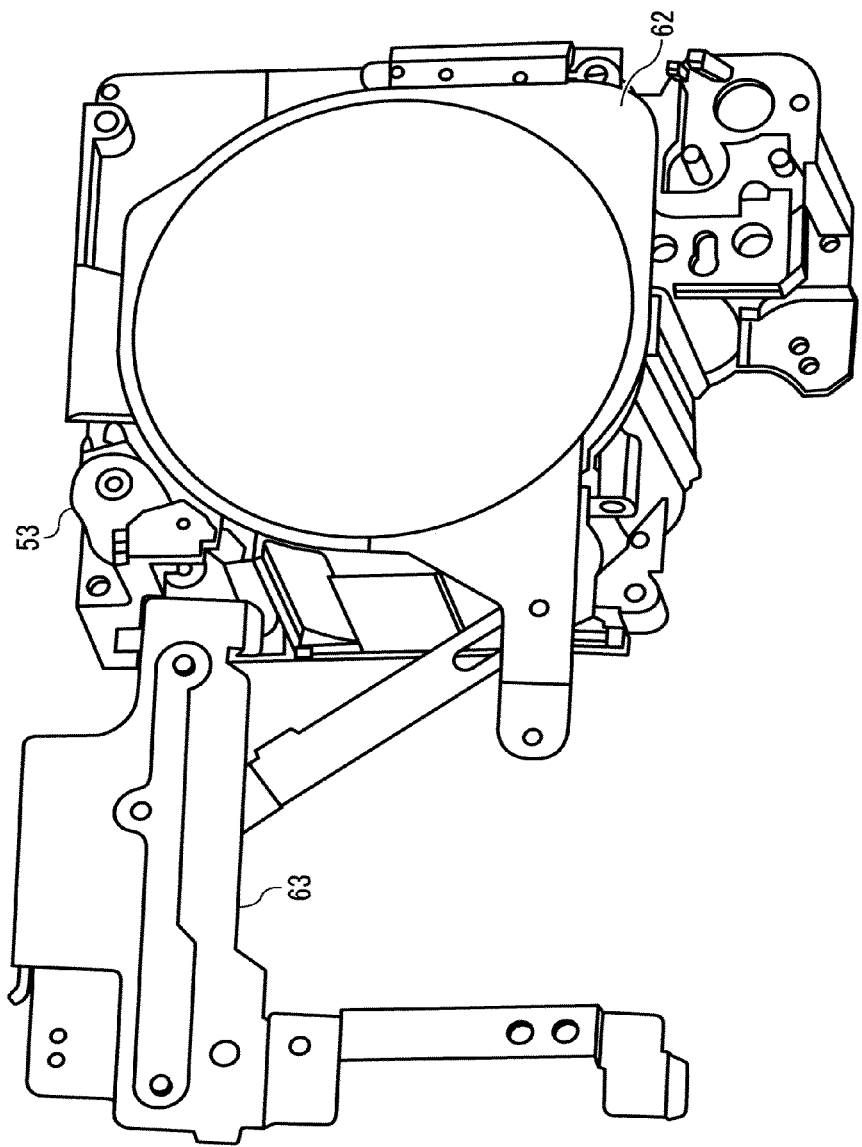
FIG. 3 is a perspective view, from the object side, of a configuration of an optical system apparatus including: the lens barrel 10 put in the collapsed storage state D with a lens barrier closed; and the lens barrier.
Figure 4:
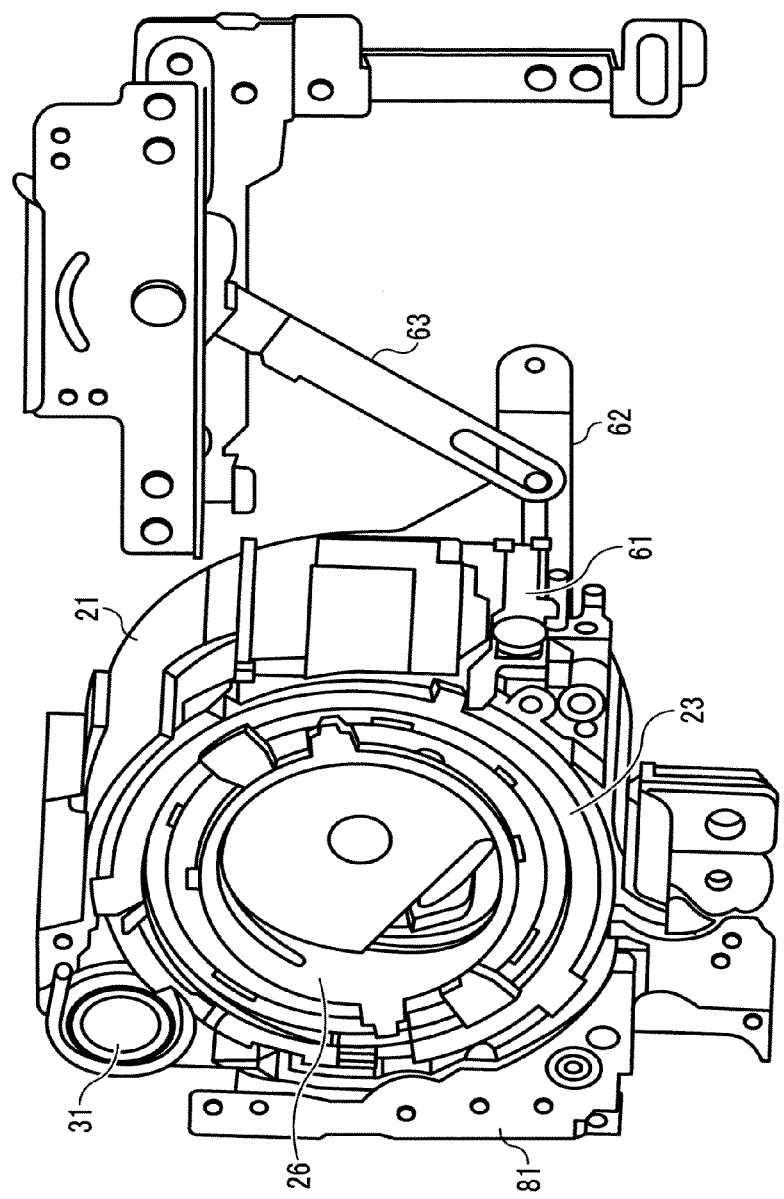
FIG. 4 is a perspective view, from the image forming surface, of a configuration of a main part of the optical system apparatus put in the state shown in FIG. 3.
Figure 5:
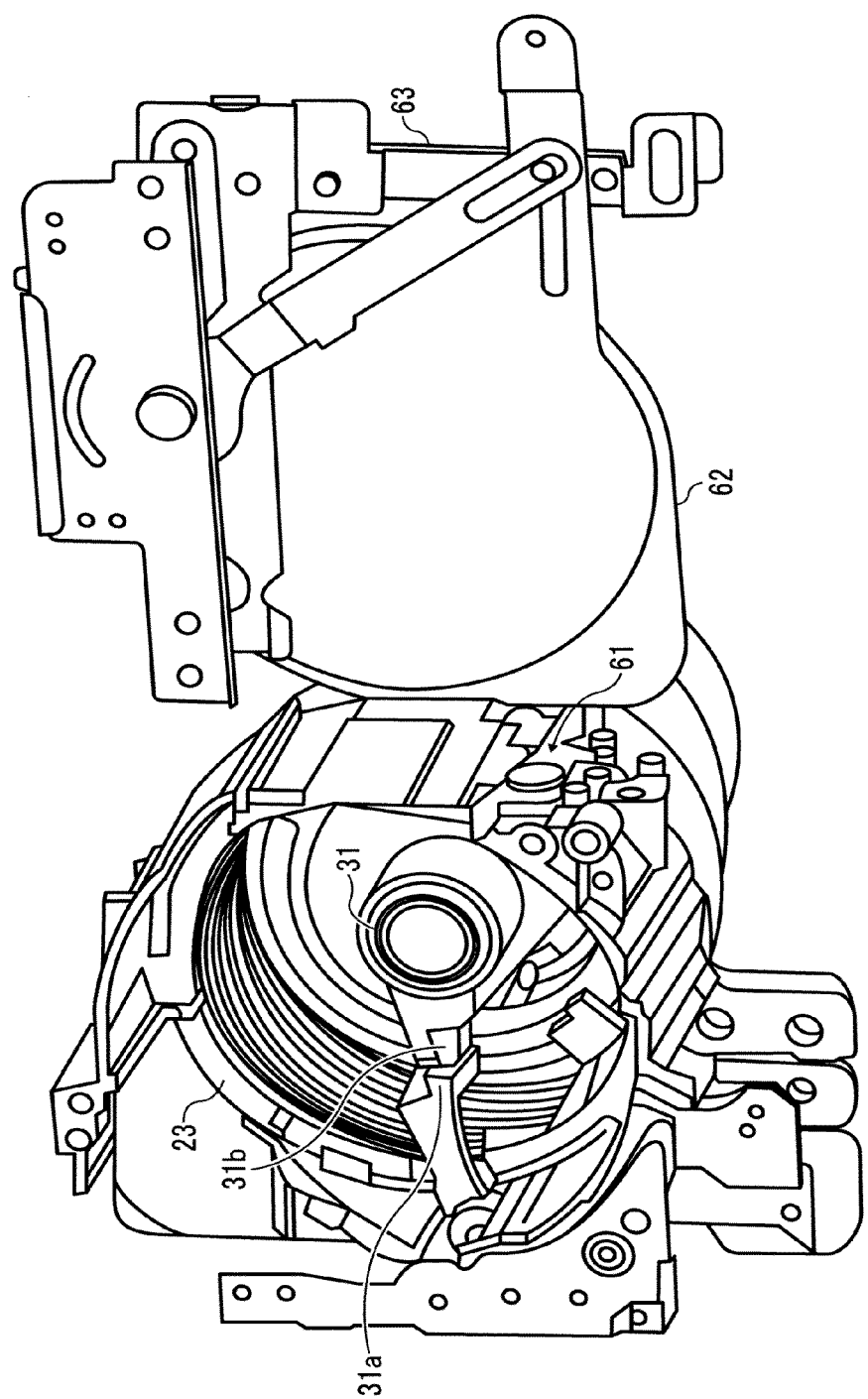
FIG. 5 is a perspective view, from the image forming surface, of the configuration a main part of the lens barrel 10 which is about to close the currently-opened lens barrier while the lens barrel 10 portion is put in a photographic state P in which the lens groups are being projected, and a configuration of a main part of the lens barrier portion.
Figure 6:
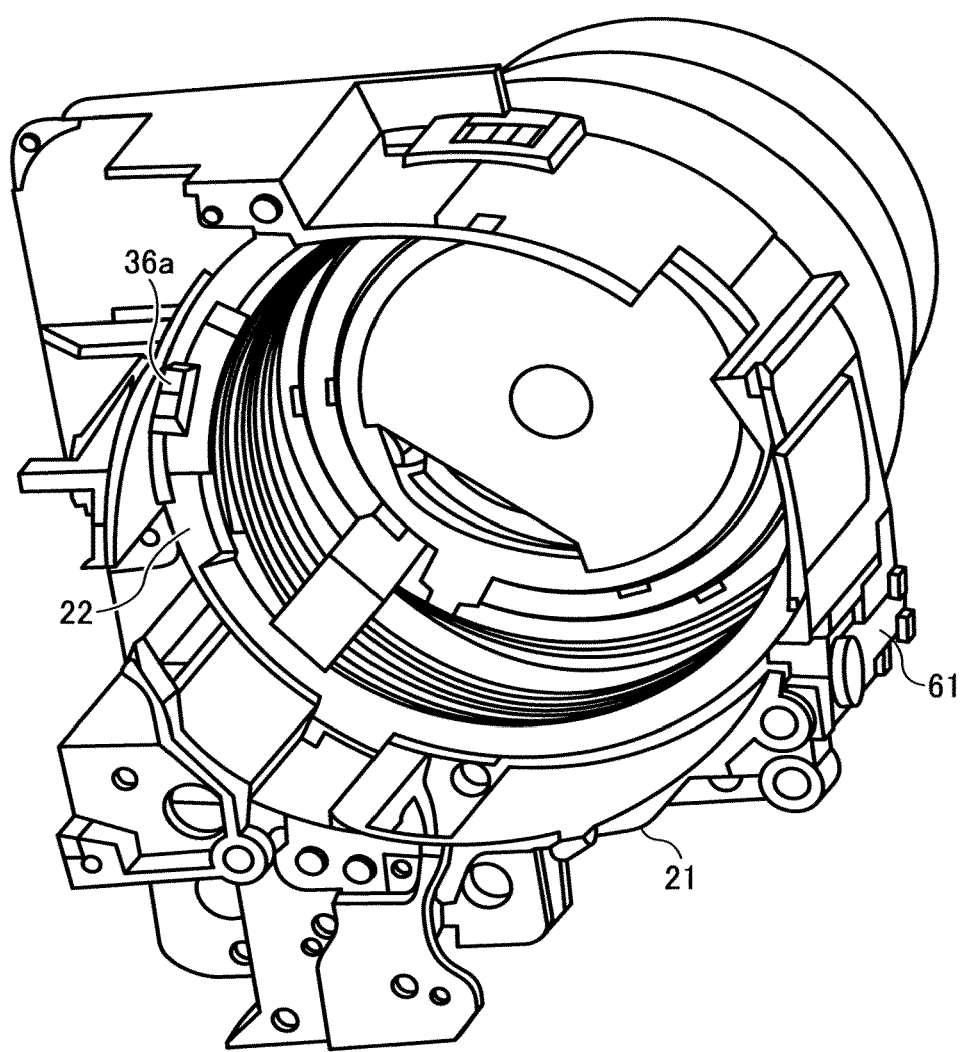
FIG. 6 is a perspective view, from the image forming surface, of the configuration of the main part of the lens barrel 10 put in the photographic state P in which the lens groups are being projected.

While in the collapsed storage state D, the lens barrier 62 shown in FIGS. 3 and 5 covers an object-side portion of the first lens group 11, and thus protects the lens group from dirt and damage. The lens barrier 62 is driven forward and backward by the barrier driving system 63 in a direction orthogonal to the photographic optical axis OA. FIGS. 3 and 4 show a state in which the lens barrier 62 is closed. FIG. 5 shows a state in which the lens barrier 62 is opened almost fully. In accordance with manipulation of the barrier operating portion 301 (see FIG. 17A), the barrier driving system 63 drives the lens barrier 62 between a closed position (see FIGS. 3 and 4) and an opened position (a position which is farther from the photographic optical axis OA than a position shown in FIG. 5 is). This barrier driving system 63 has a function for displacingly biasing the lens barrier 62 in a closing direction while the lens barrier 62 is located in the closed position, and in an opening direction while the lens barrier 62 is located in the opened position.

For this reason, in a case where the lens barrier 62 is operated in the opening direction while in the closed state, the lens barrier 62 semi-automatically shifts to the opened state once the lens barrier 62 passes a predetermined position. In addition, in a case where the lens barrier 62 is closed, the lens barrier 62 semi-automatically shifts to the closed state once the lens barrier 62 passes a predetermined position (which is not necessarily the same as the predetermined position set up for the opening operation, and from which a smooth operation can be expected if the position has a hysteresis characteristic).

The barrier controlling piece 61 is provided in a way that enables the barrier controlling piece 61 to move in the photographic optical axis OA direction while sliding on a lateral portion of the fixed frame 21 which is closer to the opened position of the lens barrier 62. The barrier controlling piece 61 is biased toward the object by a spring or the like appropriately. While in the collapsed storage state D, the barrier controlling piece 61 is not in contact with even the lens barrier 62 because: a bent formed engagement portion of the barrier controlling piece 61 engages with the base end surfaces of the first rotary barrel 11 and the first liner 23; and the barrier controlling piece 61 is displaced toward the image surface against the biasing force. While in the photographic state P, the lens barrier 62 is fully away from the lens groups, their retaining frames and the like. While in this state, the engagement portion of the barrier controlling piece 61 is released from its engagement, the barrier controlling piece 61 is displaced toward the object due to the biasing force. Accordingly, a barrier blocking portion provided in a front end of the barrier controlling piece 61 projects into the advancement/retreat path.

In a case where the lens barrel 10 is intended to shift to the collapsed storage state D while in this state, the lens barrier 62 would collide against the lens barrel 10 when the lens barrier 62 is operated quickly. Because, however, the barrier blocking portion in the front end of the barrier controlling piece 61 cuts into the advancement/retreat path of the lens barrier 62, the lens barrier 62 is blocked from entering the lens barrel 10 portion. Once the lens barrel 10 is put in the collapsed storage state D with all the lens groups stored, the base end surfaces of the first rotary barrel 22 and the first liner 23 engage with the bent formed engagement portion of the barrier controlling piece 61, and displaces the barrier controlling piece 61 toward the image surface against the biasing force. Accordingly, the lens barrier 62 can move to the front portion of the lens barrel 10, and is thus set in the closed position correctly. Thereby, it is possible to effectively prevent interference between the lens barrier 62 and the barrel portion of the lens groups.

The foregoing descriptions have been provided for an embodiment of the lens barrel in which the third lens group 13 is configured to be retracted out of the photographic optical axis OA. In the case of the configuration of Embodiment 1, when a lens group whose outer diameter is the smallest is selected as the retractable lens group to be retracted out of the photographic optical axis OA, it is possible to effectively reduce the projection size of the barrel with the retractable lens group retracted. In addition, when a lens group which is less away from the image surface as much as possible when extended is selected as the retractable lens group, it is possible to reduce the length of the driving mechanism for the retractable lens group (at least one of the length of the main shaft and the length of the lead screw), and to reduce the thickness of the barrel, that is to say, the thickness dimension of the barrel which is viewed in the photographic optical axis OA direction. Furthermore, when a lens group which is located in the back of the shutter including the stop function, and which is the closest to the shutter, is selected as the retractable lens group, a lens group whose outer diameter is the smallest, and which is less away from the image surface, can be selected as the retractable lens group. Accordingly, the retractable lens group is easy to retract with no consideration necessary to be given to its interference with the shutter for closing the flat surface of the barrel which is perpendicular to the photographic optical axis OA, and does not have to avoid the position of the shutter.

In this case, the lens configuration have the four groups including: the first lens group having positive power; the second lens group having negative power; the third lens group having positive power; and the fourth lens group having positive power. The magnifying power is varied by changing at least the distance between the first lens group and the second lens group, the distance between the second lens group and the third lens group, and the distance between the third lens group and the fourth lens group. The focusing is achieved by adjusting the position of the image surface to the image pickup surface. The shutter including the stop function is located in front of the third lens group. When the lens configuration includes the four groups and the third lens group is selected as the retractable lens group, a lens group which is less away from the image surface as much as possible, and whose outer diameter is the smallest, can be selected as the retractable lens group. Accordingly, the barrel which is small in the barrel projection size and in the thickness can be constructed. Furthermore, when the third lens group in the four-group lens configuration acts as the retractable lens group in a case where the variable power ratio is equal to or greater than 4, it is possible to provide the lens barrel 10 which is small in the barrel size (projection size, or thickness) while achieving the high variable power ratio. The lens configuration may be a three-group lens configuration which includes: the first lens group having positive power; the second lens group having negative power; and the third lens group having positive power. The third lens group may be selected as the retractable lens group. Each lens group may be formed from one lens or more. The term "lens group" means one lens or more which are configured to move integrally. For this reason, every lens group may be formed from one lens.

Figure 17A:
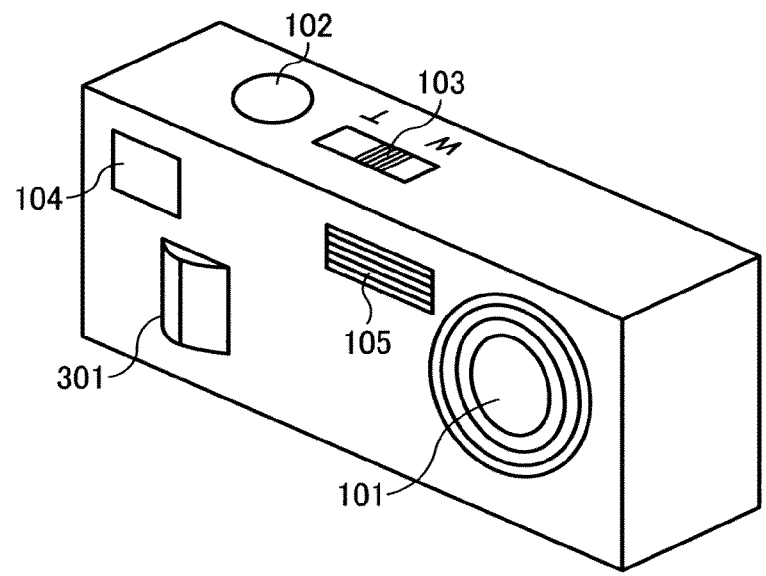
FIGS. 17A and 17B are perspective views, from the object side, each schematically showing an external appearance configuration of a camera for which the lens barrel 10 of the present invention is used.
Figure 17B:
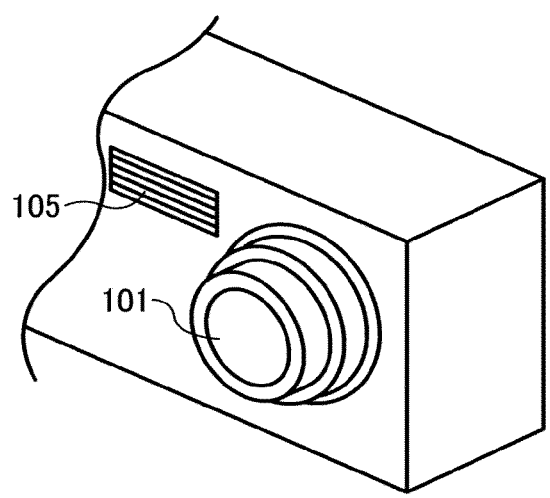
Figure 18:
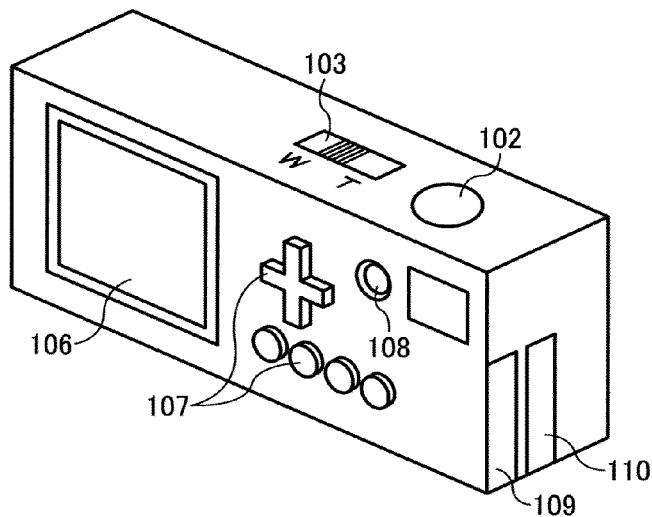
FIG. 18 is a perspective view schematically showing the external configuration of the camera shown in FIG. 17 from a photographer side.
Figure 19:
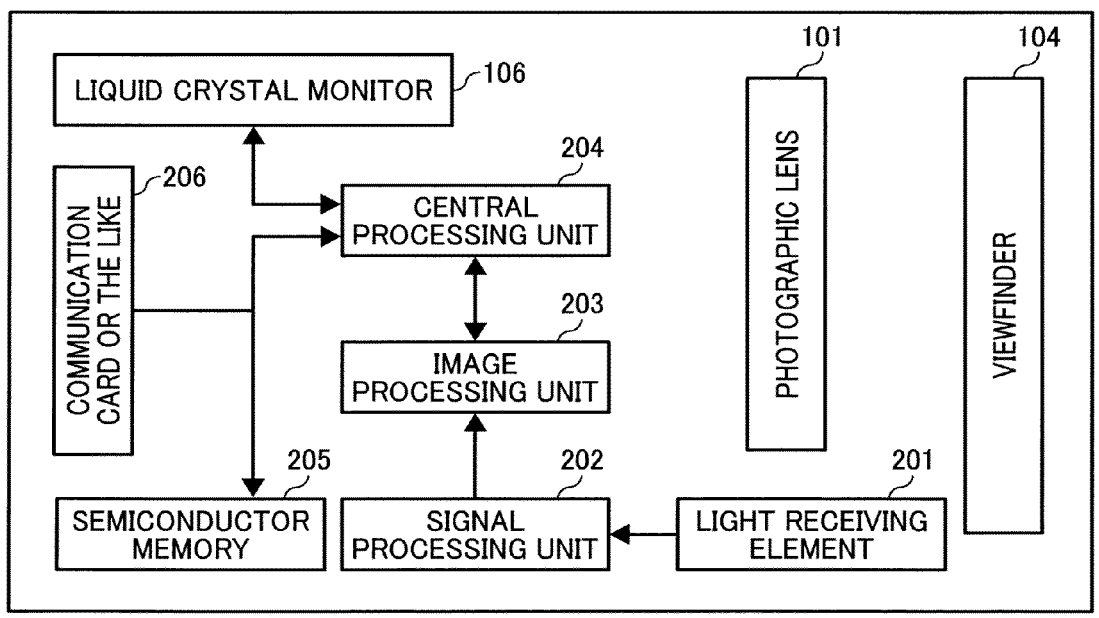
FIG. 19 is a block diagram schematically showing a functional configuration of the camera shown in FIG. 17.

Next, referring to FIGS. 17 to 19, descriptions will be provided for an example in which a camera (imaging apparatus) is configured by using an optical system apparatus, which includes the lens barrel 10 shown in the foregoing embodiment, as a photographic optical system. FIGS. 17A and 17B are perspective views each showing an external appearance of a camera which is viewed from the object side, that is to say, from the front side as the photographic subject side. FIG. 18 is a perspective view showing another external appearance of the camera which is viewed from the backside as the photographer side. FIG. 19 is a block diagram showing a functional configuration of the camera. It should be noted that, although the descriptions will be herein provided for the camera, portable information terminal devices, such as personal data assistants (PDAs) and cellular phones, which include a built-in camera function, have been available in market in these years.

Many of such portable information terminal devices include virtually the same function and configuration as camera, although their outer appearance is slightly different from that of the cameras. The optical system apparatus including the lens barrel 10 of the present invention may be used in such portable information terminal devices. Similarly, the optical system apparatus including the lens barrel 10 of the present invention may be used in image input apparatuses.

As shown in FIGS. 17 and 18, the camera includes a photographic lens 101, a shutter release button 102, a zoom lever 103, a viewfinder 104, a flash 105, a liquid crystal monitor 106, operation buttons 107, a power supply switch 108, a memory card slot 109, a communication card slot 110, and the barrier operating portion 301. As shown in FIG. 19, the camera further includes a light receiving element 201, a signal processing unit 202, an image processing unit 203, a central processing unit (CPU) 204, a semiconductor memory 205, and a communication card or the like 206. In addition, these components operate by receiving an electric power from a battery as a drive power supply, although not clearly illustrated.

The camera includes: the photographic lens 101; and the light receiving element 201 as an area sensor such as the CCD image sensor. The camera is configured to cause the light receiving element 201 to read the image of the object to be photographed, that is to say, the image of the photographic subject, which is formed by the photographic lens 101 as the photographic optical system. An optical system apparatus, which includes the lens barrel 10 of the present invention as recited in Embodiment 1, is used as this photographic lens 101. To put it specifically, the optical system apparatus is configured by use of the lenses as the optical elements constituting the lens barrel 10; and the like. The lens barrel 10 includes a mechanism for retaining the lenses and the like in a way that enables the lenses and the like to be operated to move at least for each lens group. The photographic lens 101 to be installed in the camera is usually installed in the form of this optical system apparatus.

The output from the light receiving element 201 is processed by the signal processing unit 202 which is controlled by the central processing unit 204, and is thus converted to digital image information. The image information digitized by the signal processing unit 202 is subjected to a predetermined image process by the image processing unit 203 which is similarly controlled by the central processing unit 204, and is thereafter recorded in the semiconductor memory 205 such as a nonvolatile memory. In this case, the semiconductor memory 205 may be a memory card inserted in the memory card slot 109, or a semiconductor memory built in the camera body. The liquid crystal monitor 106 is capable of displaying an image which is in the process of being photographed, and any one of images recorded in the semiconductor memory 205. Furthermore, the images recorded in the semiconductor memory 205 can be transmitted to the outside through the communication card or the like 206 which is inserted in the communication card slot 110. Incidentally, the foregoing central processing unit 501, which is shown in FIG. 21, for controlling the drives of the lenses may be included in the central processing unit 204, or may be configured by use of another microprocessor connected to the central processing unit.

While the camera is being carried, as shown in FIG. 17A, the photographic lens 101 is put in the collapsed state, and is accordingly buried in the camera body, as well as the lens barrier 62 is closed. The photographic lens 101 is configured in a way that: once the lens barrier 62 is opened by the user's manipulation of the barrier operating portion 301, the power supplied is turned on; as shown in FIG. 17B, the barrel is extended, and thus projects from the camera body; and the photographic lens 101 is put into the photographic state P. In this case, the optical system of each of the groups constituting the zoom lens inside the lens barrel 10 of the photographic lens 101 is arranged, for example, in the wide-angle position. When the zoom lever 103 is operated, the arrangement of the optical system of each group is changed, and it accordingly becomes possible for the photographic lens 101 to perform the power varying operation toward the telephoto end.

Note that it is desirable that the magnifying power of the optical system of the viewfinder 104 should be varied in connection with the change in the angle of view of the photographic lens 101.

As is often the case, the focusing is performed by pressing down the shutter release button 102 by half. The focusing of the zoom lens of Embodiment 1 can be achieved mainly by moving the fourth lens group 14. A picture is taken when the shutter release button 102 is further pressed down into a fully pressed down state. Thereafter, the above-described processes are performed.

The operation buttons 107 are manipulated in predetermined manners in order for an image recorded in the semiconductor memory 205 to be displayed on the liquid crystal monitor 106, and to be transmitted to the outside through the communication card or the like 206. The semiconductor memory 205 and the communication card or the like 206 are used by being inserted in dedicated or general-purpose slots such as the memory card slot 109 and the communication card slot 110.

It should be noted that the camera can be made thinner because, while the photographic lens 101 is put in the collapsed state, the third lens group 13 is stored in parallel with the first lens group 11 and the second lens group 12 while retracted from the optical axis OA.

The viewfinder mechanism is usually arranged in a place higher than the barrel. This makes the camera easy to handle. Furthermore, in a case where the lens barrel 10 includes a zoom power varying mechanism, the viewfinder mechanism needs a corresponding zoom power varying mechanism as well. For this reason, it is desirable that a driving source (a DC motor, a pulse motor or the like) for achieving a zoom power varying operation and a transmission mechanism (a gear connecting mechanism or the like) for transmitting a driving force from the driving source should be placed in a place immediately near the viewfinder mechanism. For example, in a case where the viewfinder mechanism is arranged in a place higher than and on the left of the lens barrel 10, the power varying driving source and the transmission mechanism are placed in a place higher and on the right of the lens barrel 10. Thereby, a limited space is effectively used. Subsequently, in a case where the third lens retaining frame (retractable lens retaining frame) 31 is retracted, it is natural that the third lens retaining frame 31 should be set in a place lower than the lens barrel 10 (in a place lower than and on the right or left of the lens barrel 10) because a space remains thereat. In this embodiment, the space for the third lens retaining frame (retractable lens retaining frame) 31 is set up in a place lower than and on the right of the lens barrel 10, as well as the driving source and driving mechanism for driving the focusing lens group are arranged in a place lower than and on the left of the lens barrel 10. Thereby, four corners around the lens barrel 10 shaped like a regular circle, that is to say, an upper left corner, an upper right corner, a lower right corner and a lower left corner are effectively used. Accordingly, the lens barrel 10 can be constructed in a compact size.

Figure 22:
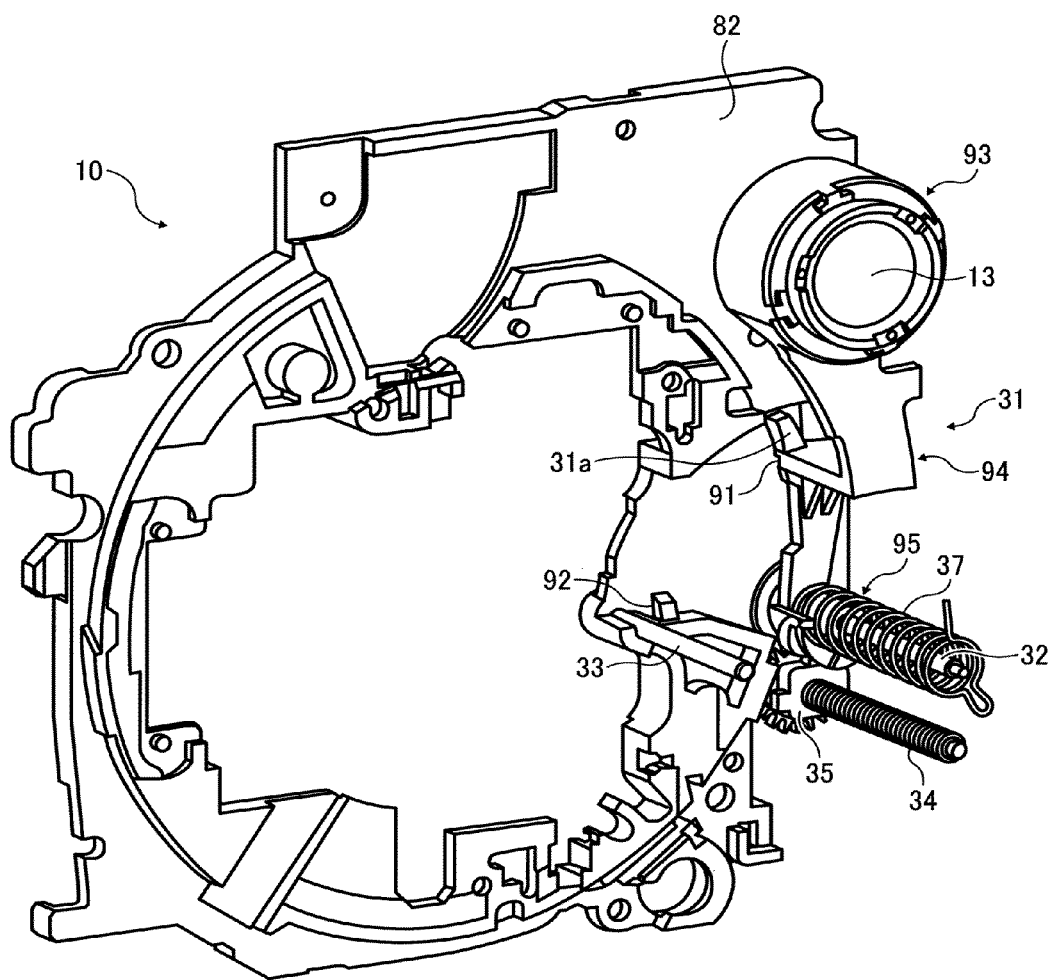
FIG. 22 is an explanatory diagram for explaining a configuration for rotation of a third lens retaining frame 31 above a barrel base 82 in Embodiment 1, and the explanatory diagram is shown in the form of a schematic perspective view.
Figure 23:
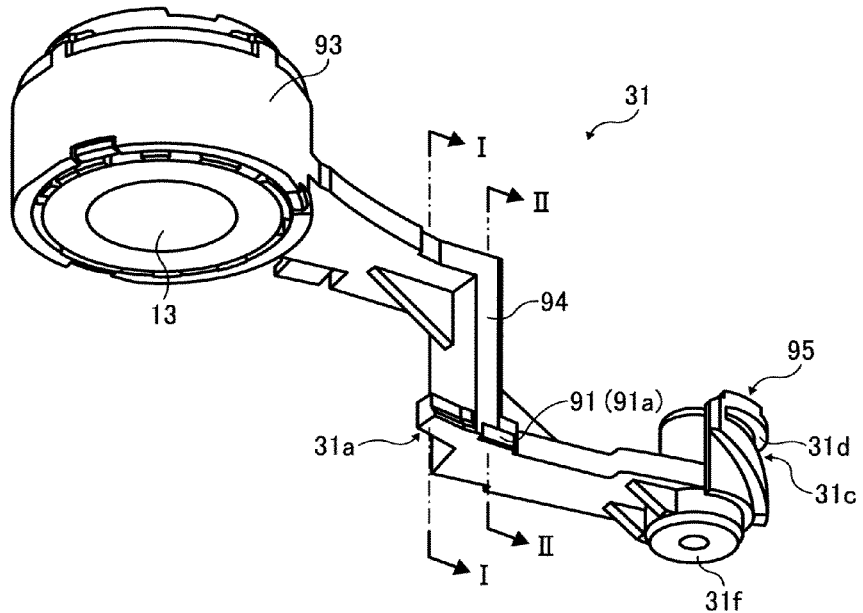
FIG. 23 is a schematic perspective view for explaining a configuration of the third lens retaining frame 31.
Figure 26:
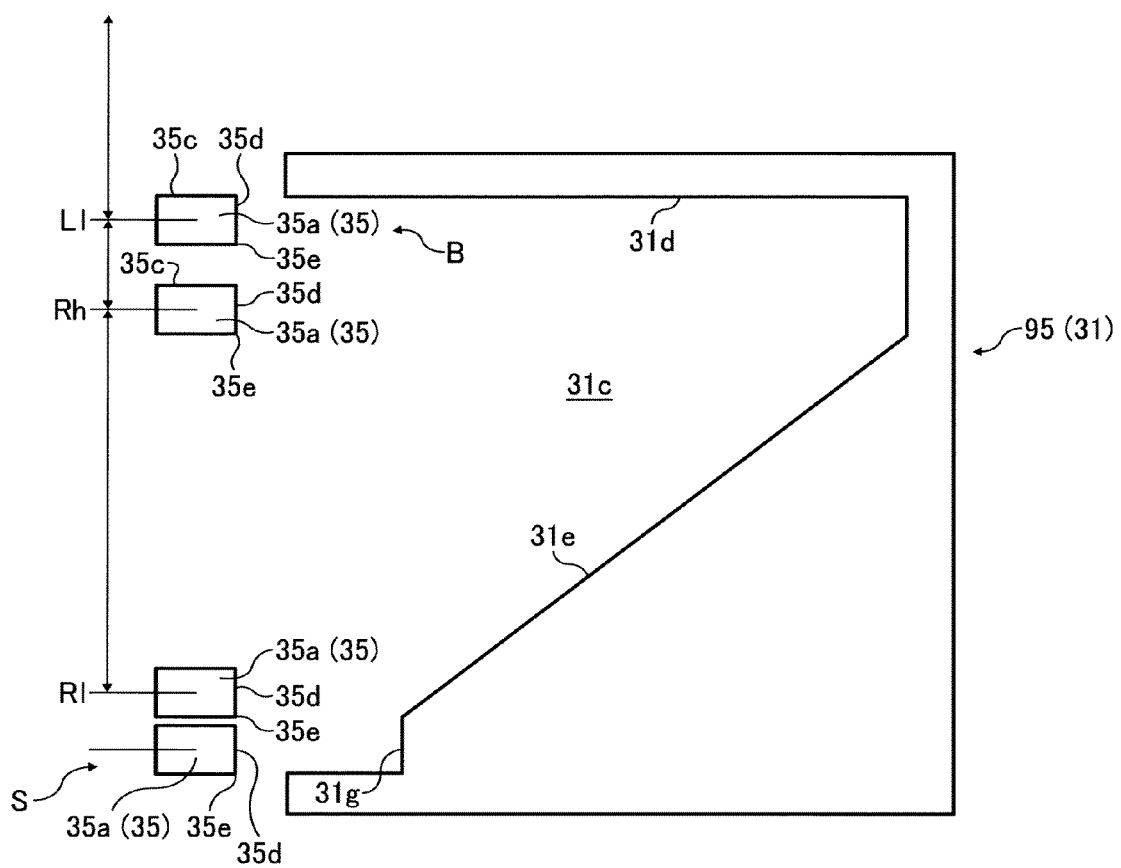
FIG. 26 is an explanatory diagram for explaining action which is taken in accordance with height positions of the third group female screw member 35 (the abutment portion 35a).
Figure 27:
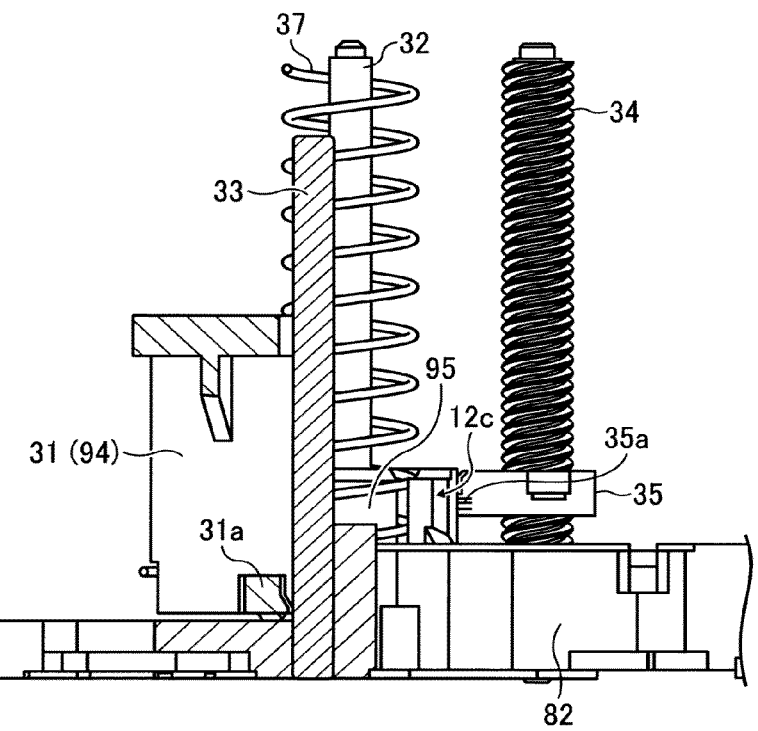
FIG. 27 is a diagram for explaining action which is taken while the third lens retaining frame 31 is rotating from a storage position to a photographic position, and shows a positional relationship between the third group secondary guide shaft 33 and the stopper 31a which is established when a preliminary abutment portion 91 (an inclined surface 91a) abuts on the preliminary reception portion 92 (an inclined receiving surface 92a).
Figure 28:
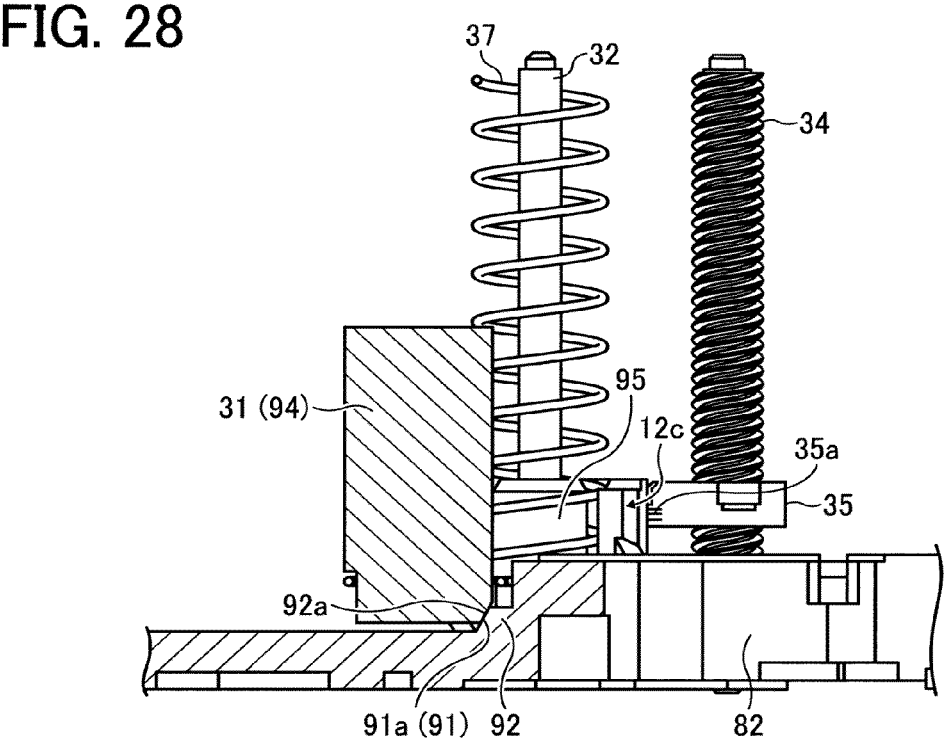
FIG. 28 is an explanatory diagram showing the positional relationship between the preliminary abutment portion 91 (the inclined surface 91a) and the preliminary reception portion 92 (the inclined receiving surface 92a) in a situation which is the same as the situation shown in FIG. 27.
Figure 29:
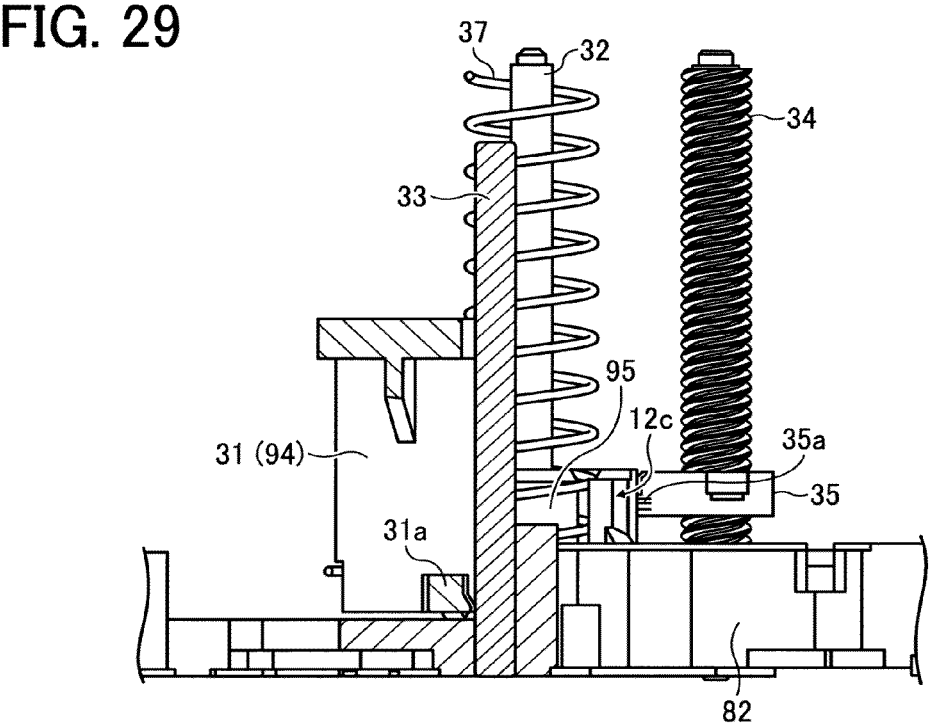
FIG. 29 is an explanatory diagram showing a state which is observed when the third lens retaining frame 31 slightly rotates from the position shown in FIG. 27 toward the photographic position, and shows the state in a manner similar to that of FIG. 27.
Figure 30:
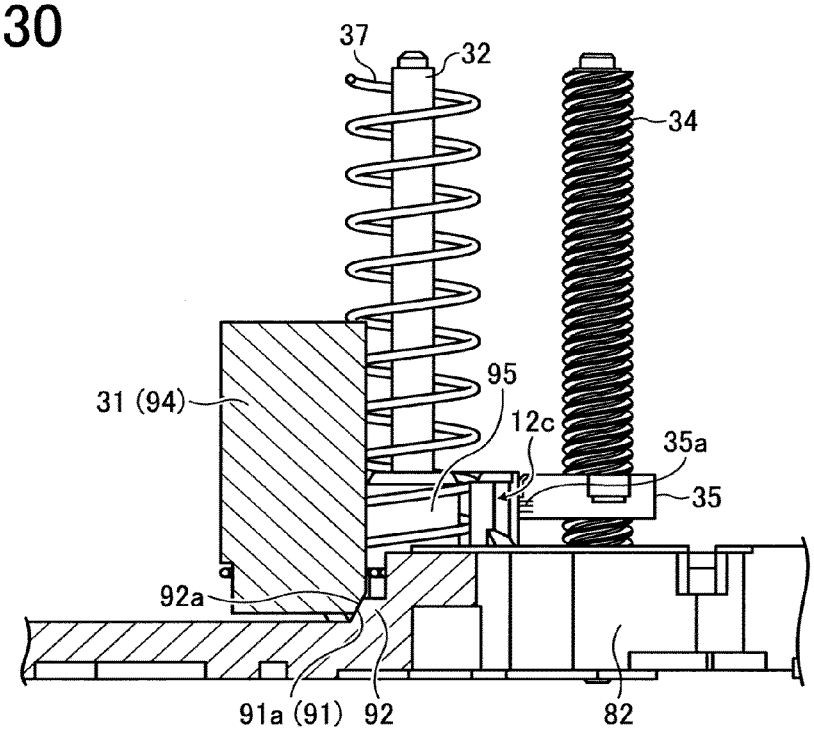
FIG. 30 is an explanatory diagram showing the positional relationship between the preliminary abutment portion 91 (the inclined surface 91a) and the preliminary reception portion 92 (the inclined receiving surface 92a) in a situation which is the same as the situation shown in FIG. 29.
Figure 31:
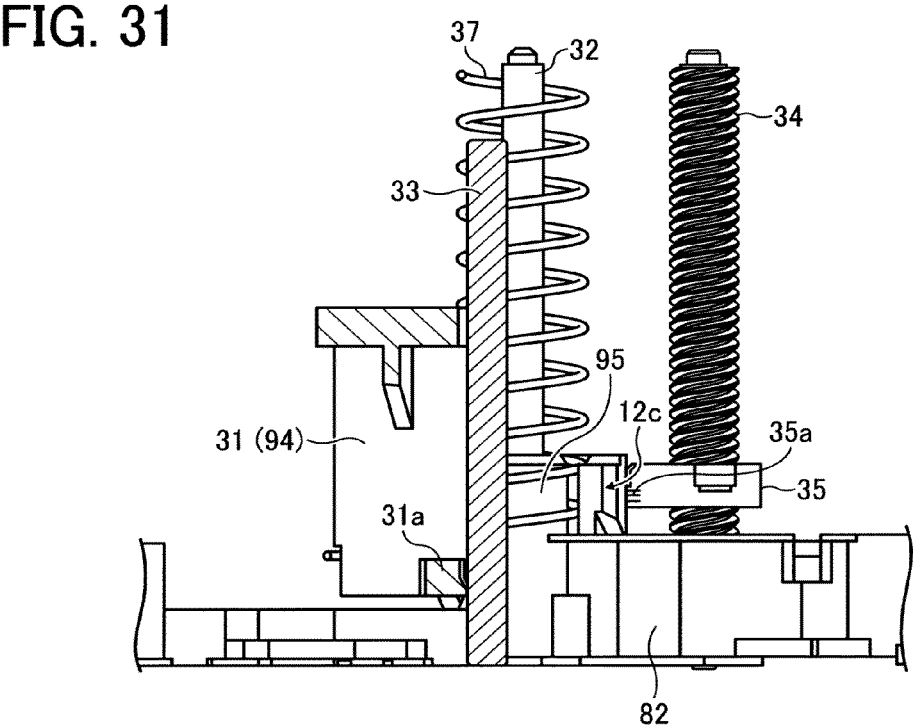
Figure 32:
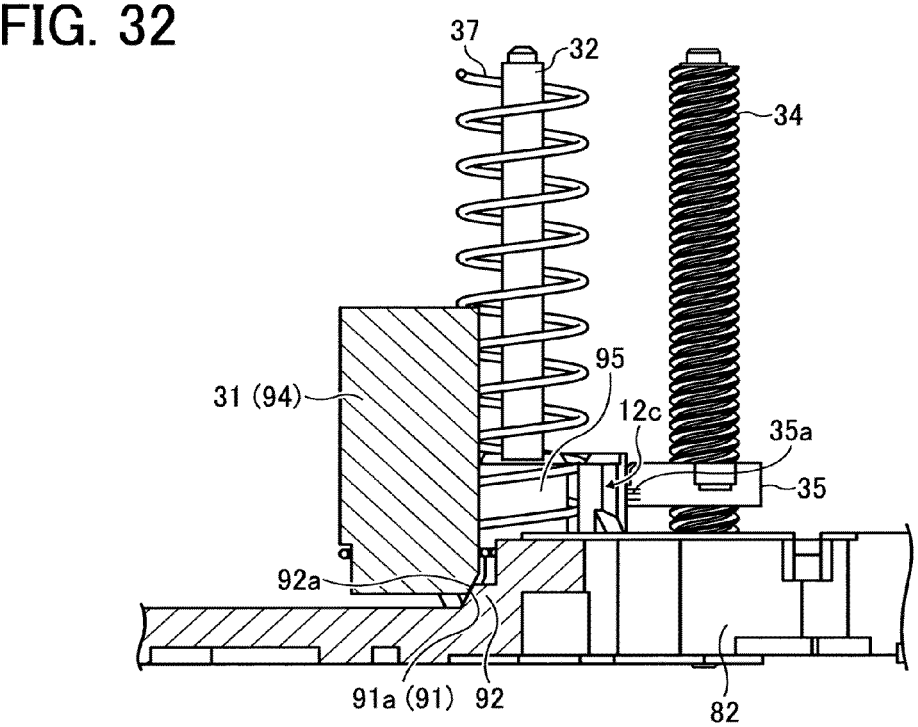
FIG. 32 is an explanatory diagram showing the positional relationship between the preliminary abutment portion 91 (the inclined surface 91a) and the preliminary reception portion 92 (the inclined receiving surface 92a) in a situation which is the same as the situation shown in FIG. 31.

Next, descriptions will be provided for characteristic features of Embodiment 1 by use of FIGS. 22 to 32. Note that in FIGS. 27, 29 and 31, a view of the third lens retaining frame 31 is shown in a cross section of the third lens retaining frame 31 taken along the I-I line of FIG. 23, and a view of a configuration on and above the barrel base 82 is shown in a cross section of the configuration on and above the barrel 82 which is taken along the III-III line of FIG. 24. In FIGS. 28, 30 and 32, a view of the third lens retaining frame 31 is shown in a cross section of the third lens retaining frame 31 taken along the II-II line of FIG. 23, and a view of a configuration on and above the barrel base 82 is shown in a cross section of the configuration on and above the barrel 82 which is taken along the IV-IV line of FIG. 24. Furthermore, FIG. 23 shows the third lens retaining frame 31 with the light shielding piece 31b omitted for the purpose of easy understanding.

The lens barrel 10 includes a later described preliminary reception portion 92, 92B, 902, 902E provided inside the movable cylinder and located on a path along which the retractable lens retaining frame moves from the collapsed state to the photographic state, and a later described preliminary abutment portion 91, 91A, 901, 901A provided on the retractable lens retaining frame and configured to abut on the preliminary reception portion before the retractable lens retaining frame abuts on the positioning member during transition from the collapsed state to the photographic state. The at least one retractable lens retaining frame retains the at least one retractable lens to be positioned to a position on the photographic axis by allowing the at least one retractable lens retaining frame to abut on the positioning member.

In the lens barrel 10 of Embodiment 1, as shown in FIG. 22, the preliminary abutment portion 91 is provided to the third lens retaining frame 31, and the preliminary reception portion 92 is provided to the barrel base 82.

The third lens retaining frame 31 provided with this preliminary abutment portion 91 is made of a resin material. As shown in FIG. 23, the third lens holing frame 31 includes the third lens retaining portion 93, the third lens retaining frame arm portion 94 and the third lens retaining frame rotating base 95.

The third lens retaining frame rotating base 95 is shaped like a cylinder as a whole, and pivotally movably supported by the third group primary guide shaft 32 in a way to be movable in the photographic optical axis OA direction (see FIG. 22). As described above, by the compression torsion spring 37, the third lens retaining frame rotating base 95 is always rotationally biased in the rotational direction from the storage position (the collapsed storage state D) to the photographic position (the photographic state P) located on the photographic optical axis OA (see FIG. 16A), and is always straight biased in the direction from an object side to the pressure plate 81 located closer to the image surface (in the backward direction; in the leftward direction in FIG. 14A when viewed from the front) on the third group primary guide shaft 32. For this reason, the third lens retaining frame rotating base 95 is situated in a rearmost side (on the left side in FIG. 14A) within the movable range on the third group primary guide shaft 32, while the third lens retaining frame rotating base 95 receives no forward pressing force from the third group female screw member 35, that is to say, while the third group female screw member 35 is situated between the retraction starting position B and the storage position S. What continues to this third lens retaining frame rotating base 95 is the third lens retaining frame arm portion 94. For this reason, the compression torsion spring 37 functions as cylindrical body biasing means for giving a biasing force to the third lens retaining frame rotating base 95 as a rotary cylindrical body constituting a base for rotating the third lens retaining frame 31 which is the retractable lens retaining frame.

The third lens retaining frame arm portion 94 connects the third lens retaining frame rotating base 95 and the third lens retaining portion 93 together, and constitutes an arm portion in the third lens retaining portion 31. As a whole, an intermediate position of the third lens retaining frame arm portion 94 constitutes a crank-shaped winding portion, which extends in a direction parallel with the third group primary guide shaft 32. The third lens retaining portion 93 continues to an end of the third lens retaining frame arm portion 94.

The third lens retaining portion 93 is located in an end-side portion of the third lens retaining portion 31, and retains the third lens group 13. As a whole, the third lens retaining portion 93 is a frame member shaped like a cylinder.

The preliminary abutment portion 91 is provided adjacent to the stopper 31a, which is provided projecting from the crank-shaped winding portion, in the third lens retaining frame arm portion 94 of the third lens retaining frame 31. This preliminary abutment portion 91 is formed by cutting away a part of the base end portion of the winding portion, and has an inclined surface 91a. In this respect, the rotational direction of the third lens retaining frame 31 (indicated by an arrow A1 in FIGS. 25A to 25C) from the storage position (the collapsed storage state D) to the photographic position (the photographic state P) located on the photographic optical axis OA is defined as a positive rotational direction. The inclined surface 91a of the preliminary abutment portion 91 is inclined with respect to an extension direction of the third group primary guide shaft 32, which is the rotational axis of the third lens retaining frame 31, (the photographic optical axis OA direction in the case of Embodiment 1) in a way that, as the inclined surface 91a becomes closer to the object as the photographic subject, the inclined surface 91a extends more in the positive rotational direction.

Figure 24:
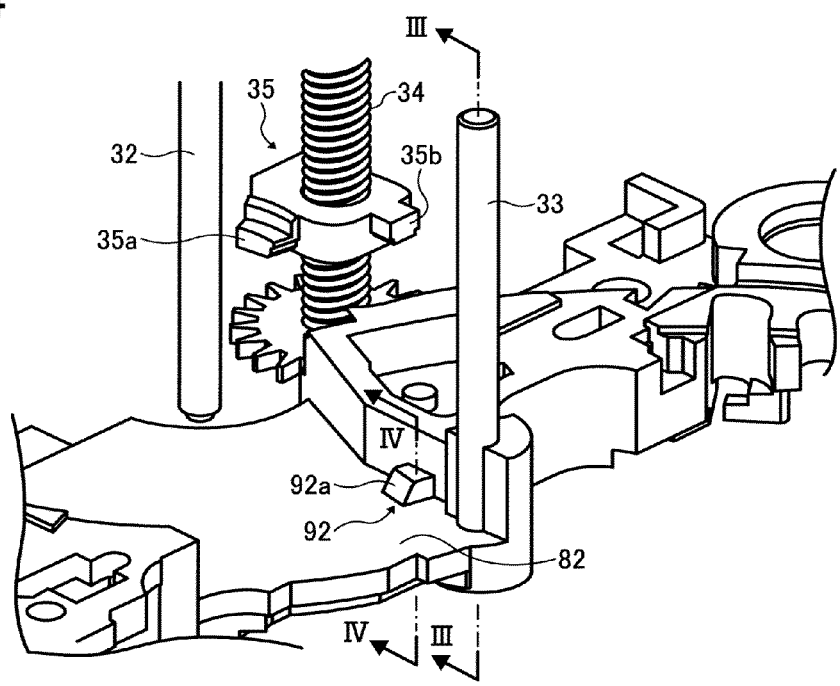
FIG. 24 is a schematic perspective view showing configurations of a third group secondary guide shaft 33 and a preliminary reception portion 92 on the barrel base 82.

As shown in FIG. 24, the preliminary reception portion 92 is provided to the barrel base 82 in a way to be adjacent to the third group secondary guide shaft 33. This preliminary reception portion 92 is located on a path along which the third lens retaining frame 31 as the retractable lens retaining frame moves from the collapsed state to the photographic state. The preliminary reception portion 92 is formed integrally with the barrel base 82 made of a resin material in a way to project from the upper surface of the barrel base 82 toward the object, and includes an inclined receiving surface 92a which has the same height position (the same position when viewed in the photographic optical axis OA direction) as that of the preliminary abutment portion 91 of the third lens retaining frame 31 in order for the preliminary reception portion 92 to be opposed to the preliminary abutment portion 91. This inclined receiving surface 92a is inclined with respect to the direction of the rotational axis of the third lens retaining frame 31 (the direction in which the third group primary guide shaft 32 extends, that is to say, the photographic optical axis OA direction) in a way that, as the inclined receiving surface 92a becomes closer to the object as the photographic subject, the inclined receiving surface 92a regresses in the positive rotational direction, including toward a radial direction around the rotational axis thereof.

The inclined surface 91a of the preliminary abutment portion 91 and the preliminary reception portion 92 have a positional relationship in which, when the third lens retaining frame 31 is rotated in the positive rotational direction (indicated by the arrow A1 in FIGS. 25A to 25C), the inclined surface 91a and the inclined receiving surface 92a come into surface contact with each other before the stopper 31a comes into contact with the third group secondary guide shaft 33. In addition, as described above, the stopper 31a has a positional relationship in which, when the stopper 31a comes into contact with the third group secondary guide shaft 33, the stopper 31a puts the third lens retaining frame 31 in the photographic position (the photographic state P) in which the third lens group 13 is situated on the photographic optical axis OA.

Next, descriptions will be provided for action which is taken when the third lens retaining frame 31 of the lens barrel 10 rotates between the storage position (the collapsed storage state D) in which the third lens group 13 is retracted from the fixed barrel portion 21a of the fixed frame 21 to the outside and the photographic position (the photographic state P) in which the third lens group 13 is inserted onto the photographic optical axis OA by use of FIG. 14A and FIGS. 25A to 32.

Figure 25A:
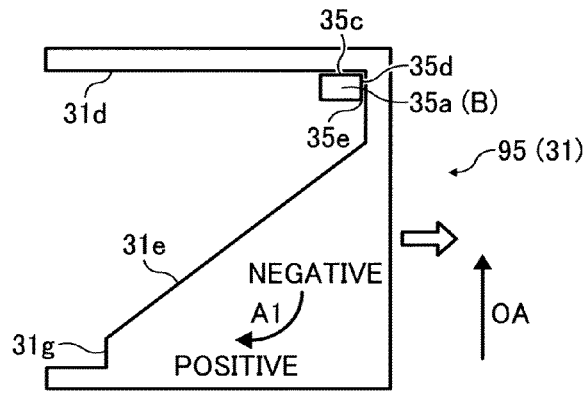
FIGS. 25A to 25C are diagrams for explaining action of a third group female screw member 35 inside a step portion 31c in Embodiment 1.
Figure 25B:
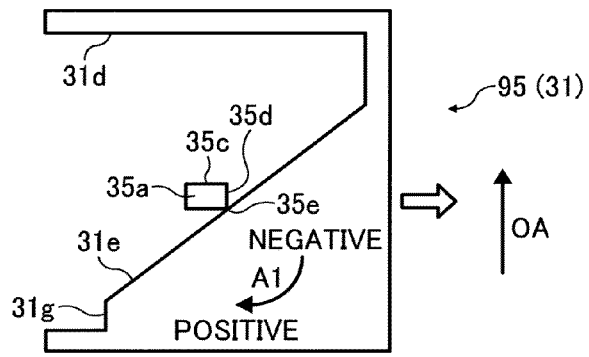
Figure 25C:
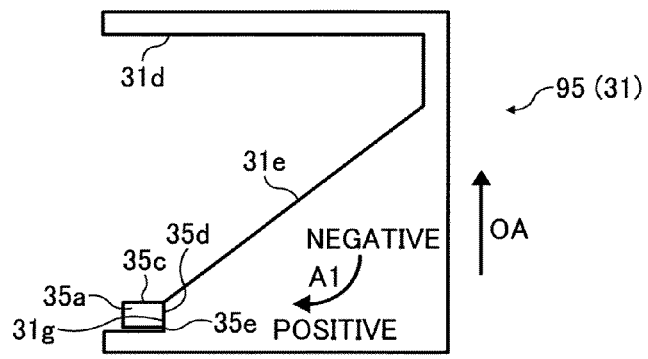

As described above, the third lens retaining frame rotating base 95 is rotated by receiving a pressing force from the third group female screw member 35 which moves straight in the forward and backward directions in accordance with the slide between the cam portion 31a of the step portion 31c provided in the outer peripheral surface of the third lens retaining frame rotating base 95 and the abutment portion 35a of the third group female screw member 35 accepted in the step portion 31c. For this reason, the step portion 31c functions as a cam groove, and the abutment portion 35a of the third group female screw member 35 functions as a cam pin. FIGS. 25A to 25C are schematic plan views of the step portion 31c functioning as the cam groove, which is viewed in the rotational direction of the third lens retaining frame rotating base 95. FIG. 25A shows a state in which the abutment portion 35 is situated in the retraction starting position B (see FIG. 14A); FIG. 25B shows a state in which the abutment portion 35 is moving between the retraction starting position B and the storage position S; and FIG. 25C shows a state in which the abutment portion 35 is situated in the storage position S (see FIG. 14A). In FIGS. 25A to 25C, how the third lens retaining frame rotating base 95 is rotated is shown as the leftward and rightward movement of the step portion 31c; the arrow A1 indicates the direction in which the third lens retaining frame rotating base 95 is rotationally biased by the compression torsion spring 37; and the straight movement of the abutment portion 35a functioning as the cam pin on the third group lead screw 34 in the front-back direction is shown as a movement of the abutment portion 35a in the vertical direction when viewed from the front.

As described above, the third lens retaining frame rotating base 95 is moved upward and downward along the third group primary guide shaft 32, and is rotated around the third group primary guide shaft 32, by the abutment portion 35a of the third group female screw member 35, which functions as the cam pin configured to be moved forward and backward within the step portion 31c functioning as the cam groove. Descriptions will be provided for how the third lens retaining frame rotating base 95 acts in response to the position of the abutment portion 35a within the step portion 31c functioning as the cam groove.

As shown in FIG. 25A, when the abutment portion 35a is moved forward (toward the object, in other words, upward when viewed from the front) up to a position where the cam portion 31e does not exist and is thereafter further moved forward to the retraction starting position B, the upper surface 35c comes into contact with the front-side engagement portion 31d. On this occasion, because the third lens retaining frame rotating base 95 is rotationally biased in the direction indicated by the arrow A1, the abutment portion 35a (the upper surface 35c) abuts on the front-side engagement portion 31d in its end portion which is on the right side in the illustration. While in this state, the third lens group 13 is located on the photographic optical axis OA (see FIG. 8 and other drawings). While in this state, once the abutment portion 35a is further moved forward (toward the wide-angle position W or the telephoto position T (see FIG. 14A)), the abutment portion 35a (the upper surface 35c) presses the front-side engagement portion 31d forward, and accordingly presses the third lens retaining frame rotating base 95 forward. For this reason, as described above, the third lens group 13 is moved toward the object appropriately.

When this abutment portion 35a is moved from the retraction starting portion B backward (toward the image surface, in the other words, downward when viewed from the front), the abutment peripheral portion 35e which is situated in the lowermost end of a side surface 35d presses the cam portion 31e backward. Accordingly, as shown in FIG. 25B, the third lens retaining frame rotating base 95 is rotated (moved rightward when viewed from the front in FIG. 25B) against the biasing force in accordance with the position of the abutment portion 35a (the height position thereof when viewed from the front in FIG. 25B). While in this state, the third lens retaining frame rotating base 95 is in a transition state in which the third lens retaining frame rotating base 95 is being rotated toward the retraction position, and the third lens group 13 is in a transition state in which the third lens group 13 is being retracted from the photographic optical axis OA toward the retraction position. While in this state, the abutment portion 35a does not raise the third lens retaining frame rotating base 95 forward by use of the front-side engagement portion 31d. Accordingly, the base end surface 31f of the third lens retaining frame 31 abuts on the pressure plate 81 due to the straight biasing by the compression torsion spring 37 (see FIG. 14A).

Once, as shown in FIG. 25C, the abutment portion 35a is moved backward to the storage position S, namely, a position where the cam portion 31e does not exist, the side surface 35d abuts on a lateral engagement surface 31g, as well as the side surface 35d and the lateral engagement surface 31g presses each other, because the third lens retaining frame rotating base 95 is biased in the direction indicated by the arrow A1.

In the lens barrel 10, as described above, a range between a height position Rl where, as shown in FIG. 26, the abutment peripheral portion 35e of the abutment portion 35a abuttingly engages with the lowermost end portion of the cam portion 31e and a height position Rh where, as shown in FIG. 26, the abutment peripheral portion 35e thereof abuttingly engages with the uppermost end portion of the cam portion 31e, serves as a rotational posture controlling zone in which the third group female screw member 35 configured to move along the third group lead screw 34 controls the rotational posture of the third lens retaining frame 31 in cooperation with the cam portion 31e and the compression torsion spring 37. On this occasion, the base end surface 31f basically abuts on the pressure plate 81 irrespective of the rotational posture of the third lens retaining frame 31.

Furthermore, in the lens barrel 10, a forward range beyond the height position Ll (the retraction starting position B) where the upper surface 35c of the abutment portion 35a abuts on the front-side engagement portion 31d serves as a position-on-optical-axis controlling zone in which the third group female screw member 35 configured to move along the third group lead screw 34 controls the position of the third lens retaining frame 31, namely, the third lens group 13 in the photographic optical axis OA direction (the wide-angle position W, the telephoto position T, or the like (see FIG. 14A)) in corporation with the compression torsion spring 37. On this occasion, the third lens retaining frame 31 locates the third lens group 13 on the photographic optical axis OA irrespective of its own position on the photographic optical axis OA.

For this reason, in the lens barrel 10, when the third group female screw member 35 is located between the rotational posture controlling zone and the position-on-optical-axis controlling zone, that is to say, between the height position Rh and the height position Ll, the control of the third lens retaining frame rotating base 95, namely, the third lens retaining frame 31 is switched between its rotational posture and its position on the optical axis without controlling its rotational posture or its position on the optical axis. This range between the height position Rh and the height position Ll will be hereinafter referred to as a "control switching zone."

In the lens barrel 10 of Embodiment 1, as described above, when the third group motor 52 is rotated clockwise in FIG. 14B (clockwise when viewed from the barrel front), the third group lead screw 34 rotates clockwise due to the gear mechanism including the gears 71 to 74, and the third group female screw member 35 moves from the storage position S toward the photographic subject in the photographic optical axis OA direction. In the lens barrel 10, when the third lens group 13 is moved from the storage position (the collapsed storage state D) to the photographic position (the photographic state P) on the photographic optical axis OA, the third group female screw member 35 is moved from the storage position S to the uppermost position of the control switching zone through the rotational posture controlling zone, that is to say, from the storage position S to the height position Ll (the retraction starting position B) through the height position Rl and the height position Rh. On this occasion, the third lens retaining frame rotating base 95, namely, the third lens retaining frame 31 rotates in accordance with the position of the third group female screw member 35 within the rotational posture controlling zone due to the rotational biasing force of the compression torsion spring 37.

In this respect, let us assume that the third group female screw member 35 (the abutment portion 35a) stops in the intermediate position in the control switching zone while the following description will be provided for the action, and in FIGS. 27 to 32, for the purpose of easy understanding. It should be noted that, irrespective of whether the third group female screw member 35 (the abutment portion 35a) is moving past or stops in an arbitrary position between the rotational posture controlling zone and the height position Ll (the retraction starting position B) in the control switching zone, the following action similarly takes place when the third lens retaining frame rotating base 95, namely, the third lens retaining frame 31 is not hindered from moving toward the object (upward) as a result of the abutment of the abutment peripheral portion 35e of the abutment portion 35a on the cam portion 31e.

While the third group female screw member 35 is in the process of reaching the intermediate position in the control switching zone beyond the height position Rh, the stopper 31a and the preliminary abutment portion 91 of the third lens retaining frame 31 come closer to the third group secondary guide shaft 33 and the preliminary reception portion 92 (the inclined receiving surface 92a) which are provided to the barrel base 82. Subsequently, as shown in FIG. 28, the preliminary abutment portion 91 comes into surface contact with the inclined receiving surface 92a of the preliminary reception portion 92 because of their positional relationship. On this occasion, as shown in FIG. 27, the stopper 31a does not abut on or engage with the third group secondary guide shaft 33. For this reason, even though the third group female screw member 35 is located in the control switching zone, the third lens group 13 is not set in the photographic position (the photographic state P) on the photographic optical axis OA.

Thereafter, as shown in FIGS. 29 and 30, the third lens retaining frame rotating base 95, namely the third lens retaining frame 31 moves toward the object (upward when viewed from front) in the photographic optical axis OA direction while rotating in the positive rotational direction (indicated by the arrow A1 in FIGS. 25A to 25C) due to the rotational biasing force from the compression torsion spring 37 (the rotational motion of the third lens retaining frame 31) as well as the guiding operation by the inclined surface 91a of the preliminary abutment portion 91 and the inclined receiving surface 92a of the preliminary reception portion 92 which are in surface contact with each other. In other words, the inclined surface 91a of the preliminary abutment portion 91 and the inclined receiving surface 92a of the preliminary reception portion 92 are kept in surface contact with each other while the preliminary abutment portion 91 is moving upward (see FIG. 30), and the stopper 31a does not abut on or engage with the third group secondary guide shaft 33 although the stopper 31a comes much closer to the third group secondary guide shaft 33 (see FIG. 29). On this occasion, because the third group female screw member 35 is located in the intermediate position in the control switching zone, the abutment peripheral portion 35e of the abutment portion 35 does not abut on the cam portion 31e, and the upward movement of the third lens retaining frame rotating base 95 is accordingly not hindered by the abutment portion 35a.

After that, as shown in FIGS. 31 and 32, the third lens retaining frame rotating base 95, namely, the third lens retaining frame 31 moves toward the object (upward when viewed from the front) in the photographic optical axis OA direction while rotating in the positive rotational direction (indicated by the arrow A1 in FIGS. 25A to 25C) due to the rotational biasing force from the compression torsion spring 37 (the rotational motion of the third lens retaining frame 31) as well as the guiding operation by the inclined surface 91a of the preliminary abutment portion 91 and the inclined receiving surface 92a of the preliminary reception portion 92 which are in surface contact with each other. Thereby, the inclined surface 91a of the preliminary abutment portion 91 and the inclined receiving surface 92a of the preliminary reception portion 92 are kept in surface contact with each other while the preliminary abutment portion 91 is moving upward (see FIG. 32), and the stopper 31a abuttingly engages with the third group secondary guide shaft 33 (see FIG. 31). Accordingly, the third lens group 13 is set in the photographic position (the photographic state P) on the photographic optical axis OA.

Thereafter, the third group female screw member 35 is located in the height position L1 (the retraction starting position B) and its height position is appropriately controlled as described above. Thus, the position of the third lens retaining frame 31, namely, the third lens group 13 in the photographic optical axis OA direction (the wide-angle position W, the telephoto position T, or the like) is controlled.

Figure 33A:
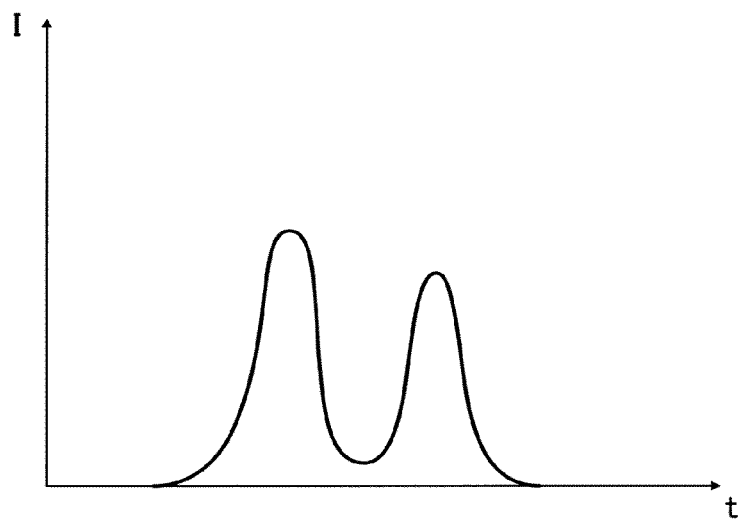
FIGS. 33A and 33B are schematic graphs showing temporal change in the intensity I of a sound.
Figure 33B:
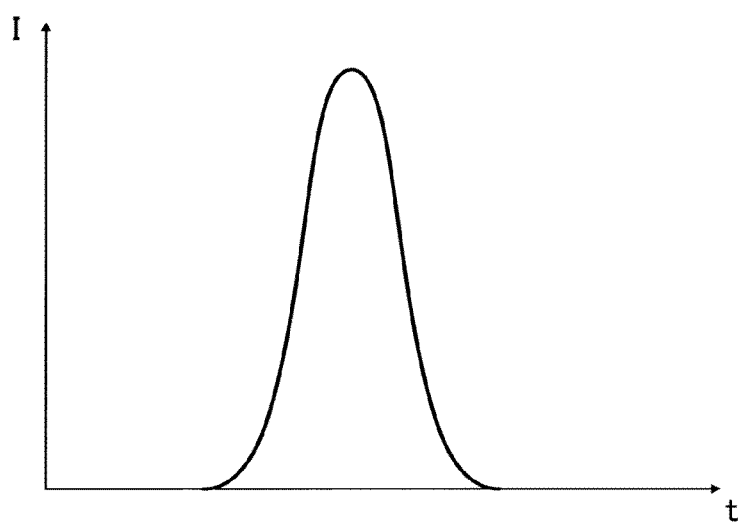

As described above, in the lens barrel 10 of Embodiment 1, when the third lens group 13 is set into the photographic position (the photographic state P) on the photographic optical axis OA, the inclined surface 91a of the preliminary abutment portion 91 of the third lens retaining frame 31 comes into contact (surface contact) with the inclined receiving surface 92a of the preliminary reception portion 92 first, and the stopper 31a of the third lens retaining frame 31 subsequently abuttingly engages with the third group secondary guide shaft 33. Thereby, the kinetic energy produced by the rotation of the third lend retaining frame 31 can be absorbed in two steps. For this reason, it is possible to lower a collision sound which occurs upon setting the third lens group 13 into the photographic position (the photographic state P) on the photographic optical axis OA. The reason for this can be deduced as follows. FIGS. 33A and 33B are schematic graphs showing temporal change in the intensity I of a sound; FIG. 33A shows an example of the temporal change corresponding to collision sounds which occurs in the configuration of the invention in which the rotation is stopped by two abutments; and FIG. 33B shows an example of the temporal change corresponding to a collision sound which occurs in a configuration in which the rotation is stopped by one abutment. The rotation of the third lens retaining frame 31 is stopped by the abutting engagement of the stopper 31a with the third group secondary guide shaft 33. For this reason, the total amount of kinetic energy absorbed when the stopper 31a is allowed to directly abut on the third group secondary guide shaft 33 is equal to the total amount of kinetic energy absorbed when the stopper 31a is allowed to directly abut on the third group secondary guide shaft 33 after the inclined surface 91a of the preliminary abutment portion 91 is brought into surface contact with the inclined receiving surface 92a of the preliminary reception portion 92 as in the case of the invention. In this respect, the intensity I of a sound produced due to the abutment is basically in proportion to the absorbed kinetic energy. In this context, in the case where the stopper 31a is allowed to directly abut on the third group secondary guide shaft 33 after the inclined surface 91a of the preliminary abutment portion 91 is caused to abut on the inclined receiving surface 92a of the preliminary reception portion 92 as in the case of the invention, the kinetic energy produced by the rotation of the third lens retaining frame 31 can be absorbed in two steps, and accordingly collision sounds which, as shown in FIG. 33A, include the respective two local maximum values (peak values) can be caused. By contrast to this, in the case where the stopper 31a is allowed to directly abut on the third group secondary guide shaft 33, a collision sound which, as shown in FIG. 33B, is in proportion to all the kinetic energy produced by the rotation of the third lens retaining frame 31 occurs. Accordingly, the maximum value (peak value) of the sound intensity I is larger than those in the configuration of the invention. Judging from this, when the kinetic energy is absorbed by multiple steps, the collision sounds can be made smaller in intensity. The two-step absorption of the kinetic energy produced by the rotation of the third lens retaining frame 31 thus makes it possible to reduce the maximum value (peak value) of the sound intensity I, and thereby to lower the collision sound which occurs due to the setting of the third lens group 13 into the photographic position (the photographic state P) on the photographic optical axis OA.

Furthermore, in the lens barrel 10, when the third lens group 13 is set into the photographic position (the photographic state P) on the photographic optical axis OA, the inclined surface 91a of the preliminary abutment portion 91 of the third lens retaining frame 31 and the inclined receiving surface 92a of the preliminary reception portion 92 which are both made of the resin material come into contact (surface contact) with each other before the stopper 31a of the rotated third lens retaining frame 31 abuttingly engages with the third group secondary guide shaft 33. For this reason, it is possible to lower the collision sound which occurs due to the setting of the third lens group 13 into the photographic position (the photographic state P) on the photographic optical axis OA. The third group secondary guide shaft 33 is a member on which the stopper 31a abuts for the purpose of positioning the third lens retaining frame 31, namely, the third lend group 13 onto the photographic optical axis OA. For this reason, the third group secondary guide shaft 33 is required to have higher precision and durability, and is accordingly made of a hard material which does not easily deform (a metal material in Embodiment 1). Because of this, a larger collision sound occurs when the stopper 31a comes into contact with the third group secondary guide shaft 33 for the purpose of stopping the rotation of the third lens retaining frame 31 than when the inclined surface 91a of the preliminary abutment portion 91 of the third lens retaining frame 31 and the inclined receiving surface 92a of the preliminary reception portion 92 which are both made of the resin material come into contact with each other.

Moreover, in the lens barrel 10 of Embodiment 1, after the inclined surface 91a of the preliminary abutment portion 91 of the third lens retaining frame 31 comes into contact (surface contact) with the inclined receiving surface 92a of the preliminary reception portion 92, the stopper 31a of the rotated third lens retaining frame 31 abuttingly engages with the third group secondary guide shaft 33. Thus, part of the kinetic energy produced by the rotation of the third lens retaining frame 31 is absorbed by the abutment of the inclined surface 91a of the preliminary abutment portion 91 on the inclined receiving surface 92a of the preliminary reception portion 92. For this reason, it is possible to reduce the collision sound which occurs due to the abutment of the stopper 31a of the third lens retaining frame 31 on the third group secondary guide shaft 33 which is made of the metal material.

In the lens barrel 10 of Embodiment 1, the inclined surface 91a of the preliminary abutment portion 91 of the third lens retaining frame 31 and the inclined receiving surface 92a of the preliminary reception portion 92 are formed as surfaces inclined to the rotational direction of the third lens retaining frame 31. For this reason, the inclined surface 91a and the inclined receiving surface 92a can come into contact (surface contact) with each other while releasing part of the kinetic energy produced by the rotation and receiving the rest of the kinetic energy. In other words, the inclined surface 91a and the inclined receiving surface 92a can come into contact (surface contact) with each other without stopping the rotation of the third lens retaining frame 31. Accordingly, it is possible to reduce the collision sound which occurs due to the abutment of the inclined surface 91a of the preliminary abutment portion 91 on the inclined receiving surface 92a of the preliminary reception portion 92.

The lens barrel 10 of Embodiment 1 is provided with the control switching zone in which: the third lens retaining frame rotating base 95, namely, the third lens retaining frame 31 is capable of moving along the third group primary guide shaft 32 (in the photographic optical axis OA direction); and in the step portion 31c, the abutment portion 35a does not control the rotational posture or position on the optical axis of the third lens retaining frame rotating base 95, namely, the third lens retaining frame 31. For this reason, the third lens retaining frame rotating base 95, namely, the third lens retaining frame 31 can be moved obliquely upward by use of the guiding action by the inclined surface 91a of the preliminary abutment portion 91 of the third lens retaining frame 31 and the inclined receiving surface 92a of the preliminary reception portion 92. Accordingly, after the inclined surface 91a of the preliminary abutment portion 91 of the third lens retaining frame 31 is brought into surface contact with the inclined receiving surface 92a of the preliminary reception portion 92, the stopper 31a of the third lens retaining frame 31 can be caused to abuttingly engage with the third group secondary guide shaft 33. Thus, the kinetic energy produced by the rotation of the third lens retaining frame 31 can be absorbed by two steps.

In the lens barrel 10 of Embodiment 1, the inclined surface 91a of the preliminary abutment portion 91 of the third lens retaining frame 31 and the inclined receiving surface 92a of the preliminary reception portion 92 are formed as surfaces inclined to the rotational direction of the third lens retaining frame 31 and can be in surface contact with each other. For this reason, the inclined surface 91a and the inclined receiving surface 92a can release part of the kinetic energy produced by the rotation by the friction produced by the sliding of the surfaces on each other. For this reason, it is possible to reduce the collision sound which occurs due to the abutment of the stopper 31a of the third lens retaining frame 31 on the third group secondary guide shaft 33.

In the lens barrel 10 of Embodiment 1, the preliminary abutment portion 91 and the stopper 31a are provided to the third lens retaining frame 31 in a way to be in parallel with a plane orthogonal to the photographic optical axis OA, that is to say, in a way to be placed in their respective positions which are different from each other in the photographic optical axis OA direction. For this reason, the position of the stopper 31a can be placed closest to the image surface in the photographic optical axis OA direction; the thickness dimension of the third lens retaining frame 31 in the photographic optical axis OA direction can be made smaller; and the lens barrel 10 as put in the collapsed state can be smaller.

Consequently, in the lens barrel 10 of Embodiment 1, it is possible to lower the collision sound which occurs due to the setting of the third lens group 13 as the retractable lens into the position on the photographic optical axis OA. This is effective for the configuration in which the third lens group 13 is set into the photographic optical axis OA quickly, that is to say, for the configuration in which the speed of the rotation of the third lens retaining frame 31 is made faster. Accordingly, this can make a large contribution to quicker activation of the camera on which the lens barrel 10 of Embodiment 1 is mounted (see FIGS. 17A and 17B).

It should be noted that, although the preliminary reception portion 92 provided to the barrel base 82 in Embodiment 1 is made of the resin material, the material of the preliminary reception portion 92 is not limited to the material of Embodiment 1 and the preliminary reception portion 92 may be made of a material having an impact absorbing function, for example, a rubber material for the purpose of reducing the collision sound which occurs due to the abutment.

(Embodiment 2)

Figure 34:
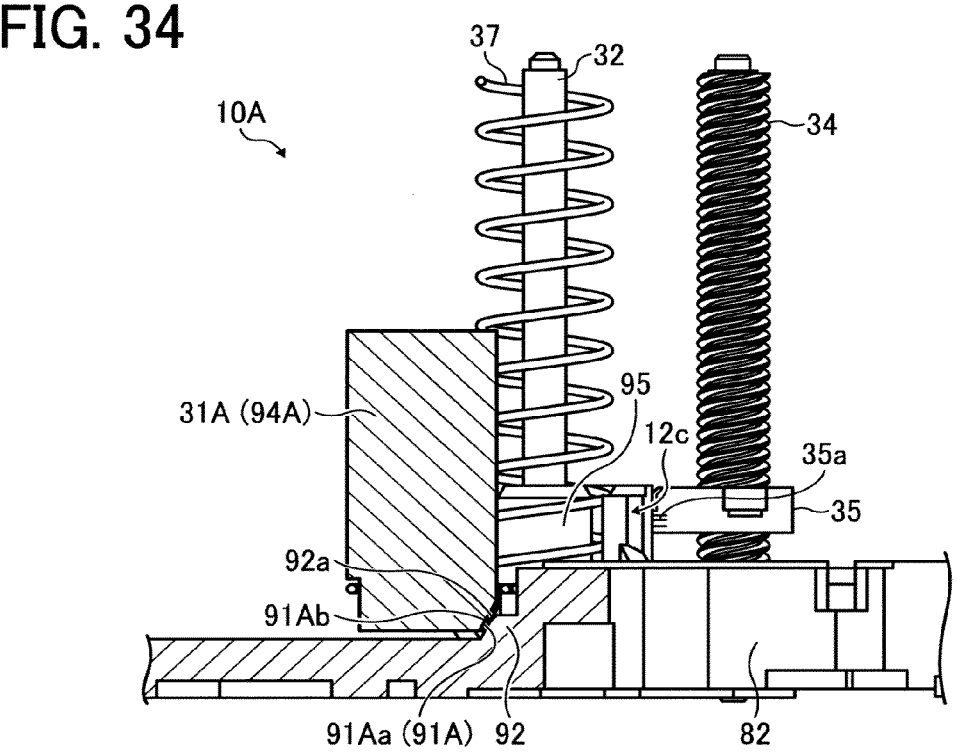
FIG. 34 is a schematic cross-sectional view for explaining a configuration of a preliminary abutment portion 91A of a third lens retaining frame 31A in a lens barrel 10A of Embodiment 2, and shows the configuration in a manner similar to that of FIG. 28.

Next, descriptions will be provided for a lens barrel 10A of Embodiment 2 of the present invention. Embodiment 2 is an embodiment in which a preliminary abutment portion 91A of a third lens retaining frame 31A is different in the configuration. The basic configuration of the lens barrel 10A of Embodiment 2 is the same as that of the lens barrel 10 of Embodiment 1 which has been described above. For this reason, the same configuration parts will be denoted by the same reference signs, and detailed descriptions for such configuration parts will be omitted. FIG. 34 is a schematic cross-sectional view for explaining the configuration of the preliminary abutment portion 91A of the third lens retaining frame 31A in the lens barrel 10A of Embodiment 2, and shows the configuration thereof in a manner similar to that of FIG. 28.

In the lens barrel 10A of Embodiment 2, as shown in FIG. 34, a rubber sheet 91Ab is provided to the preliminary abutment portion 91A of the third lens retaining frame 31A. This rubber sheet 91Ab is made of a rubber material as an instance of a material having an impact absorbing function, and is shaped like a thin plate. The rubber sheet 91Ab is fixed to a third lens retaining frame arm portion 94A of the third lens retaining frame 31A by use of an adhesive material such as an adhesive agent or an adhesive sheet in order that the rubber sheet 91Ab can constitute the surface of an inclined surface 91Aa of the preliminary abutment portion 91A. The position of this rubber sheet 91Ab is set up in a way that, when the third lens retaining frame 31A rotates, the rubber sheet 91Ab comes into surface contact with the inclined receiving surface 92a of the preliminary reception portion 92 provided to the barrel base 82.

For this reason, in the lens barrel 10A of Embodiment 2, when the third lens group 13 is set into the photographic position (the photographic state P) on the photographic optical axis OA, the rubber sheet 91Ab of the preliminary abutment portion 91A of the third lens retaining frame 31A beforehand comes into surface contact with the inclined receiving surface 92a of the preliminary reception portion 92, and subsequently the stopper 31a of the third lens retaining frame 31A engages with the third group secondary guide shaft 33 while abutting thereon.

In this respect, one may consider that the slidability between the inclined surface 91Aa of the preliminary abutment portion 91 and the inclined receiving surface 92a of the preliminary reception portion 92 is deteriorated because the rubber sheet 91Ab is provided on the surface of the inclined surface 91Aa of the preliminary abutment portion 91A. However, the deterioration in the slidability does not hinder the rotation of the third lens retaining frame 31A, that is to say, the storage and insertion actions of the third lens group 13 because: when the third group female screw member 35 is moved upward, the inclined surface 91Aa (the rubber sheet 91Ab) of the preliminary abutment portion 91A and the inclined receiving surface 92a of the preliminary reception portion 92 are detached from each other in the photographic optical axis OA direction; and when the third group female screw member 35 is moved downward, the inclined surface 91Aa (the rubber sheet 91Ab) of the preliminary abutment portion 91A and the inclined receiving surface 92a of the preliminary reception portion 92 are detached from each other in the rotational direction of the third lens holing frame 31A. In addition, because, when the third group female screw member 35 is moved upward, the inclined surface 91Aa (the rubber sheet 91Ab) of the preliminary abutment portion 91A and the inclined receiving surface 92a of the preliminary reception portion 92 are detached from each other in the photographic optical axis OA direction, the stopper 31a of the third lens retaining frame 31A abuttingly engages with the third group secondary guide shaft 33 due to the rotational biasing force from the compression torsion spring 37. Accordingly, the positioning precision of the third lens retaining frame 31A, namely, the third lens group 13 is not influenced by the deterioration in the slidability. Furthermore, in the position where the rubber sheet 91Ab of the inclined surface 91Aa of the preliminary abutment portion 91A abuts on the inclined receiving surface 92a of the preliminary reception portion 92, the amount of movement of the stopper 31a in conjunction with the rotation of the stopper 31a up to the position where the stopper 31a abuttingly engages with the third group secondary guide shaft 33 is extremely small, and the amount of rotational biasing charge of the compress torsion spring 37 is small. For these reason, no large collision sound occurs due to the abutment of the stopper 31a of the third lens retaining frame 31 on the third group secondary guide shaft 33.

The lens barrel 10A of Embodiment 2 can obtain basically the same effect as that in Embodiment 1, because the configuration of the lens barrel 10 of Embodiment 2 is basically the same as that of the lens barrel 10 of Embodiment 1.

In addition, the lens barrel 10A of Embodiment 2 is capable of more reducing the collision sound which occurs due to the abutment of the preliminary abutment portion 91A on the preliminary reception portion 92, because the rubber sheet 91Ab provided to the preliminary abutment portion 91A beforehand comes into surface contact with the inclined receiving surface 92a of the preliminary reception portion 92 which is made of the resin material.

For this reason, the lens barrel 10A of Embodiment 2 is capable of lowering the collision sound which occurs due to the setting of the third lens group 13 as the retractable lens into the position on the photographic optical axis OA.

It should be noted that, although as the impact absorbing member, the rubber sheet 91Ab is provided to the inclined surface 91Aa of the preliminary abutment portion 91A, the impact absorbing member is not limited to the case of Embodiment 2 and this impact absorbing member may be made of, for example, a bristling material as long as the impact absorbing member is made of a material having an impact absorbing function for the purpose of reducing the collision sound which occurs due to the abutment.

It should be noted that, although the preliminary reception portion 92 provided to the barrel base 82 is made of the resin material in Embodiment 2, the material is not limited to the case of Embodiment 2 and the preliminary reception portion 92 may be made of a material having an impact absorbing function for example, a rubber material for the purpose of reducing the collision sound which occurs due to the abutment.

(Embodiment 3)

Figure 35:
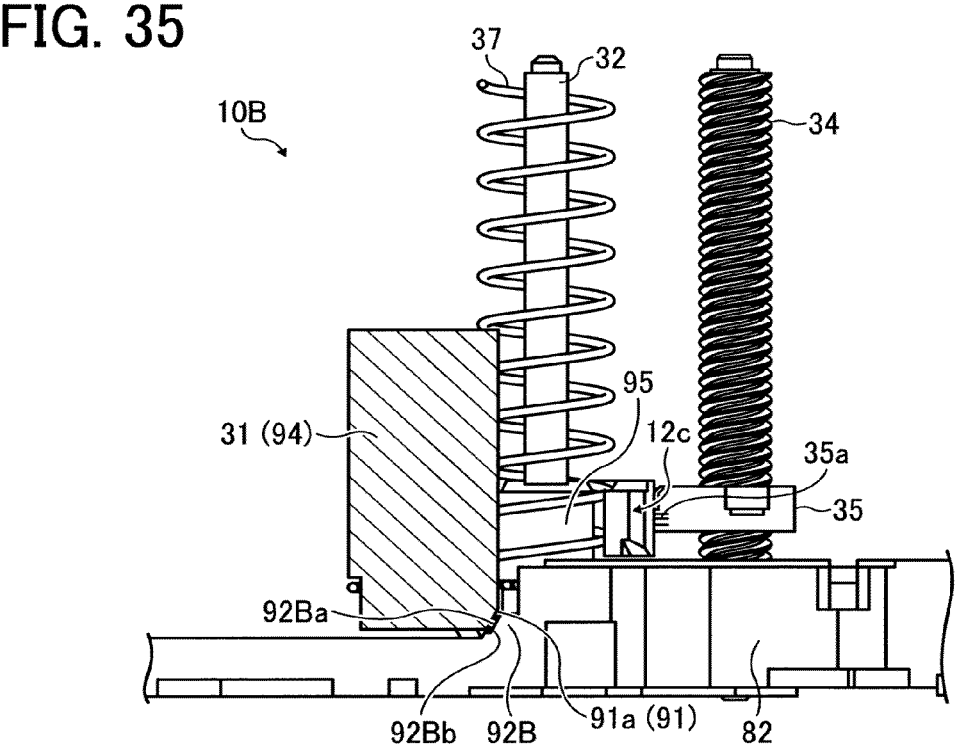
FIG. 35 is a schematic cross-sectional view for explaining a configuration of a preliminary reception portion 92B of a barrel base 82 in a lens barrel 10B of Embodiment 3, and shows the configuration in a manner similar to that of FIG. 28.

Next, descriptions will be provided for a lens barrel 10B of Embodiment 3 of the present invention. Embodiment 3 is an embodiment in which a preliminary reception portion 92B of the barrel base 82 is different in the configuration. The basic configuration of the lens barrel 10B of Embodiment 3 is the same as that of the lens barrel 10 of Embodiment 1 which has been described above. For this reason, the same configuration parts will be denoted by the same reference signs, and detailed descriptions for such configuration parts will be omitted. FIG. 35 is a schematic cross-sectional view for explaining the configuration of the preliminary reception portion 92B of the barrel base 82 in the lens barrel 10B of Embodiment 3, and shows the configuration thereof in a manner similar to that of FIG. 28.

In the lens barrel 10B of Embodiment 3, as shown in FIG. 35, a rubber sheet 92Bb is provided to an inclined receiving surface 92Ba of the preliminary reception portion 92B provided to the barrel base 82. This rubber sheet 92Bb is made of a rubber material as an instance of a material having an impact absorbing function, and is shaped like a thin plate. The rubber sheet 92Bb is fixed to the preliminary reception portion 92B by use of an adhesive material such as an adhesive agent or an adhesive sheet in order that the rubber sheet 92Bb can constitute the surface of the inclined receiving surface 92Ba. The position of this rubber sheet 92Bb is set up in a way that, when the third lens retaining frame 31 rotates, the rubber sheet 92Bb comes into surface contact with the inclined surface 91a of the preliminary abutment portion 91 provided to the third lens retaining frame 31.

For this reason, in the lens barrel 10B of Embodiment 3, when the third lens group 13 is set into the photographic position (the photographic state P) on the photographic optical axis OA, the inclined surface 91a of the preliminary abutment portion 91 of the third lens retaining frame 31 beforehand comes into surface contact with the rubber sheet 92Bb of the inclined receiving surface 92Ba of the preliminary reception portion 92B, and subsequently the stopper 31a of the third lens retaining frame 31 abuttingly engages with the third group secondary guide shaft 33.

The lens barrel 10B of Embodiment 3 can obtain basically the same effect as that in Embodiment 1, because the configuration of the lens barrel 10B of Embodiment 3 is basically the same as that of the lens barrel 10 of Embodiment 1.

In addition, the lens barrel 10B of Embodiment 3 is capable of more reducing the collision sound which occurs due to the abutment of the inclined surface 91a of the preliminary abutment portion 91 on the preliminary reception portion 92B, because the rubber sheet 92Bb of the inclined receiving surface 92Ba of the preliminary reception portion 92B first comes into surface contact with the inclined surface 91a of the preliminary abutment portion 91 of the third lens retaining frame 31 which is made of the resin material.

For this reason, the lens barrel 10B of Embodiment 3 is capable of lowering the collision sound which occurs due to the setting of the third lens group 13 as the retractable lens into the position on the photographic optical axis OA.

It should be noted that, although as the impact absorbing member, the rubber sheet 92Bb is provided to the inclined receiving surface 92Ba of the preliminary reception portion 92B, the impact absorbing member is not limited to the case of Embodiment 3 and this impact absorbing member may be made of, for example, a bristling material as long as the impact absorbing member is made of a material having an impact absorbing function for the purpose of reducing the collision sound which occurs due to the abutment.

In Embodiment 2 described above, the rubber sheet 91Ab is provided to the inclined surface 91Aa of the preliminary abutment portion 91A as one of the members which are beforehand brought into contact (surface contact) with each other; and in Embodiment 3 described above, the rubber sheet 92Bb is provided to the inclined receiving surface 92Ba of the preliminary reception portion 92B as the other of the members which are beforehand brought into contact (surface) contact with each other. Otherwise, the invention may be also carried out with a configuration obtained by combining Embodiment 2 and Embodiment 3 together, that is to say, a configuration in which an impact absorbing member is provided to both the inclined surface 91Aa and the inclined receiving surface 92Bb.

(Embodiment 4)

Next, descriptions will be provided for a lens barrel 10C of Embodiment 4 of the present invention with reference to FIGS. 36 to 41. Embodiment 4 is an embodiment in which a fourth lens retaining frame 41C, namely, the fourth lens group 14 is configured to be storable and insertable, that is to say, an embodiment in which the fourth lens group 14 is set up as a retractable lens configured to be retracted outward (out of the photographic optical axis OA) from an inner diameter position of the movable cylinder. The basic configuration of the lens barrel 10C of Embodiment 4 is the same as that of the lens barrel 10 of Embodiment 1 which has been described above. For this reason, the same configuration parts will be denoted by the same reference signs, and detailed descriptions for such configuration parts will be omitted.

Figure 37:
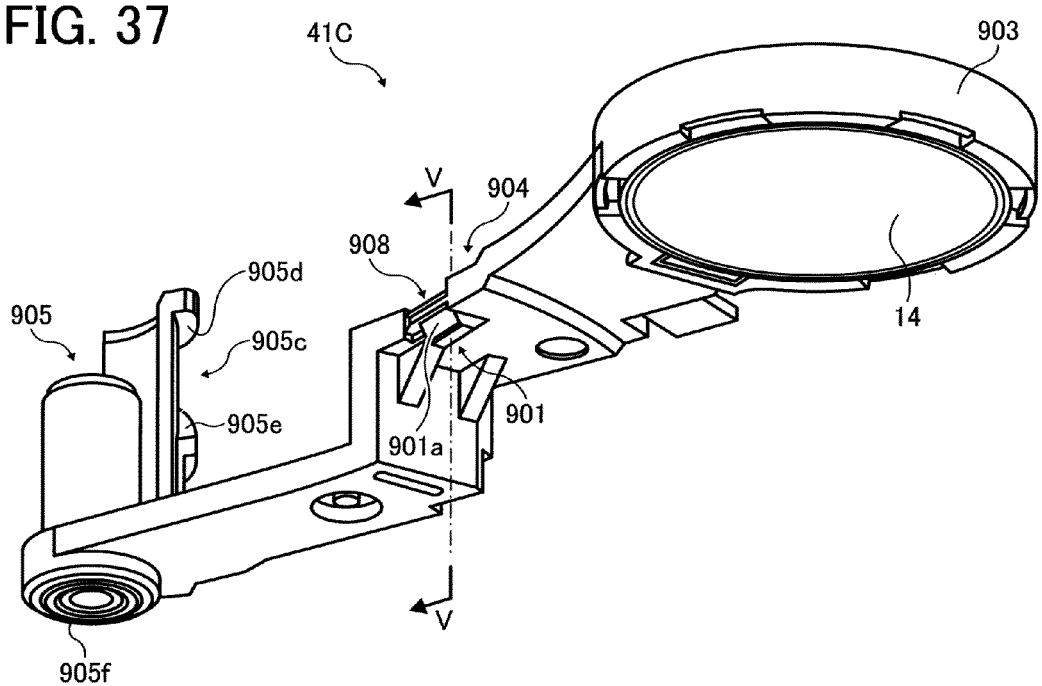
FIG. 37 is a schematic perspective view for explaining a configuration of the fourth lens retaining frame 41C.
Figure 38:
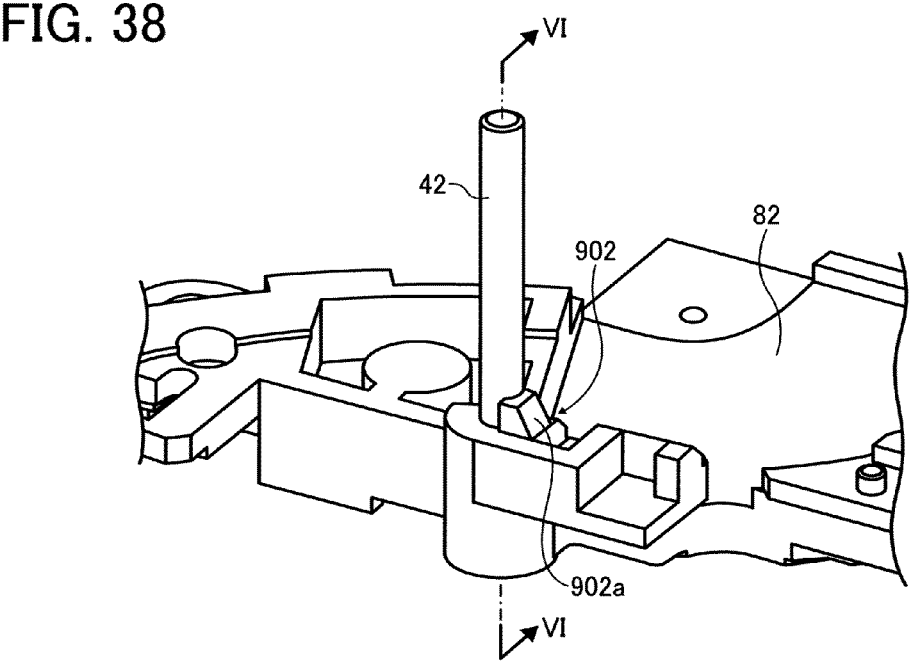
FIG. 38 is a schematic perspective view showing configurations of a fourth group primary guide shaft 44 and a preliminary reception portion 902 on the barrel base 82.
Figure 39:
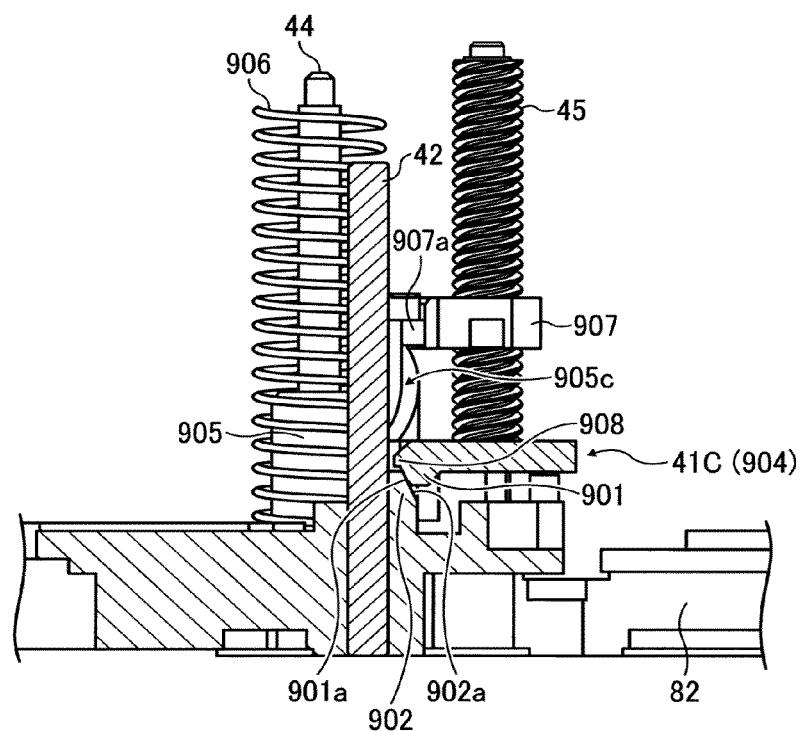
FIG. 39 is a diagram for explaining action which is taken when the fourth lens retaining frame 41C rotates between the storage position and the photographic position, and shows how an inclined surface 901a of a preliminary abutment portion 901 abuts on an inclined receiving surface 902a of the preliminary reception portion 902.
Figure 40:
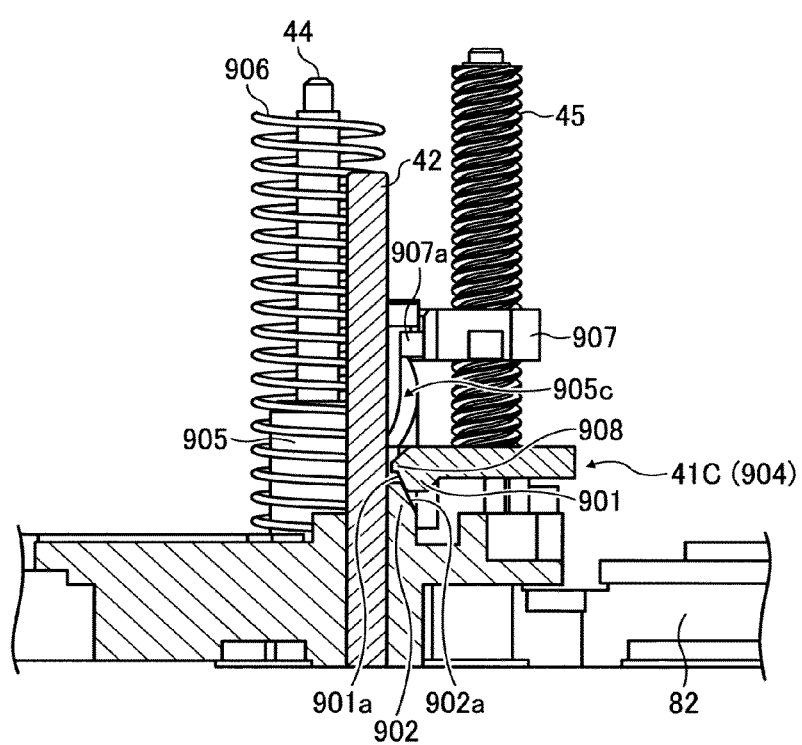
FIG. 40 is an explanatory diagram showing a state which is observed when the fourth lens retaining frame 41C slightly rotates from a position shown in FIG. 39 toward the photographic position, and shows the state in a manner similar to that of FIG. 39.
Figure 41:
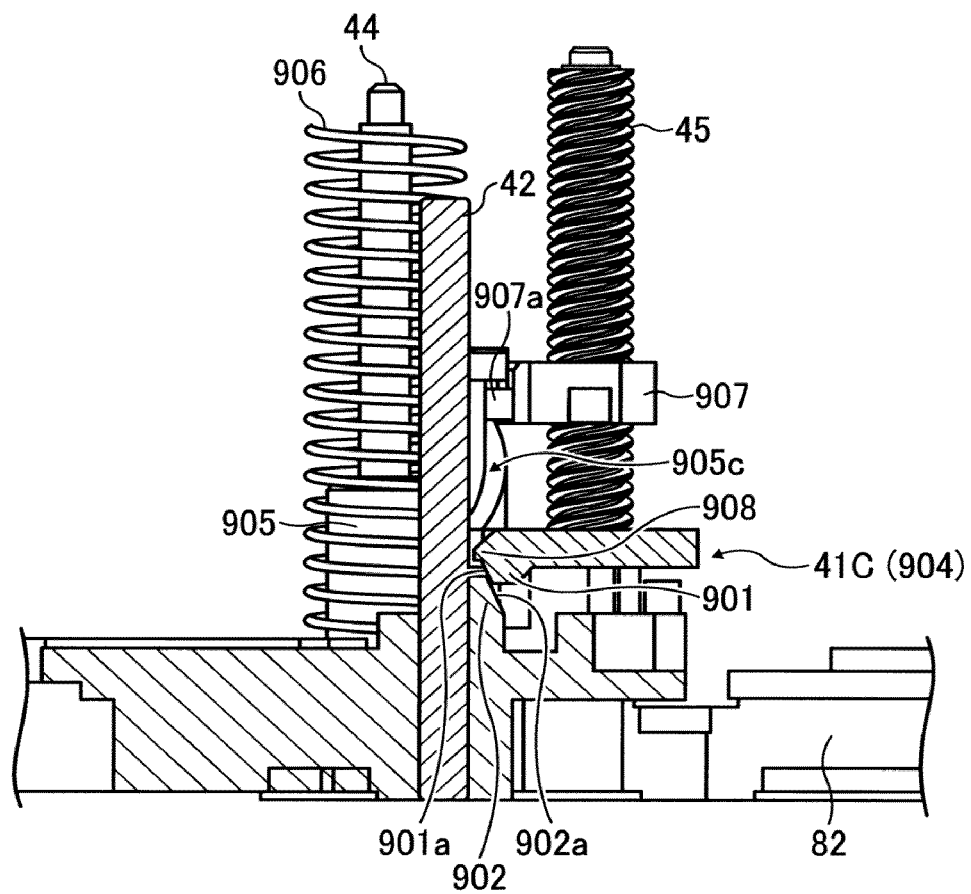
FIG. 41 is a diagram for explaining action which is taken when the fourth lens retaining frame 41C rotates between the storage position and the photographic position, and shows how the fourth group primary guide shaft 44 abuts on a stopper 908, and shows the configuration in a manner similar to that of FIG. 39.

It should be noted that, in FIGS. 39 to 41, a view of the fourth lens retaining frame 41C is equivalent to a cross section of the fourth lens retaining frame 41C taken along the V-V line of FIG. 37, and a view of a configuration on and above the barrel base 82 is equivalent to a cross section of the configuration on and above the barrel 82 which is taken along the VI-VI line of FIG. 38. Furthermore, because, as described above, a fourth group screw female member 907 in the fourth group lead screw 45 has the same action as that of the third group female screw member 35 in the third group lead screw member 34, FIGS. 25A to 25C will be hereinafter used to explain height positions (the retraction starting position B, the storage position S and the like) of the fourth group female screw member 907.

Figure 36:
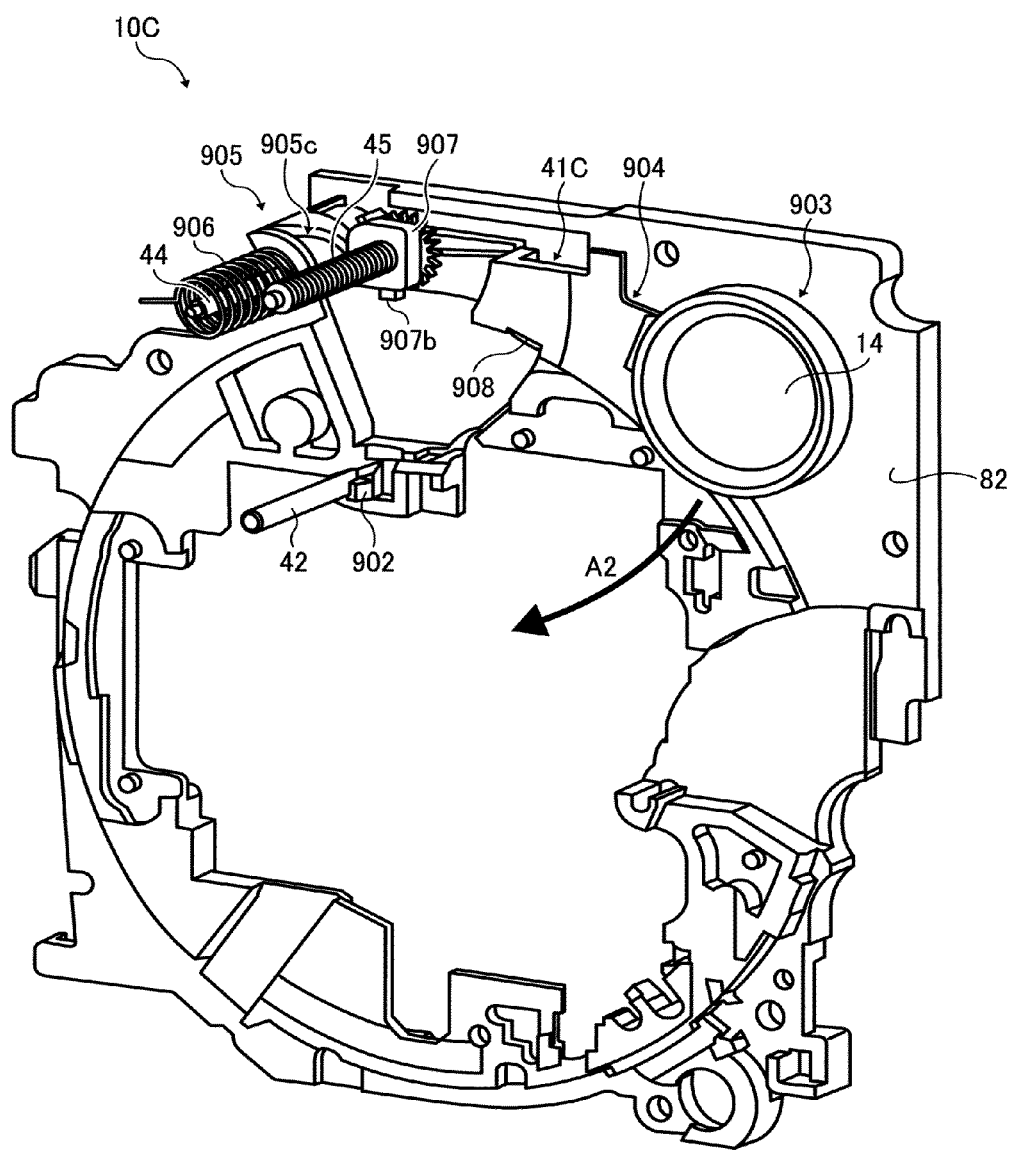
FIG. 36 is an explanatory diagram for explaining a configuration for rotation of a fourth lens retaining frame 41C above the barrel base 82 in a lens barrel 10C of Embodiment 4, and is shown in the form of a schematic perspective view.

In the lens barrel 10C of Embodiment 4, as described in FIG. 36, the fourth lens retaining frame 41C is configured to be rotatable around the fourth group primary guide shaft 44; a preliminary abutment portion 901 (see FIG. 37) is provided to the fourth lens retaining frame 41C; and a preliminary reception portion 902 is provided to the barrel base 82.

The fourth lens retaining frame 41C is made of a resin material. As shown in FIG. 37, the fourth lens retaining frame 41C includes a fourth lens retaining portion 903, a fourth lens retaining frame arm portion 904 and a fourth lens retaining frame rotating base 905.

The fourth lens retaining frame rotating base 905 is shaped like a cylinder as a whole, and is movably rotatably supported by the fourth group primary guide shaft 44 (see FIG. 36). Instead of the fourth group spring 43 (see FIGS. 20A and 20B), a compression torsion spring 906 whose configuration is similar to that of the compression torsion spring 37 is provided to the lens barrel 10C and is put around the fourth group primary guide shaft 44 (see FIG. 36). Furthermore, instead of the fourth group female screw member 46 (see FIGS. 20A and 20B), the fourth group female screw member 907 whose configuration is similar to that of the third group female screw member 35 is screwed to the fourth group lead screw 45 (see FIG. 36). This fourth group female screw member 907 includes: an abutment portion 907a (see FIG. 39 and other drawings) whose configuration is similar to that of the abutment portion 35a of the third group female screw member 35; and a rotation-stopping protrusion 907b whose configuration is similar to that of the rotation-stopping protrusion 35b of the third group female screw member 35. This rotation-stopping protrusion 907b fittingly slides in a guide groove (not illustrated) formed in the fixed barrel portion 21a of the fixed frame 21, which is parallel with the photographic optical axis OA direction, and functions as a rotation stopper for preventing the fourth group female screw member 907 from rotating in response to the rotation of the fourth group lead screw 45. In other words, the fourth group female screw member 907 moves forward and backward on the fourth group lead screw 45 along the photographic optical axis OA due to the rotation of the fourth group lead screw 45 because the rotation of the fourth group female screw member 907 is blocked by the fitting of the rotation-stopping protrusion 907b in the guide groove in the fixed frame 21.

By the compression torsion spring 906, the fourth lens retaining frame rotating base 905 is always rotationally biased in the rotational direction from the storage position toward the photographic position which is a position on the photographic optical axis OA (see an arrow A2 in FIG. 36), and is always straight biased from the object side toward the pressure plate 81, which is close to the image surface, on the fourth group primary guide shaft 44. For this reason, the fourth lens retaining frame rotating base 905 is situated in a rearmost position in the movable range on the fourth group primary guide shaft 44 (a position close to the image surface, and a lower position in FIG. 39) in a case where the fourth lens retaining frame rotating base 905 receives no forward pressing force (toward the object, and upward in FIG. 39) from the fourth group female screw member 907, that is to say, in a case where the fourth group female screw member 907 is situated between the retraction starting position B and the storage position S. What is continued to this fourth lens retaining frame rotating base 905 is the fourth lens retaining frame arm portion 904. For this reason, the compression torsion spring 906 functions as cylindrical body biasing means for giving a biasing force to the fourth lens retaining frame rotating base 905 as a rotary cylindrical body constituting a base for rotating the fourth lens retaining frame 41C which is a retractable lens retaining frame.

A step portion 905c similar to the step portion 31c of the third lens retaining frame 31 is provided in an outer peripheral surface of the fourth lens retaining frame rotating base 905. This step portion 905c is shaped like a recess in the cylindrical peripheral surface while having; a cam portion 905e (corresponding to the cam portion 31e), which is shaped like a cam inclination, in its base end-side portion; and a front-side engagement portion 905d (corresponding to the front-side engagement portion 31d), in which a flat surface almost orthogonal to the fourth group primary guide shaft 44 is formed, in its front end-side portion. The step portion 905c receives the abutment portion 907a of the fourth group female screw member 907. The fourth lens retaining frame rotating base 905 is rotated by receiving a pressing force from the fourth group female screw member 907, which is moved straight forward and backward in response to the rotation of the fourth group lead screw 45, due to the slide between the cam portion 905e of the step portion 905c and the abutment portion 907a of the fourth group female screw member 907. For this reason, the step portion 905c functions as a cam groove, and the abutment portion 907a of the fourth group female screw member 907 functions as a cam pin. In addition, when the abutment portion 907a of the fourth group female screw member 907 abuts on the front-side engagement portion 905a and is further moved forward (to the wide-angle position W, the telephoto position T, or the like), the abutment portion 907a presses the front-side engagement portion 905d forward, and accordingly raises the fourth lens retaining frame rotating base 905 forward. For this reason, the fourth lens group 14 is moved toward the object appropriately. Moreover, while the fourth lens retaining frame rotating base 905 is not raised forward by the fourth group female screw member 907 (the abutment portion 907a), a base end surface 905f of the fourth lens retaining frame 41C abuts on the pressure plate 81 (see FIG. 14A) due to the straight biasing force from the compression torsion spring 906.

The fourth lens retaining frame arm portion 904 connects the fourth lens retaining frame rotating base 905 and the fourth lens retaining portion 903 together, and constitutes an arm portion of the fourth lens retaining frame 41C. As a whole, an intermediate position of the fourth lens retaining frame arm portion 904 constitutes a crank-shaped winding portion, which extends in a direction parallel with the fourth group primary guide shaft 44. The fourth lens retaining portion 903 continues to an end of the fourth lens retaining frame arm portion 904.

The fourth lens retaining portion 903 is located in an end-side portion of the fourth lens retaining portion 41C, and retains the fourth lens group 14. As a whole, the fourth lens retaining portion 903 is a frame member shaped like a cylinder.

The fourth lens retaining frame 41C is provided with the preliminary abutment portion 901 and a stopper 908. In the fourth lens retaining frame arm portion 904, the preliminary abutment portion 901 and the stopper 908 are provided in a portion which extends toward the fourth lens retaining portion 903 from the intermediate position extending in a direction parallel with the fourth group primary guide shaft 44 in a way that the preliminary abutment portion 901 and the stopper 908 are in parallel in the direction of the fourth group primary guide shaft 44, namely, the photographic optical axis OA. The stopper 908 has the same function as that of the stopper 31a of the third group secondary guide shaft 33 in the third lens retaining frame 31. The stopper 908 has a positional relationship in which, when the stopper 908 abuttingly engages with the fourth group secondary guide shaft 42 provided to the barrel base 82, the stopper 908 puts the fourth lens retaining frame 41C in the photographic position in which the fourth lens group 14 is located on the photographic optical axis OA. This stopper 908 is formed by forming a flat surface on part of the fourth lens retaining frame arm portion 904.

The preliminary abutment portion 901 is located below the stopper 908 (closer to the image surface), and is formed projecting downward from the fourth lens retaining frame arm portion 904, as well as includes an inclined surface 901a. The preliminary abutment portion 901 is inclined with respect to the extension direction of the fourth group primary guide shaft 44 (the photographic optical axis OA direction in the case of Embodiment 4), which is a direction of the rotational axis of the fourth lens retaining frame 41C, in a way that, as the preliminary abutment portion 901 goes downward, the preliminary abutment portion 901 goes inward (in a direction opposite to the rotational direction toward the photographic optical axis OA).

As shown in FIG. 38, the preliminary reception portion 902 is provided to the barrel base 82 in a way to be adjacent to the fourth group secondary guide shaft 42. This preliminary reception portion 902 is located on a path along which the fourth lens retaining frame 41C as the retractable lens retaining frame moves from the collapsed state to the photographic state. The preliminary reception portion 902 is formed projecting from the upper surface of the barrel base 82, which is made of the resin material, toward the object, and includes an inclined receiving surface 902a which has the same height position (the same position when viewed in the photographic optical axis OA direction) as that of the preliminary abutment portion 901 of the fourth lens retaining frame 41C in order for the preliminary reception portion 902 to be opposed to the preliminary abutment portion 901. This inclined receiving surface 902a is inclined with respect to the direction of the rotational axis of the fourth lens retaining frame 41C (the direction in which the fourth group primary guide shaft 44 extends, that is to say, the photographic optical axis OA direction) in a way that, as the inclined receiving surface 902a becomes closer to the object as the photographic subject, the inclined receiving surface 902a regresses in the rotational direction in which the fourth lens retaining frame 41C becomes closer to the photographic optical axis OA, including toward a radial direction around the rotational axis of the fourth lens retaining frame 41C.

This preliminary abutment portion 901 and the preliminary reception portion 902 have a positional relationship in which, when the fourth lens retaining frame 41C is rotated in the rotational direction toward the photographic optical axis OA, the inclined surface 901a and the inclined receiving surface 902a come into surface contact with each other before the stopper 908 comes into contact with the fourth group secondary guide shaft 42.

Next, descriptions will be provided for action which is taken when the fourth lens retaining frame 41C of the lens barrel 10C rotates between the storage position in which the fourth lens group 14 is retracted from the fixed barrel portion 21a of the fixed frame 21 to the outside and the photographic position in which the fourth lens group 14 is inserted onto the photographic optical axis OA by use of FIGS. 39 to 41.

In the lens barrel 10C of Embodiment 4, as described above, when the fourth group motor 53 is rotated clockwise in FIG. 14B (clockwise when viewed from the barrel front), the fourth group lead screw 45 rotates clockwise and the fourth group female screw member 907 moves from the storage position S toward the photographic subject in the photographic optical axis OA direction. In the lens barrel 10C, when the fourth lens group 14 is moved from the storage position to the photographic position on the photographic optical axis OA (see the arrow A2), the fourth group female screw member 907 is moved from the storage position S to the uppermost position of the control switching zone through the rotational posture controlling zone, that is to say, from the storage position S to the height position Ll (the retraction starting position B) through the height position Rl and the height position Rh. On this occasion, the fourth lens retaining frame rotating base 905, namely, the fourth lens retaining frame 41C rotates in accordance with the position of the fourth group female screw member 907 within the rotational posture controlling zone due to the rotational biasing force of the compression torsion spring 906.

In this respect, let us assume that the fourth group female screw member 907 (the abutment portion 907a) stops in the intermediate position in the control switching zone as in Embodiment 1 while the following description will be provided for the action, and in FIGS. 39 to 41, for the purpose of easy understanding. It should be noted that, irrespective of whether the fourth group female screw member 907 (the abutment portion 907a) is moving past or stops in an arbitrary position between the rotational posture controlling zone and the height position Ll (the retraction starting position B) in the control switching zone, the following action similarly takes place when the third lens retaining frame rotating base 905, namely, the fourth lens retaining frame 41C is not hindered from moving toward the object (upward) as a result of the abutment of a lower end of the abutment portion 907a (corresponding to the abutment peripheral portion 35e as described below) on the cam portion 905e.

While the fourth group female screw member 907 is in the process of reaching the intermediate position in the control switching zone beyond the height position Rh, the stopper 908 and the preliminary abutment portion 901 of the fourth lens retaining frame 41C come closer to the fourth group secondary guide shaft 42 and the preliminary reception portion 902 which are provided to the barrel base 82. Subsequently, as shown in FIG. 39, the inclined surface 901a of the preliminary abutment portion 901 comes into surface contact with the inclined receiving surface 902a of the preliminary reception portion 902 because of their positional relationship. On this occasion, the stopper 908 does not abut on or engage with the fourth group secondary guide shaft 42. For this reason, even though the fourth group female screw member 907 is located in the control switching zone, the fourth lens group 14 is not set in the photographic position on the photographic optical axis OA.

Thereafter, as shown in FIG. 40, the fourth lens retaining frame rotating base 905, namely the fourth lens retaining frame 41C moves toward the object (upward when viewed from front) in the photographic optical axis OA direction while rotating toward the photographic optical axis OA due to the rotational biasing force from the compression torsion spring 906 (the rotational motion of the fourth lens retaining frame 41C) as well as the guiding operation by the inclined surface 901a of the preliminary abutment portion 901 and the inclined receiving surface 902a of the preliminary reception portion 902 which are in surface contact with each other. In other words, the inclined surface 901a of the preliminary abutment portion 901 and the inclined receiving surface 902a of the preliminary reception portion 902 are kept in surface contact with each other while the preliminary abutment portion 901 is moving upward, and the stopper 908 does not abut on or engage with the fourth group secondary guide shaft 42 although the stopper 908 comes much closer to the fourth group secondary guide shaft 42. On this occasion, because the fourth group female screw member 907 is located in the intermediate position in the control switching zone, the lower end of the abutment portion 907a (corresponding to the abutment peripheral portion 95e) does not abut on the cam portion 905e, and the upward movement of the fourth lens retaining frame rotating base 905 is accordingly not hindered by the abutment portion 907a.

After that, as shown in FIG. 40, the fourth lens retaining frame rotating base 905, namely, the fourth lens retaining frame 41C moves toward the object (upward when viewed from the front) in the photographic optical axis OA direction while rotating toward the photographic optical axis OA due to the rotational biasing force from the compression torsion spring 906 (the rotational motion of the fourth lens retaining frame 41C) as well as the guiding operation by the inclined surface 901a of the preliminary abutment portion 901 and the inclined receiving surface 902a of the preliminary reception portion 902 which are in surface contact with each other. Thereby, the inclined surface 901a of the preliminary abutment portion 901 and the inclined receiving surface 902a of the preliminary reception portion 902 are kept in surface contact with each other while the preliminary abutment portion 901 is moving upward, and the stopper 908 abuttingly engages with the fourth group secondary guide shaft 42. Accordingly, the fourth lens group 14 is set in the photographic position on the photographic optical axis OA.

Thereafter, the fourth group female screw member 907 is located in the height position Ll (the retraction starting position B) and its height position is appropriately controlled as described above. Thus, the position of the fourth lens retaining frame 41C, namely, the fourth lens group 14 in the photographic optical axis OA direction (the wide-angle position W, the telephoto position T, or the like) is controlled.

As described above, in the lens barrel 10C of Embodiment 4, when the fourth lens group 14 is set into the photographic position on the photographic optical axis OA, the inclined surface 901a of the preliminary abutment portion 901 of the fourth lens retaining frame 41C comes into surface contact with the inclined receiving surface 902a of the preliminary reception portion 902 first, and the stopper 908 of the fourth lens retaining frame 41C subsequently abuttingly engages with the fourth group secondary guide shaft 42. Thereby, the kinetic energy produced by the rotation of the fourth lend retaining frame 41C can be absorbed in two steps. For this reason, it is possible to lower the collision sound which occurs upon setting the fourth lens group 14 into the photographic position (the photographic state P) on the photographic optical axis OA.

Furthermore, in the lens barrel 10C, when the fourth lens group 14 is set into the photographic position (the photographic state P) on the photographic optical axis OA, the inclined surface 901a of the preliminary abutment portion 901 of the fourth lens retaining frame 41C and the inclined receiving surface 902a of the preliminary reception portion 902 which are both made of the resin material come into surface contact with each other before the stopper 908 of the rotated fourth lens retaining frame 41C abuttingly engages with the fourth group secondary guide shaft 42. For this reason, it is possible to lower the collision sound which occurs due to the setting of the fourth lens group 14 into the photographic position (the photographic state P) on the photographic optical axis OA.

Moreover, in the lens barrel 10C of Embodiment 4, after the inclined surface 901a of the preliminary abutment portion 901 of the fourth lens retaining frame 41C comes into surface contact with the inclined receiving surface 902a of the preliminary reception portion 902, the stopper 908 of the rotated fourth lens retaining frame 41C abuttingly engages with the fourth group secondary guide shaft 42. Thus, part of the kinetic energy produced by the rotation of the fourth lens retaining frame 41C is absorbed by the surface contact of the inclined surface 901a of the preliminary abutment portion 901 on the inclined receiving surface 902a of the preliminary reception portion 902. For this reason, it is possible to reduce the collision sound which occurs due to the abutment of the stopper 908 of the fourth lens retaining frame 41C on the fourth group secondary guide shaft 42 which is made of the metal material.

In the lens barrel 10C of Embodiment 4, the inclined surface 901a of the preliminary abutment portion 901 of the fourth lens retaining frame 41C and the inclined receiving surface 902a of the preliminary reception portion 902 are formed as surfaces inclined to the rotational direction of the fourth lens retaining frame 41C. For this reason, part of the kinetic energy produced by the rotation can be released and the rest of the kinetic energy can be received. In other words, the inclined surface 901a and the inclined receiving surface 902a can come into contact (surface contact) with each other without stopping the rotation of the fourth lens retaining frame 41C. Accordingly, it is possible to reduce the collision sound which occurs due to the abutment of the inclined surface 901a of the preliminary abutment portion 901 and the inclined receiving surface 902a of the preliminary reception portion 902.

The lens barrel 10C of Embodiment 4 is provided with the control switching zone in which, in the step portion 905c, the abutment portion 907a does not control the rotational posture or position on the optical axis of the fourth lens retaining frame rotating base 905, namely, the fourth lens retaining frame 41C. For this reason, the fourth lens retaining frame rotating base 905, namely, the fourth lens retaining frame 41C can be moved obliquely upward by use of the guiding action by the inclined surface 901a of the preliminary abutment portion 901 of the fourth lens retaining frame 41C and the inclined receiving surface 902a of the preliminary reception portion 902. Accordingly, after the inclined surface 901a of the preliminary abutment portion 901 of the fourth lens retaining frame 41C is brought into surface contact with the inclined receiving surface 902a of the preliminary reception portion 902, the stopper 908 of the fourth lens retaining frame 41C can be caused to abuttingly engage with the fourth group secondary guide shaft 42. Thus, the kinetic energy produced by the rotation of the fourth lens retaining frame 41C can be absorbed by two steps.

In the lens barrel 10C of Embodiment 4, the inclined surface 901a of the preliminary abutment portion 901 of the fourth lens retaining frame 41C and the inclined receiving surface 902a of the preliminary reception portion 902 are formed as surfaces inclined to the rotational direction of the fourth lens retaining frame 41C, the inclined surface 91a and the inclined receiving surface 92a can release part of the kinetic energy produced by the rotation by the friction produced by the sliding of the surfaces on each other. For this reason, it is possible to reduce the collision sound which occurs due to the abutment of the stopper 908 of the fourth lens retaining frame 41C on the fourth group secondary guide shaft 42.

In the lens barrel 10C of Embodiment 4, the preliminary abutment portion 901 and the stopper 908 are provided to the fourth lens retaining frame 41C in a way to be in parallel with each other in the photographic optical axis OA. In other words, the preliminary abutment portion 901 and the stopper 908 are placed in the same position when viewed in the photographic optical axis OA direction. In addition, the fourth lens group 14 is configured to be movable in the photographic optical axis OA direction. For these reason, it is easy to set the positions in order to beforehand bring the inclined surface 901a of the preliminary abutment portion 901 of the fourth lens retaining frame 41C and the inclined receiving surface 902a of the preliminary reception portion 902 into surface contact with each other, and to subsequently bring the stopper 908 of the fourth lens retaining frame 41C and the fourth group secondary guide shaft 42 into contact with each other.

Consequently, in the lens barrel 10C of Embodiment 4, it is possible to lower the collision sound which occurs due to the setting of the fourth lens group 14 as the retractable lens into the position on the photographic optical axis OA. This is effective for the configuration in which the fourth lens group 14 is set into the photographic optical axis OA quickly, that is to say, for the configuration in which the speed of the rotation of the fourth lens retaining frame 41C is made faster. Accordingly, this can make a large contribution to quicker activation of the camera on which the lens barrel 10C of Embodiment 4 is mounted (see FIGS. 17A and 17B).

It should be noted that, although the preliminary reception portion 902 provided to the barrel base 82 in Embodiment 4 is made of the resin material, the material of the preliminary reception portion 902 is not limited to the material of Embodiment 4 and the preliminary reception portion 902 may be made of a material having an impact absorbing function, for example, a rubber material for the purpose of reducing the collision sound which occurs due to the abutment.

(Embodiment 5)

Figure 42:
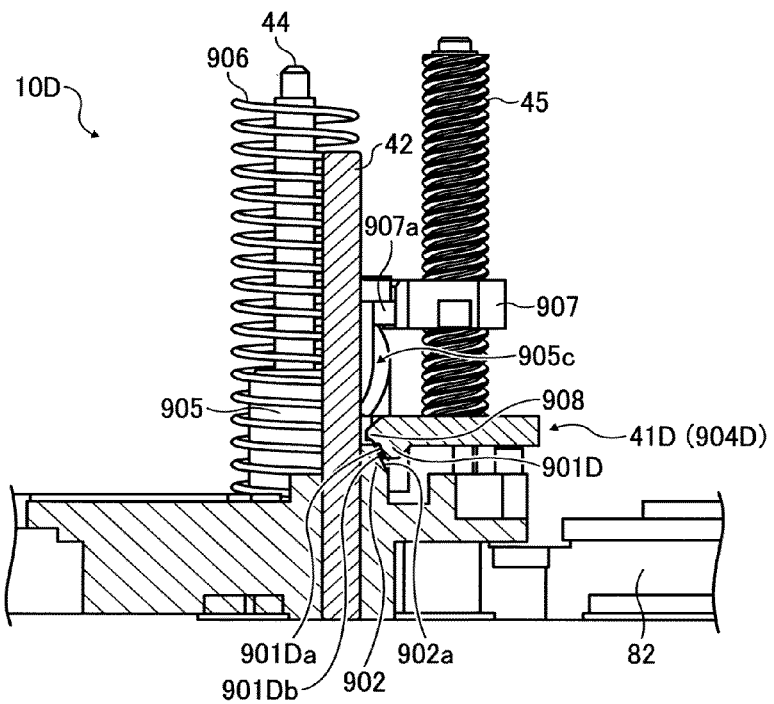
FIG. 42 is a schematic cross-sectional view for explaining a configuration of a preliminary abutment portion 901D of a fourth lens retaining frame 41D in a lens barrel 10D of Embodiment 5, and shows the configuration in a manner similar to that of FIG. 39.

Next, descriptions will be provided for a lens barrel 10D of Embodiment 5 of the present invention. Embodiment 5 is an embodiment in which a preliminary abutment portion 901D of a fourth lens retaining frame 41D is different in the configuration. The basic configuration of the lens barrel 10D of Embodiment 5 is the same as that of the lens barrel 10C of Embodiment 4 which has been described above. For this reason, the same configuration parts will be denoted by the same reference signs, and detailed descriptions for such configuration parts will be omitted. FIG. 42 is a schematic cross-sectional view for explaining the configuration of the preliminary abutment portion 901D of the fourth lens retaining frame 41D in the lens barrel 10D of Embodiment 5, and shows the configuration thereof in a manner similar to that of FIG. 39.

In the lens barrel 10D of Embodiment 5, as shown in FIG. 42, a rubber sheet 901Db is provided to an inclined surface 901Da of the preliminary abutment portion 901D of the fourth lens retaining frame 41D. This rubber sheet 901Db is made of a rubber material as an instance of a material having an impact absorbing function, and is shaped like a thin plate. The rubber sheet 901Db is fixed to a fourth lens retaining frame arm portion 94D of the fourth lens retaining frame 41D by use of an adhesive material such as an adhesive agent or an adhesive sheet in order that the rubber sheet 901Db can constitute the surface of the inclined surface 901Da of the preliminary abutment portion 901D. The position of this rubber sheet 901Db is set up in a way that, when the fourth lens retaining frame 41D rotates, the rubber sheet 901Db comes into surface contact with the inclined receiving surface 902a of the preliminary reception portion 902 provided to the barrel base 82.

For this reason, in the lens barrel 10D of Embodiment 5, when the fourth lens group 14 is set into the photographic position on the photographic optical axis OA, the rubber sheet 901Db of the preliminary abutment portion 901D of the fourth lens retaining frame 41D beforehand comes into surface contact with the inclined receiving surface 902a of the preliminary reception portion 902, and subsequently the stopper 908 of the fourth lens retaining frame 41D abuttingly engages with the fourth group secondary guide shaft 42.

In this respect, one may consider that the slidability between the inclined surface 901Da of the preliminary abutment portion 901 and the inclined receiving surface 902a of the preliminary reception portion 902 is deteriorated because the rubber sheet 901Db is provided on the surface of the inclined surface 901Da of the preliminary abutment portion 901D. However, the deterioration in the slidability does not hinder the rotation of the fourth lens retaining frame 41D, that is to say, the storage and insertion actions of the fourth lens group 14 because: when the fourth group female screw member 907 is moved upward, the inclined surface 901Da (the rubber sheet 901Db) of the preliminary abutment portion 901D and the inclined receiving surface 902a of the preliminary reception portion 902 are detached from each other in the photographic optical axis OA direction; and when the fourth group female screw member 907 is moved downward, the inclined surface 901Da (the rubber sheet 901Db) of the preliminary abutment portion 901D and the inclined receiving surface 902a of the preliminary reception portion 902 are detached from each other in the rotational direction of the fourth lens holing frame 41D. In addition, because, when the fourth group female screw member 907 is moved upward, the inclined surface 901Da (the rubber sheet 901Db) of the preliminary abutment portion 901D and the inclined receiving surface 902a of the preliminary reception portion 902 are detached from each other in the photographic optical axis OA direction, the stopper 908 of the fourth lens retaining frame 41D abuttingly engages with the fourth group secondary guide shaft 42 due to the rotational biasing force from the compression torsion spring 906. Accordingly, the positioning precision of the fourth lens retaining frame 41D, namely, the fourth lens group 14 is not influenced by the deterioration in the slidability. Furthermore, in the position where the rubber sheet 901Db of the inclined surface 901Da of the preliminary abutment portion 901D abuts on the inclined receiving surface 902a of the preliminary reception portion 902, the amount of movement of the stopper 908 in conjunction with the rotation of the stopper 908 up to the position where the stopper 908 abuttingly engages with the fourth group secondary guide shaft 42 is extremely small, and the amount of rotational biasing charge of the compress torsion spring 906 is small. For these reason, no large collision sound occurs due to the abutment of the stopper 908 of the fourth lens retaining frame 41D on the fourth group secondary guide shaft 42.

The lens barrel 10D of Embodiment 5 can obtain basically the same effect as that in Embodiment 4, because the configuration of the lens barrel 10D of Embodiment 5 is basically the same as that of the lens barrel 10C of Embodiment 4.

In addition, the lens barrel 10D of Embodiment 5 is capable of more reducing the collision sound which occurs due to the abutment of the preliminary abutment portion 901D on the preliminary reception portion 902, because the rubber sheet 901Db provided on the inclined surface 901Da of the preliminary abutment portion 901D beforehand comes into surface contact with the inclined receiving surface 902a of the preliminary reception portion 902 which is made of the resin material.

For this reason, the lens barrel 10D of Embodiment 5 is capable of lowering the collision sound which occurs due to the setting of the fourth lens group 14 as the retractable lens into the position on the photographic optical axis OA.

It should be noted that, although as the impact absorbing member, the rubber sheet 901Db is provided to the inclined surface 901Da of the preliminary abutment portion 901D, the impact absorbing member is not limited to the case of Embodiment 5 and this impact absorbing member may be made of, for example, a bristling material as long as the impact absorbing member is made of a material having an impact absorbing function for the purpose of reducing the collision sound which occurs due to the abutment.

It should be noted that, although preliminary reception portion 902 provided to the barrel base 82 is made of the resin material in Embodiment 5, the material is not limited to the case of Embodiment 5 and preliminary reception portion 902 may be made of a material for example, a rubber material having an impact absorbing function for the purpose of reducing the collision sound which occurs due to the abutment.

(Embodiment 6)

Figure 43:
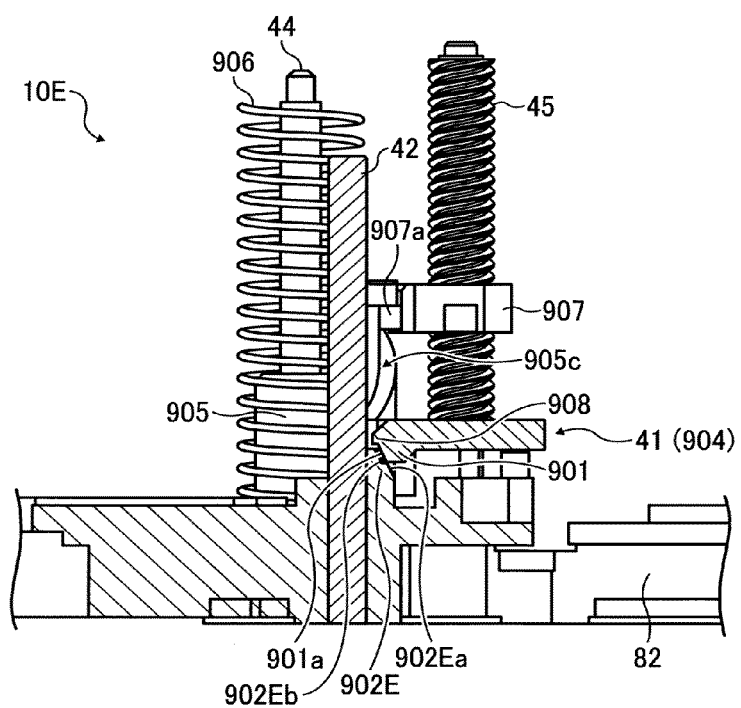
FIG. 43 is a schematic cross-sectional view for explaining a configuration of a preliminary reception portion 902E of the barrel base 82 in a lens barrel 10E of Embodiment 6, and shows the configuration in a manner similar to that of FIG. 39.

Next, descriptions will be provided for a lens barrel 10E of Embodiment 6 of the present invention. Embodiment 6 is an embodiment in which a preliminary reception portion 902E provided of the barrel base 82 is different in the configuration. The basic configuration of the lens barrel 10E of Embodiment 6 is the same as that of the lens barrel 10C of Embodiment 4 which has been described above. For this reason, the same configuration parts will be denoted by the same reference signs, and detailed descriptions for such configuration parts will be omitted. FIG. 43 is a schematic cross-sectional view for explaining the configuration of the preliminary reception portion 902E of the barrel base 82 in the lens barrel 10E of Embodiment 6, and shows the configuration thereof in a manner similar to that of FIG. 39.

In the lens barrel 10E of Embodiment 6, as shown in FIG. 43, a rubber sheet 902Eb is provided to an inclined receiving surface 902Ea of the preliminary reception portion 902E provided to the barrel base 82. This rubber sheet 902Eb is made of a rubber material as an instance of a material having an impact absorbing function, and is shaped like a thin plate. The rubber sheet 902Eb is fixed to preliminary reception portion 902E by use of an adhesive material such as an adhesive agent or an adhesive sheet in order that the rubber sheet 902Eb can constitute the surface of the inclined receiving surface 902Ea. The position of this rubber sheet 902Eb is set up in a way that, when the fourth lens retaining frame 41C rotates, the rubber sheet 902Eb comes into surface contact with (the inclined surface 901a of) the preliminary abutment portion 901 provided to the fourth lens retaining frame 41C.

For this reason, in the lens barrel 10E of Embodiment 6, when the fourth lens group 14 is set into the photographic position on the photographic optical axis OA, the inclined surface 901a of the preliminary abutment portion 901 of the fourth lens retaining frame 41C beforehand comes into surface contact with the rubber sheet 902Eb of the inclined receiving surface 902Ea of the preliminary reception portion 902E, and subsequently the stopper 908 of the fourth lens retaining frame 41C abuttingly engages with the fourth group secondary guide shaft 42.

The lens barrel 10E of Embodiment 6 can obtain basically the same effect as that in Embodiment 4, because the configuration of the lens barrel 10E of Embodiment 6 is basically the same as that of the lens barrel 10C of Embodiment 4.

In addition, the lens barrel 10E of Embodiment 6 is capable of more reducing the collision sound which occurs due to the abutment of the inclined surface 901a of the preliminary abutment portion 901 on the preliminary reception portion 902E, because the rubber sheet 902Eb of the inclined receiving surface 902Ea of the preliminary reception portion 902E first comes into surface contact with the inclined surface 901*a* of the preliminary abutment portion 901 of the fourth lens retaining frame 41C which is made of the resin material.

For this reason, the lens barrel 10E of Embodiment 6 is capable of lowering the collision sound which occurs due to the setting of the fourth lens group 14 as the retractable lens into the position on the photographic optical axis OA.

It should be noted that, although as the impact absorbing member, the rubber sheet 902Eb is provided to the inclined receiving surface 902Ea of the preliminary reception portion 902E, the impact absorbing member is not limited to the case of Embodiment 6 and this impact absorbing member may be made of, for example, a bristling material as long as the impact absorbing member is made of a material having an impact absorbing function for the purpose of reducing the collision sound which occurs due to the abutment.

In Embodiment 5 described above, the rubber sheet 901Db is provided to the inclined surface 901Da of the preliminary abutment portion 901D as one of the members which are beforehand brought into contact (surface contact) with each other; and in Embodiment 6 described above, the rubber sheet 902Eb is provided to the inclined receiving surface 902Ea of the preliminary reception portion 902E as the other of the members which are beforehand brought into contact (surface) contact with each other. Otherwise, the invention may be also carried out with a configuration obtained by combining Embodiment 5 and Embodiment 6 together.

In the above described embodiments, the lens barrels 10, 10A, 10B, 10C, 10D, and 10E are respectively described as examples of the lens barrel according to the present invention. However, the present invention is not limited to the embodiments as long as it is a lens barrel configured to transition a plurality of lens groups from a collapsed state in which the lens groups are stored with at least part of the lens groups collapsed, to a photographic state by moving the at least part of the lens groups toward an object, the lens barrel including: a plurality of lens retaining frames configured to retain the plurality of lens groups, respectively; a movable cylinder configured to retain the lens retaining frames inside the movable cylinder; and lens retaining frame driving device configured to drive the lens retaining frames through the movable cylinder, in which in order to position all the lens groups on an optical axis in the photographic state, and to retract a retractable lens including at least one lens from the optical axis in the photographic collapsed state, the lens retaining frames include a retractable lens retaining frame configured to movably retain at least one of the lens groups, and to position the retractable lens in a position on the optical axis by abutting on the positioning member provided inside the movable cylinder, a preliminary reception portion located on a path along which the retractable lens retaining frame moves from the collapsed state to the photographic state is provided inside the movable cylinder, and a preliminary abutment portion configured to abut on the preliminary reception portion before the retractable lens retaining frame abuts on the positioning member during transition from the collapsed state to the photographic state is provided to the retractable lens retaining frame, an imaging apparatus including the lens barrel, a digital camera including the lens barrel, a portable information terminal device including the lens barrel, or an image input apparatus including the lens barrel.

Out of the foregoing embodiments, Embodiments 1 to 3 are those in which the third lens group 13 are retracted from the photographic optical axis OA, and Embodiments 4 to 6 are those in which the fourth lens group 14 are retracted from the photographic optical axis OA. However, the present invention can be made by the combination of those and is not limited to each of the embodiments.

The foregoing descriptions have been provided for the imaging apparatus of the present invention on the basis of the example and the various embodiments. However, the concrete configurations are not limited to these embodiments. The design modifications, additions and the like may be accepted as long as they do not depart from the gist of the present invention.

(Effects Of The Invention)

In the imaging apparatus according to an embodiment of the present invention, when the retractable lens is set into the photographic state on the optical axis, the preliminary abutment portion of the retractable lens folding frame beforehand comes into contact with the preliminary reception portion, and the retractable lens retaining frame subsequently comes into contact with the positioning member. This enables the kinetic energy produced by the movement of the retractable lens retaining frame to be absorbed by two steps. For this reason, it is possible to lower the collision sound which occurs due to the setting of the retractable lens into the photographic state.

In addition to the foregoing configuration, the preliminary reception portion and preliminary abutment portion can come into contact with each other without stopping the movement of the retractable lens retaining frame from the collapsed state to the photographic state, and the kinetic energy produced by the movement of the retractable lens retaining frame can be absorbed by two steps. For this reason, it is possible to lower the collision sound which occurs due to the abutment of the preliminary abutment portion on the preliminary reception portion.

In addition to the foregoing configuration, the preliminary reception portion and the preliminary abutment portion can come into contact with each other by use of their inclined surfaces which are inclined with respect to the direction in which the retractable lens retaining frame moves, and the preliminary reception portion and the preliminary abutment portion can come into contact with each other while releasing part of the kinetic energy produced by the movement of the retractable lens retaining frame and absorbing the rest of the kinetic energy. For these reasons, it is possible to lower the collision sound which occurs due to the abutment of the preliminary abutment portion on the preliminary reception portion.

In addition to the foregoing configuration, the preliminary reception portion and the preliminary abutment portion abuts on each other by use of their inclined surfaces which are inclined with respect to the optical axis direction. Thus, their abutment enables the retractable lens retaining frame to be guided toward the optical axis in order that the retractable lens retaining frame can move toward the positioning member, and makes it possible to release part of the kinetic energy produced by the movement of the retractable lens retaining frame while absorbing the rest of the kinetic energy. For this reason, it is possible to reduce the collision sound which occurs due to the abutment of the preliminary abutment portion on the preliminary reception portion.

In addition to the foregoing configuration, the positioning member is made of the metal material. Because the retractable lens retaining frame comes into contact with the positioning member made of the metal material, it is possible to secure high positioning precision for the retractable lens, and concurrently to reduce the collision sound which occurs due to the abutment of the retractable lens retaining frame on the positioning member.

In addition to the foregoing configuration, the preliminary reception portion is made of the impact absorbing material. For this reason, it is possible to reduce the collision sound which occurs due to the abutment of the preliminary abutment portion on the preliminary reception portion.

In addition to the foregoing configuration, the impact absorbing material is the resin material. For this reason, it is possible to form the preliminary reception portion easily.

In addition to the foregoing configuration, the impact absorbing material is the rubber material. For this reason, it is possible to form the preliminary reception portion easily.

In addition to the foregoing configuration, at least one of the preliminary reception portion and the preliminary abutment portion is provided with the impact absorbing member in its part in which the preliminary reception portion and the preliminary abutment portion come into contact with each other. For this reason, it is possible to reduce the collision sound which occurs due to the abutment of the preliminary abutment portion on the preliminary reception portion.

In addition to the foregoing configuration, the impact absorbing member is the sheet member made of the rubber material. For this reason, it is possible to form at least one of the preliminary reception portion and the preliminary abutment portion easily.

In addition to the foregoing configuration, the impact absorbing member is made of the bristling material. For this reason, it is possible to form at least one of the preliminary reception portion and the preliminary abutment portion easily.

An imaging apparatus using the lens barrel having the foregoing configuration is capable of making noise, which occurs during its operation, smaller than ever.

A digital camera using the lens barrel having the foregoing configuration is capable of making noise, which occurs during its operation, smaller than ever.

A portable information terminal device using the lens barrel having the foregoing configuration is capable of making noise, which occurs during its operation, smaller than ever.

An image input apparatus using the lens barrel having the foregoing configuration is capable of making noise, which occurs during its operation, smaller than ever.

Although the present invention has been described in terms of exemplary embodiments, it is not limited thereto. It should be noted that variations may be made in the embodiments described by persons skilled in the art without departing from the scope of the present invention as defined by the following claims.

What is claimed is:

1. A lens barrel, comprising:
a plurality of lens groups each having at least one lens, the plurality of lens groups being moved between a collapsed state where at least one part of the plurality of lens groups is collapsed to store the plurality of lens groups and a photographic state where at least one part of the plurality of lens groups is disposed at an object side from a position in the collapsed state, and the plurality of lens groups having at least one retractable lens group;
a plurality of lens retaining frames each configured to retain corresponding one of the plurality of lens groups and having at least one retractable lens retaining frame configured to retain the at least one retractable lens group;
a movable cylinder configured to accommodate the plurality of lens retaining frames therein, the plurality of lens retaining frame retaining the plurality of lens groups to be positioned on a photographic optical axis in the photographic state and the at least one retractable lens retaining frame retaining the at least one retractable lens group to be retracted to a position outside an inner diameter position of the movable cylinder in the collapsed state;
a positioning member provided inside the movable cylinder, the at least one retractable lens retaining frame retaining the at least one retractable lens to be positioned to a position on the photographic axis by allowing the at least one retractable lens retaining frame to abut on the positioning member;
a lens retaining frame driving device configured to drive the plurality of lens retaining frames through the movable cylinder;
a preliminary reception portion provided inside the movable cylinder and located on a path along which the retractable lens retaining frame moves from the collapsed state to the photographic state; and
a preliminary abutment portion provided on the retractable lens retaining frame and configured to abut on the preliminary reception portion before the retractable lens retaining frame abuts on the positioning member during transition from the collapsed state to the photographic state.

2. The lens barrel according to claim 1, wherein the preliminary reception portion and the preliminary abutment portion come into contact with each other without stopping movement of the retractable lens retaining frame from the collapsed state to the photographic state.

3. The lens barrel according to claim 2, wherein the preliminary reception portion and the preliminary abutment portion come into contact with each other by use of their inclined surfaces inclined with respect to a direction in which the retractable lens retaining frame moves.

4. The lens barrel according to claim 1, wherein the positioning member is made of a metal material.

5. The lens barrel according to claim 1, wherein the preliminary reception portion is made of an impact absorbing material.

6. The lens barrel according to claim 5, wherein the impact absorbing material is a resin material.

7. The lens barrel according to claim 5, wherein the impact absorbing material is a rubber material.

8. The lens barrel according to claim 1, wherein at least one of the preliminary reception portion and the preliminary abutment portion is provided with an impact absorbing member in a portion in which the preliminary reception portion and the preliminary abutment portion come into contact with each other.

9. The lens barrel according to claim 8, wherein the impact absorbing member is a sheet member made of a rubber material.

10. The lens barrel according to claim 8, wherein the impact absorbing member is a sheet member made of a bristling material.

11. An imaging apparatus comprising the lens barrel according to claim 1.

12. A digital camera comprising the lens barrel according to claim 1.

13. A portable information terminal device comprising the lens barrel according to claim 1.

14. An image input apparatus comprising the lens barrel according to claim 1.

15. A lens barrel, comprising:
a plurality of lens groups each having at least one lens, the plurality of lens groups being moved between a collapsed state where at least one part of the plurality of lens groups is collapsed to store the plurality of lens groups and a photographic state where at least one part of the plurality of lens groups is disposed at an object side from a position in the collapsed state, and the plurality of lens groups having at least one retractable lens group;
a plurality of lens retaining frames each configured to retain corresponding one of the plurality of lens groups and having at least one retractable lens retaining frame configured to retain the at least one retractable lens group;
a movable cylinder configured to accommodate the plurality of lens retaining frames therein, the plurality of lens retaining frame retaining the plurality of lens groups being to be positioned on a photographic optical axis in the photographic state and the at least one retractable lens retaining frame retaining the at least one retractable lens group to be retracted to a position out of the photographic optical axis in the collapsed state;
a positioning member provided inside the movable cylinder, the at least one retractable lens retaining frame retaining the at least one retractable lens to be positioned to a position on the photographic axis by allowing the at least one retractable lens retaining frame to abut on the positioning member and the at least one retractable lens retaining frame being movable relative to the positioning member in a direction of the photographic optical axis;
a lens retaining frame driving device configured to drive the plurality of lens retaining frames through the movable cylinder;
a preliminary reception portion provided inside the movable cylinder and located on a path along which the retractable lens retaining frame moves from the collapsed state to the photographic state; and
a preliminary abutment portion provided on the retractable lens retaining frame and configured to abut on the preliminary reception portion before the retractable lens retaining frame abuts on the positioning member during transition from the collapsed state to the photographic state.

16. The lens barrel according to claim 15, wherein the preliminary reception portion and the preliminary abutment portion come into contact with each other by use of the inclined surfaces inclined with respect to the optical axis direction.

* * * * *